United States Patent [19]

Yamaguchi et al.

[11] Patent Number: 4,809,082
[45] Date of Patent: Feb. 28, 1989

[54] METHOD OF AND APPARATUS FOR GENERATING IMAGE DATA USED TO RECORD AN IMAGE HAVING GRADATION

[75] Inventors: Katsuya Yamaguchi, Kyoto; Hideaki Kitamura, Ibaraki, both of Japan

[73] Assignee: Dainippon Screen Mfg. Co., Ltd., Kyoto, Japan

[21] Appl. No.: 89,331

[22] Filed: Aug. 25, 1987

[30] Foreign Application Priority Data

Aug. 25, 1986 [JP] Japan .................................. 61-199841
Aug. 25, 1986 [JP] Japan .................................. 61-199842
Jun. 23, 1987 [JP] Japan .................................. 62-157300

[51] Int. Cl.⁴ .......................................... H04N 1/387
[52] U.S. Cl. ...................................... 358/283; 356/298
[58] Field of Search ............... 358/283, 284, 298, 280

[56] References Cited

U.S. PATENT DOCUMENTS

| | | | |
|---|---|---|---|
| 4,279,003 | 7/1981 | Schulz | 358/284 X |
| 4,366,507 | 12/1982 | Mori | 358/283 |
| 4,449,150 | 5/1984 | Kato | 358/284 X |
| 4,496,989 | 1/1985 | Hirosawa | 358/280 X |
| 4,578,714 | 3/1986 | Suyiura et al. | 358/283 |
| 4,654,721 | 3/1987 | Goertzel et al. | 358/283 |
| 4,700,235 | 10/1987 | Gall | 358/298 X |
| 4,701,811 | 10/1987 | Moriguchi et al. | 358/283 X |
| 4,758,897 | 7/1988 | Hiratsuka et al. | 358/283 |

FOREIGN PATENT DOCUMENTS 61-45248 3/1986 Japan .
61-91661 5/1986 Japan .
61-176935 8/1986 Japan .

Primary Examiner—James J. Groody
Assistant Examiner—E. Anne Faris
Attorney, Agent, or Firm—Lowe, Price, LeBlanc, Becker & Shur

[57] ABSTRACT

Gradation levels of an image to be recorded are expressed by gradation data having integral parts and decimal parts. Random numbers are composed with the decimal parts to provide composite values. When the composite value exceeds, the quantity is added to the value of the integral part. The decimal parts are accumulated along the direction of an array of pixels, to provide accumulated values. Also when the accumulated value exceeds, the quantity is added to the value of the integral part to provide a modified integral part. The modified integral parts are employed as gradation data in image recording.

19 Claims, 47 Drawing Sheets

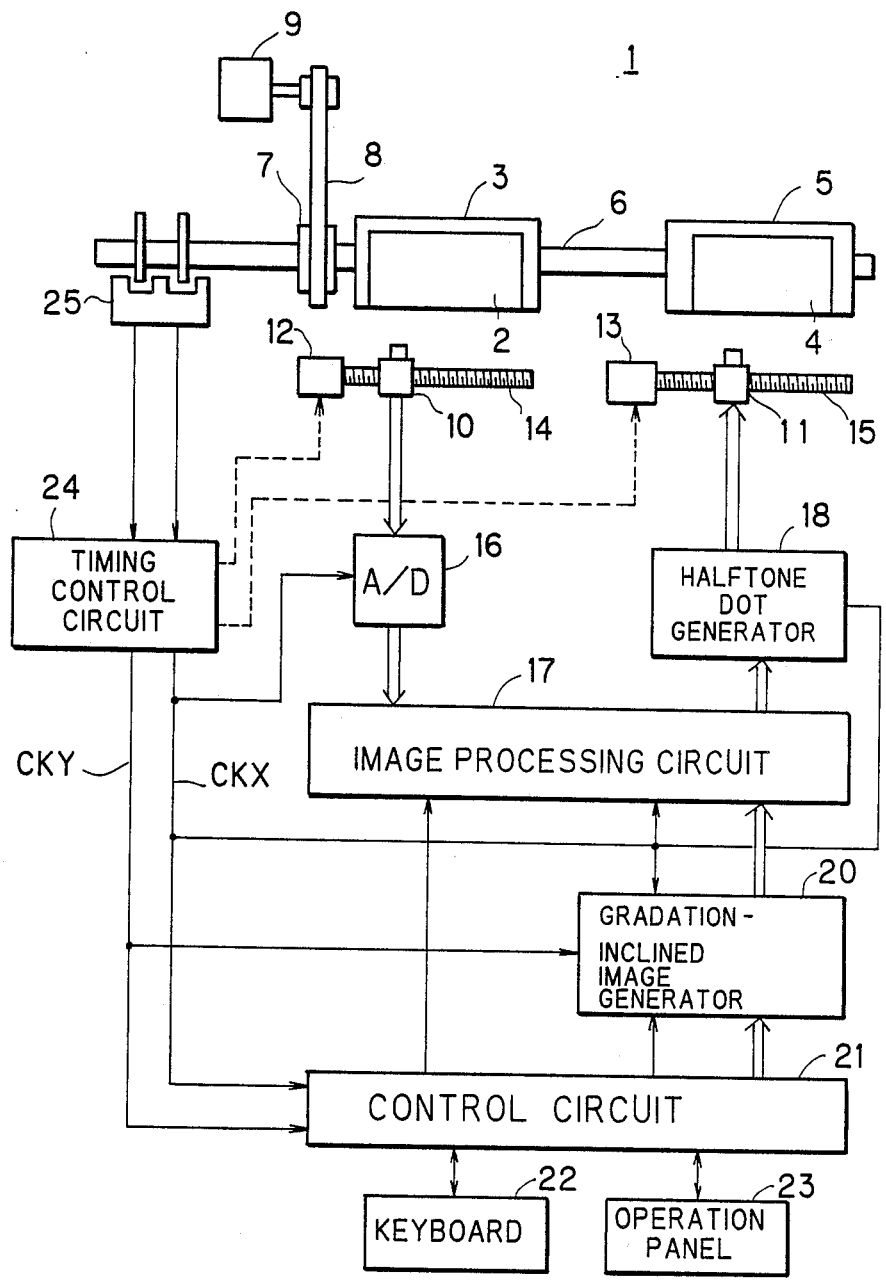

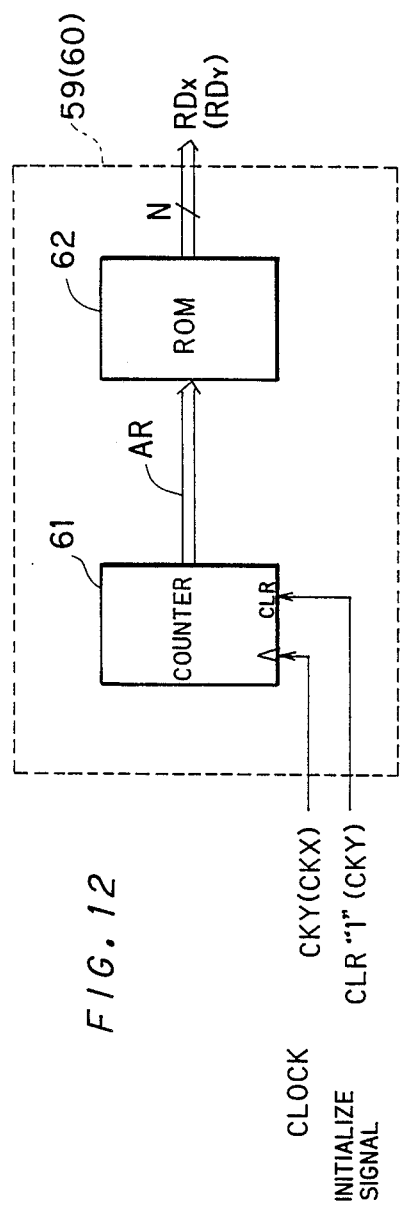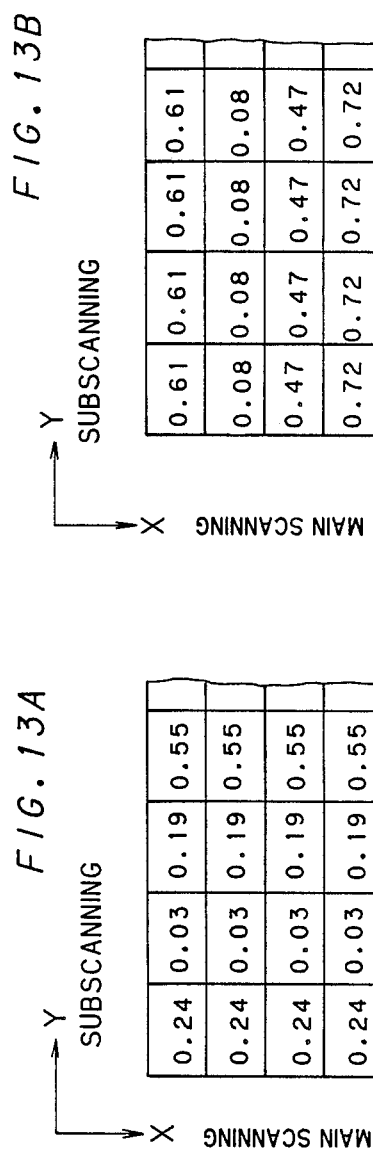

FIG. 15
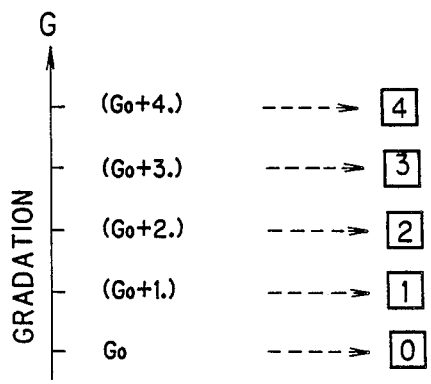
FIG. 16(a)          FIG. 16(b)
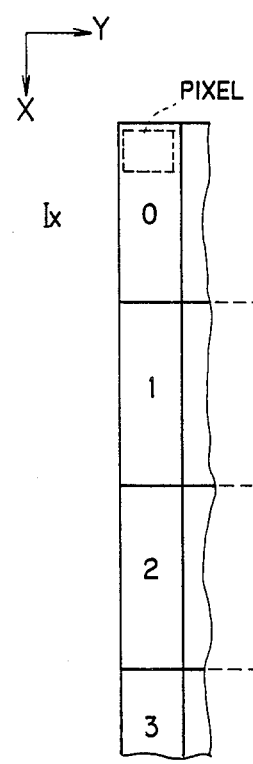    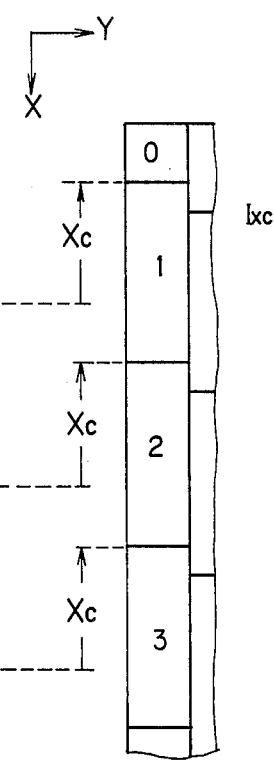

FIG. 17(a)
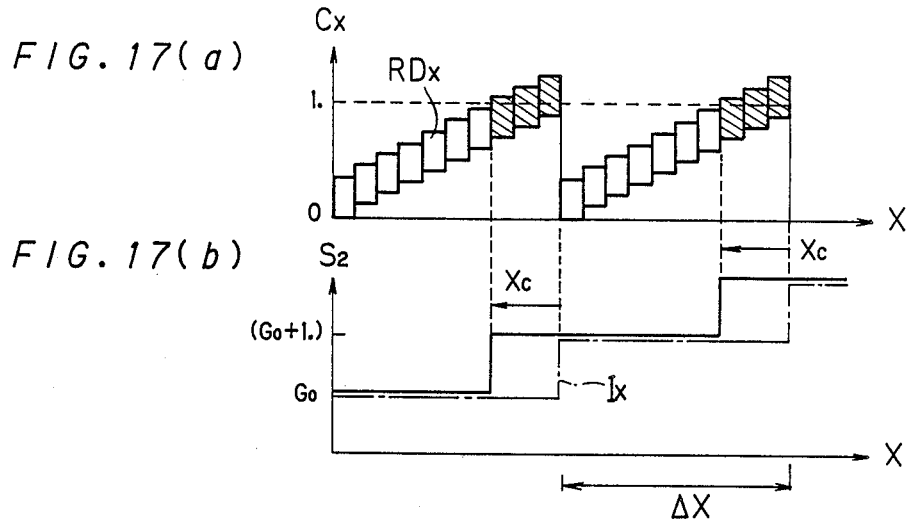
FIG. 17(b)
FIG. 18(a)
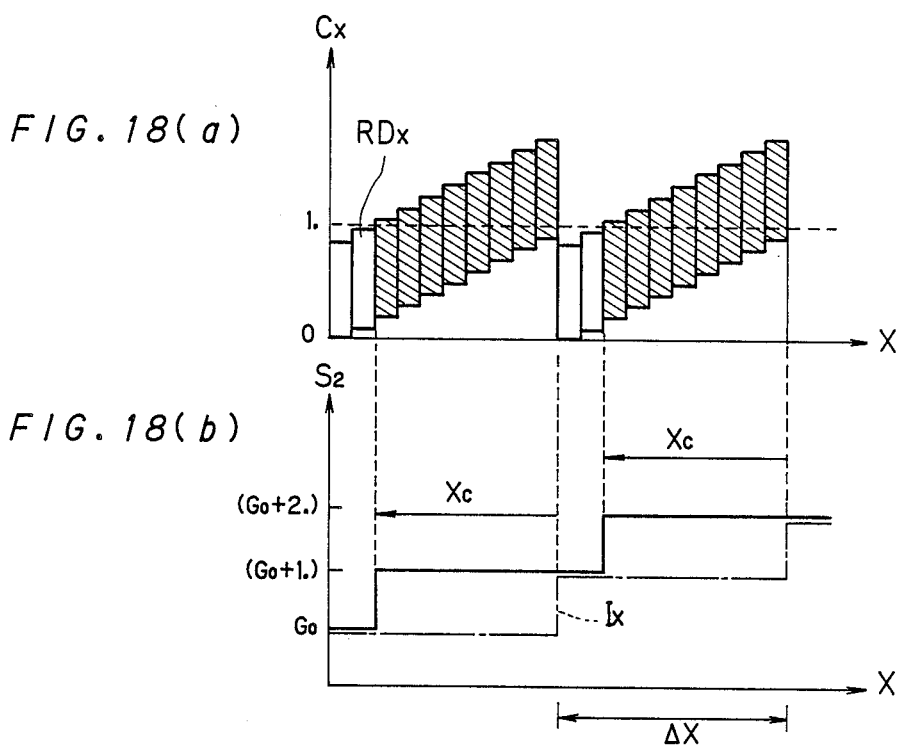
FIG. 18(b)

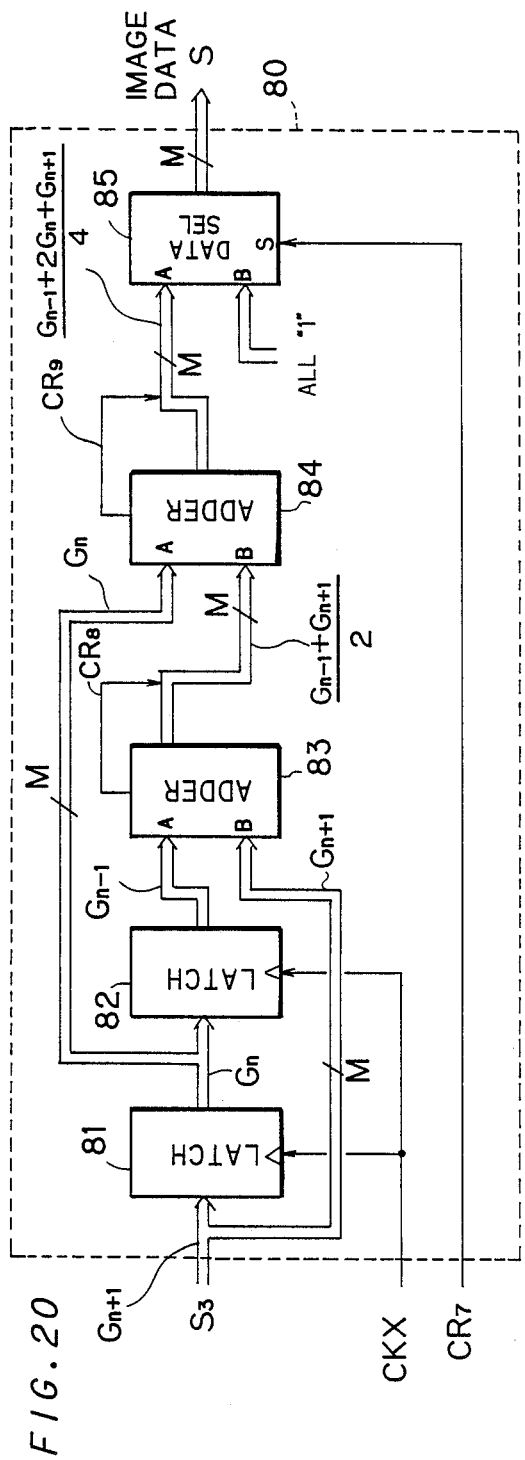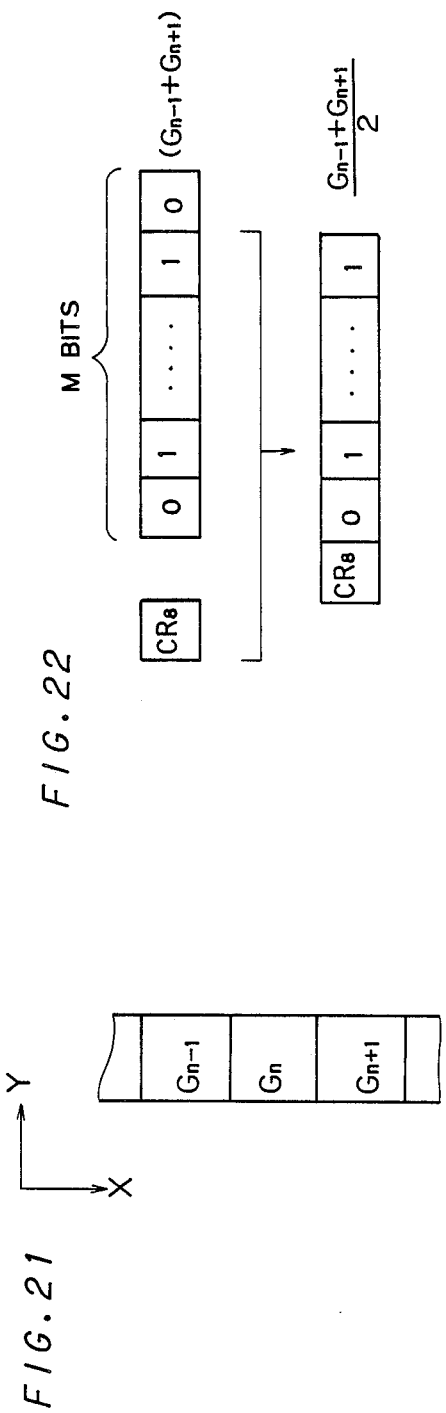
FIG. 20
FIG. 21
FIG. 22

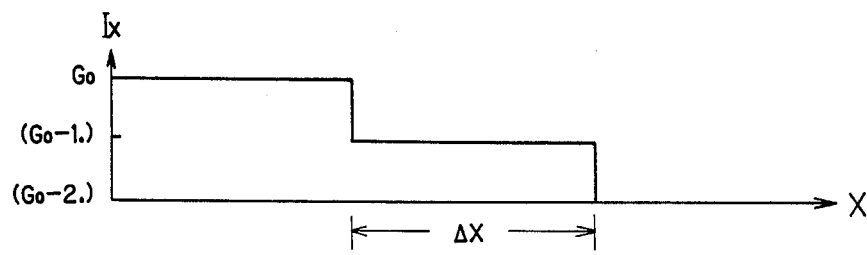
FIG. 36(a)
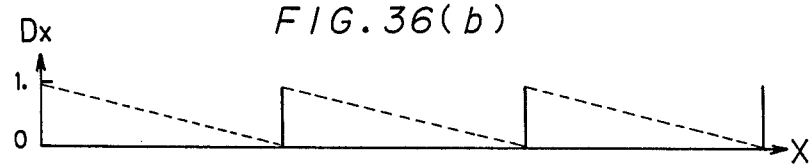
FIG. 36(b)
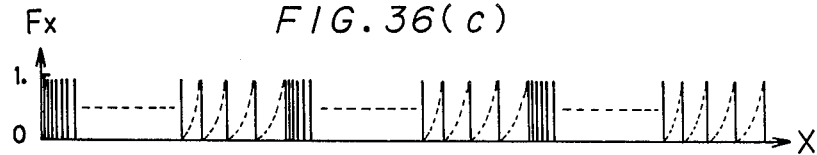
FIG. 36(c)
FIG. 36(d)
FIG. 36(e)
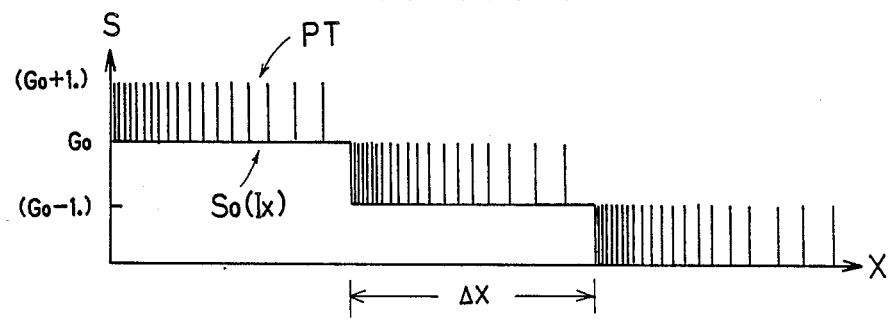

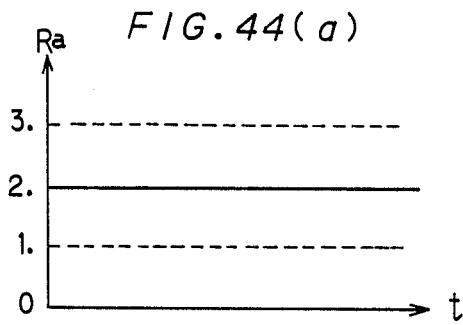
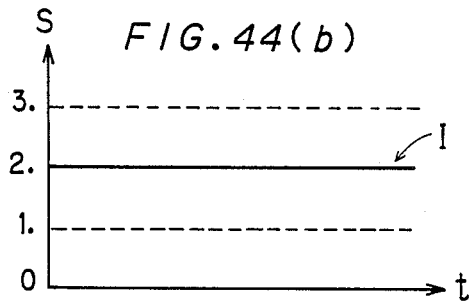
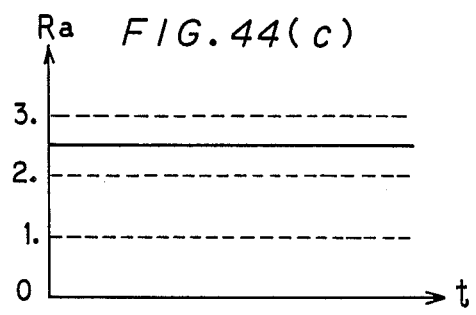
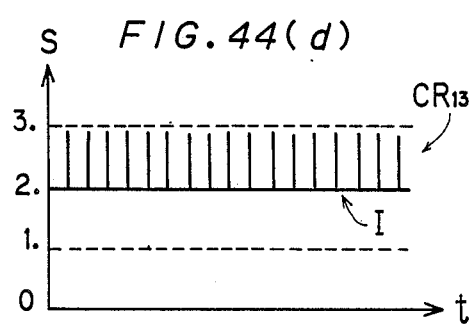
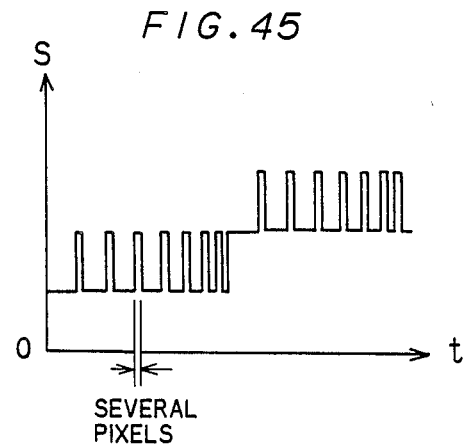
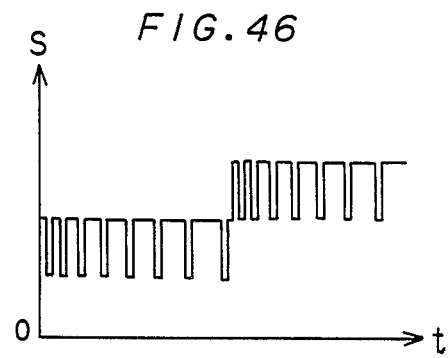

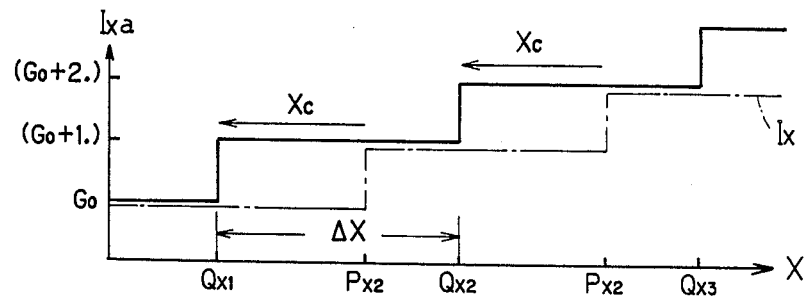
FIG.49B(a)
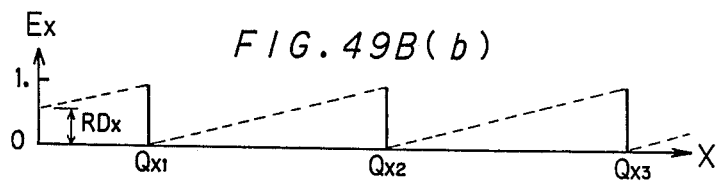
FIG.49B(b)
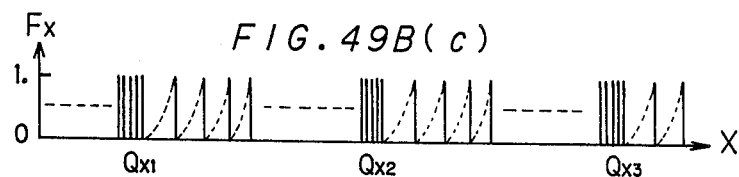
FIG.49B(c)
FIG.49B(d)
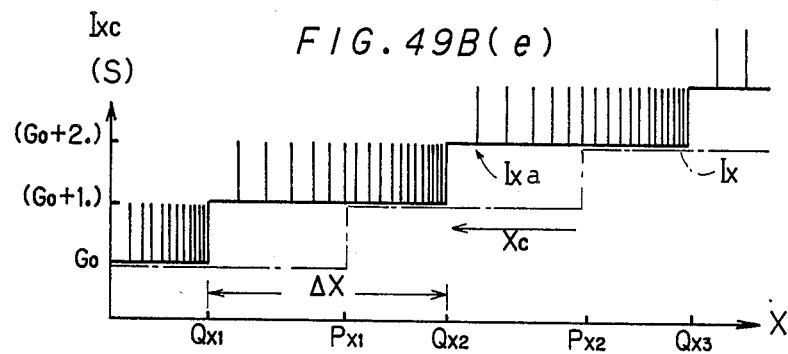
FIG.49B(e)

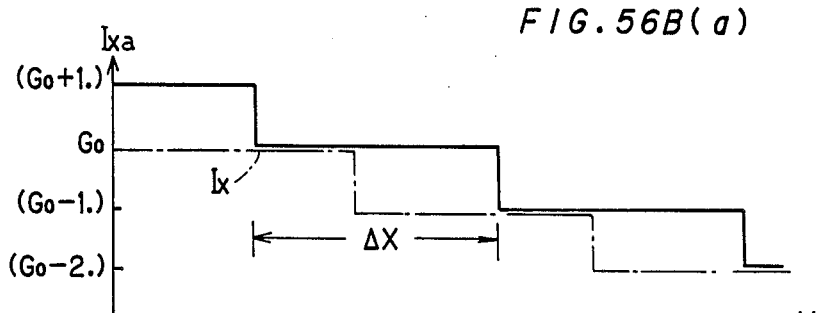
FIG.56B(a)
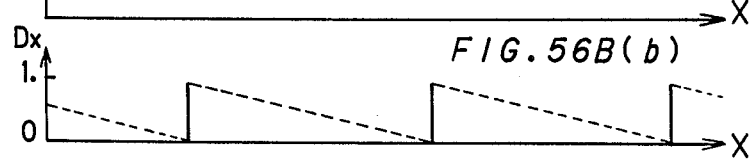
FIG.56B(b)
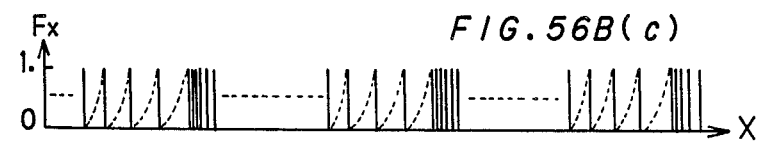
FIG.56B(c)
FIG.56B(d)
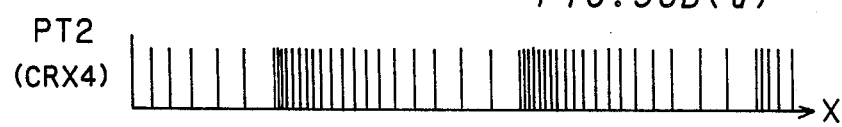
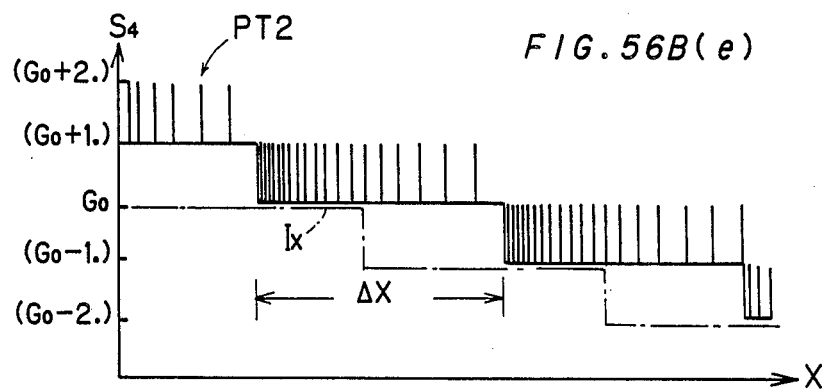
FIG.56B(e)

METHOD OF AND APPARATUS FOR GENERATING IMAGE DATA USED TO RECORD AN IMAGE HAVING GRADATION

BACKGROUND OF THE INVENTION

1. Field of the Invention

The present invention relates to a method of generating image data and an apparatus therefor which can prevent any influence of discontinuous change of gradation levels (hereinafter referred to as "tone jump") in recording of images having continuous gradation levels on a recording plane in the form of arrays of pixels having discrete gradation levels.

2. Description of the Prior Art

In an image recording apparatus such as a process scanner, gradation of images are recorded on a recording plane by arrays of pixels having discrete gradation levels. Therefore, an image whose gradation levels are continuously varied with respect to position, as typically shown in FIG. 1B, is approximately expressed on the recording plane as an image having a stepped gradation change as shown in FIG. 1A. Such a situation is not restricted to process scanners, but is common to apparatuses for performing image recording by employing digitized image data.

On the other hand, various improvements have been introduced into image recording apparatuses so that such a discontinuous change in gradation, i.e., a tone jump $\Delta G$ in FIG. 1A is not visualized. Thus, such a tone jump $\Delta G$ is hardly visualized in most cases of image recording. However, presence of such a tone jump $\Delta G$ is relatively clearly visualized in the following case:

A first example is such a case wherein gradation levels are monotonically changed at a designated gradation change rate as in the case of recording of an inclined halftone image in a process scanner. In such a case, smoothness of gradation change is frequently blocked by the tone jump $\Delta G$.

A second example is an image such as that of human skin, gradation levels of which are slowly changed to easily draw attention of the person who sees the recorded image. Also in this case, presence of the tone jump $\Delta G$ is easily recognized as turbulence in the recorded image.

A third example is the case of producing a recorded image on a large recording plane by enlarging an original image. In this case, pixels are increased in size by enlargement processing, whereby presence of the tone jump $\Delta G$ is inevitably recognized when detailed observation is visually performed.

Various techniques have been considered in order to cope with such problems, and description is now made on typical examples together with disadvantages thereof.

According to a first conventional technique, data length of image data i.e., the bit number of digital signals expressing gradation levels is made sufficiently large to decrease the absolute value of the tone jump $\Delta G$. This method is most desirable in principle. In practice, however, the amount of data is increased with increases in data length while the processing time is considerably lengthened. Further, circuits for performing such a large amount of data processing must be prepared, whereby the apparatus is increased in size and cost.

In a second conventional technique, digitized image data are once converted into analog signals to be exposed to natural noise, such as circuit noise, applied to the analog signals. In this method, the analog signals exposed to the noise are again converted into digital signals to be employed for image recording. The natural noise or the like is so employed that pixels, causing the tone jump $\Delta G$, cannot be specified on observing the same. However, since the level of such natural noise is generally small, the bit number of the digital image data must be considerably large in order to employ this method. Thus, this method has a disadvantage similar to that of the aforementioned first conventional method.

In a third conventional technique, random digital noise having a certain degree of level is generated by a noise generator, and added to the digital image data. Dissimilarly to the first and second methods, a certain degree of effect can be expected in this method. However, this method has such a problem that modification of image data is performed independent of the position where the tone jump $\Delta G$ is caused since noise irrelevant to the characters of the images to be recorded is added to the image data.

Thus, in these prior art examples, it has been difficult to effectively eliminate the influence of the tone jump $\Delta G$ in recording of images whose gradation levels are continuously changed.

SUMMARY OF THE INVENTION

The present invention is directed to a method of generating image data for recording an image whose gradation levels are continuously changed along a designated direction by an array of pixels having discrete gradation levels on a prescribed recording plane. The method comprises the steps of: (a) designating the direction of spatial gradation change of the image to be recorded; (b) expressing the gradation levels of each pixel of the image by first gradation data including integral parts having data lengths responsive to the number of discrete gradation levels employed for the recording and decimal parts having arbitrary data lengths; (c) composing random numbers with the decimal parts for each pixel along a prescribed rule depending on a relation between the direction of gradation change and the direction of the pixel array to obtain composite values for each pixel; (d) finding pixels in which the composite values are larger than a prescribed reference value; (e) modifying values of the integral parts with respect to pixels found in step (d) by a unit amount to obtain second gradation data; and (f) generating image data for recording on the basis of the second gradation data.

The method of the present invention can be implemented by an apparatus which comprises: first gradation data generating means for generating first gradation data for expressing gradation levels of each pixel of an image to be recorded, said first gradation data including integral parts having data lengths responsive to the number of discrete gradation levels employed for recording and decimal parts having arbitrary data lengths; random number generating means for generating random numbers having data lengths responsive to the data lengths of the decimal parts; composing means for composing a random number with the decimal parts for each pixel along a prescribed rule determined in relation to the direction of spatial gradation change of the image and the direction of an array of pixels for obtaining composite values for each pixel; pixel finding means for comparing the composite values with a prescribed reference value to find pixels in which the composite values are larger than the prescribed reference value; integral part modifying means for modifying the values of the integral parts with respect to the pixels found by the pixel finding means for generating second gradation data; and recording image data generating means for generating image data for recording on the basis of the second gradating data.

In a preferred embodiment of the present invention, an image data generating method comprises the steps of: (a) expressing gradation levels of each pixel of an image to be recorded by first gradation data including integral parts having data lengths responsive to the number of discrete gradation levels employed for recording said image; (b) sequentially accumulating values of the decimal parts along the direction of array of pixels to obtain accumulated values; (c) specifying respective pixels in which the accumulated values reach values corresponding to multiples of a prescribed reference value as multiple reaching pixels; (d) modifying the integral parts with respect to the multiple reaching pixels and/or pixels in the vicinity thereof by a prescribed integral amount to generate second gradation data; and (e) generating image data for recording the image on the basis of the second gradation data.

The aforementioned two methods may be combined with each other. Such a combined method can be implemented by an apparatus which comprises: first gradation data supplying means for sequentially supplying first gradation data for expressing gradation levels of each pixel of an image to be recorded, said first gradation data including first integral parts data lengths responsive to the number of discrete gradation levels for recording and first decimal parts having arbitrary data lengths; random number composing means for composing random numbers with the first decimal parts along a composition rule determined in response to a relation between the direction of gradation change of the image and the direction of an array of pixels for each pixel to obtain commposite values; first modification requiring signal generating means for generating first modification requiring signals when the composite values exceed a first reference value while generating second decimal parts on the basis of values of parts not exceeding the first reference value within the composite values; accumulation means for accumulating the second decimal parts along the direction of the pixel array to obtain accumulated values; second modification requiring signal generating means for generating second modification requiring signals when the accumulated values reach multiples of a second reference value; integral part modifying means for modifying values of the first intergral parts with respect to pixels in which at least either the first or second modification requiring signal is generated and/or pixels in the vicinity thereof by a prescribed amount to generate second integral parts; and recording image data generating means for generating image data for recording the image on the basis of the second gradation data for each pixel obtained from the second integral parts.

Accordingly, an object of the present invention is to provide an image data generating method and an apparatus therefor, which can provide a recorded image having smooth gradation levels by reducing visualizability of tone jumps in recording of a continuous image without requiring complicated data processing.

Another object of the present invention is to provide a method of generating image data for recording an image without roughing the same.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram illustrating the entire structure of a drum scanning type process scanner in which an embodiment of the present invention is assembled.

FIG. 12 is a block diagram showing internal structure of a random number generator 59 and 60.

FIG. 13A and FIG. 13B are diagrams illustrating examples of values of random numbers generated from the random number generators 59 and 60.

FIG. 15 is an explanatory diagram of symbols employed in FIG. 16.

FIG. 16 is an explanatory diagram of correction of the integral parts.

FIG. 17 and FIG. 18 are explanatory diagrams of displacement in spatial distribution of the integral parts.

FIG. 20 is a block diagram showing the internal structure of an averaging circuit 80.

FIG. 21 is an explanatory diagram of pixels forming a spatial area providing a processing unit in averaging processing.

FIG. 22 is an explanatory diagram of division by bit shift.

FIG. 28A and FIG. 28B are block diagrams showing internal structure of a gradation-inclined image generator 20 as the first embodiment.

FIG. 36 is a waveform diagram showing operation of the second embodiment in generation of an inclined halftone image whose gradation levels are sequentially decreased.

FIG. 43 and FIG. 44 are waveform diagrams showing operation of the third embodiment.

FIG. 45 and FIG. 46 are explanatory diagrams of modifications of the second and third embodiments.

FIG. 49A and FIG. 49B are diagrams illustrating data change in generation of a main scanning direction inclined halftone image.

FIG. 56A and 56B are explanatory diagrams of operation for generating a gradation decreased halftone image.

DESCRIPTION OF PREFERRED EMBODIMENTS

A. First Embodiment

Figure 1A:
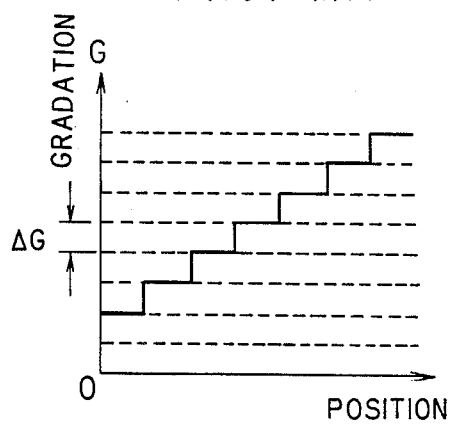
FIG. 1A and FIG. 1B are explanatory diagrams of tone jumps.
Figure 1B:
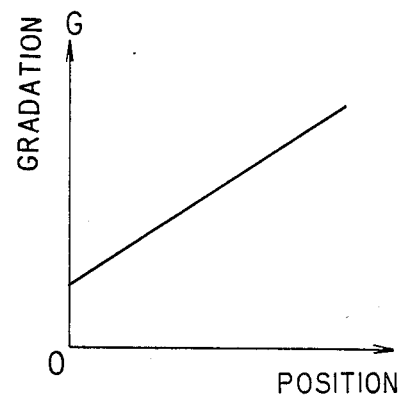

FIG. 2 is a overall block diagram showing a drum scanning type process scanner in which an image data generating apparatus according to a first embodiment of the present invention is assembled. The structure of FIG. 2 is common to other embodiments hereinafter described. Description as to the entire structure and schematic operation of this scanner is made at first with reference to FIG. 2, and thereafter characteristic parts of this embodiment are described in detail.

(A-1) Entire Structure and Operation of First Embodiment

In a process scanner 1 as shown in FIG. 2, an original 2 is wound around an original drum 3 and a photosensitive material (recording plane) 4 is wound around a recording drum 5. The original drum 3 and the recording drum 5 are fixed to a drum shaft 6. The drum shaft 6 synchronously rotates by the driving force of a motor 9 supplied through a pulley 7 and a belt 8.

On the other hand, a pickup head 10 and an exposure head 11 are arranged to be movable in parallel to the drum shaft 6 while facing the original drum 3 and the recording drum 5 respectively, so that the same are linearly moved by driving forces respectively supplied from driving pulse motors 12 and 13 to feed screws 14 and 15.

The pickup head 10 has photoelectric conversion elements, to optically read the image of the original 2 to convert the same to electric analog image signals. The analog image signals are supplied to an A-D converter 16. In the A-D converter 16, the image signals are sampled in response to periodic pixel clocks CKX from a timing control circuit 24 to be sequentially A-D converted. Digital image signals obtained by the A-D conversion are supplied to an image processing circuit 17.

The image processing circuit 17 has a gradation correction circuit, not shown, to perform prescribed image processing such as gradation correction on the inputted image signals. Image signals thus obtained, termed recording image signals are supplied to a halftone dot generator 18. The halftone dot generator 18 compares the level of the recording image signals with that of reference halftone dot signals (not shown) to generate halftone output. The exposure head 11 records halftone dot images on photosensitive material 4 on the basis of the halftone dot output.

Halftone dot size may be different from that of pixels which are defined by the data density of the image data and scanning rate. For example, one halftone dot may include 2.3×2.3 pixels. Therefore, the recorded image may be expressed by a dot image or pixel array whose size does not equal that of the reading pixel of the original 2.

On the other hand, process scanner 1 is provided with a gradation-inclined image generator 20 according to an embodiment of the present invention. When recording gradation inclined halftone images on the photosensitive material 4, image data generated in the gradation-inclined image generator 20 are supplied to the halftone dot generator 18 through image processing circuit 17. The image signals read from the original 3 are not employed in this case. However, the image signals may be combined with the image data of gradation inclined image.

Process scanning 1 is also provided with a control circuit 21 connected to a keyboard 22 and an operation panel 23. Control circuit 21 is adapted to control the aforementioned respective circuits and perform various data processing tasks. The scanner 1 is further provided with a timing control circuit 24. This timing control circuit 24 is adapted to generate the pixel clocks CKX, the main scanning start clocks CKY for indicating an exposure start position in every rotation of the main scanner, and other control signals (shown by broken lines in FIG. 2) to the driving pulse motors 12 and 13. Clock signals CKX, CKY and the control signals are synchronized with pulses from a pulse generator 25 which is synchronized with rotation of the drum shaft 6.

(A-2) Function of the Gradation-Inclined Image Generator 20

Figure 4:
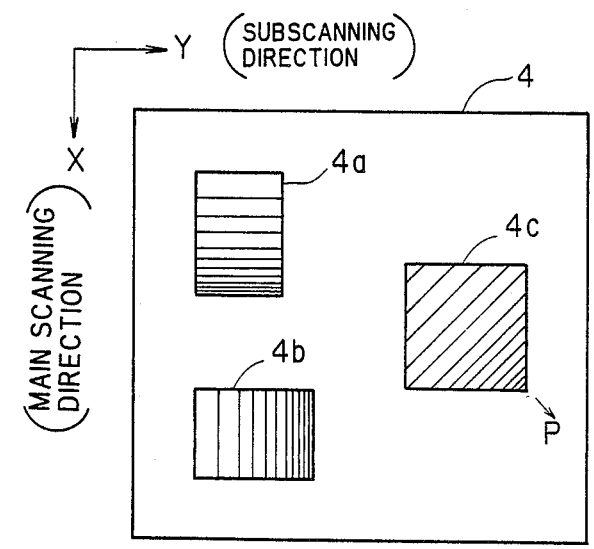
FIG. 4 is a schematic diagram showing examples of inclined halftone images.
Figure 3A:
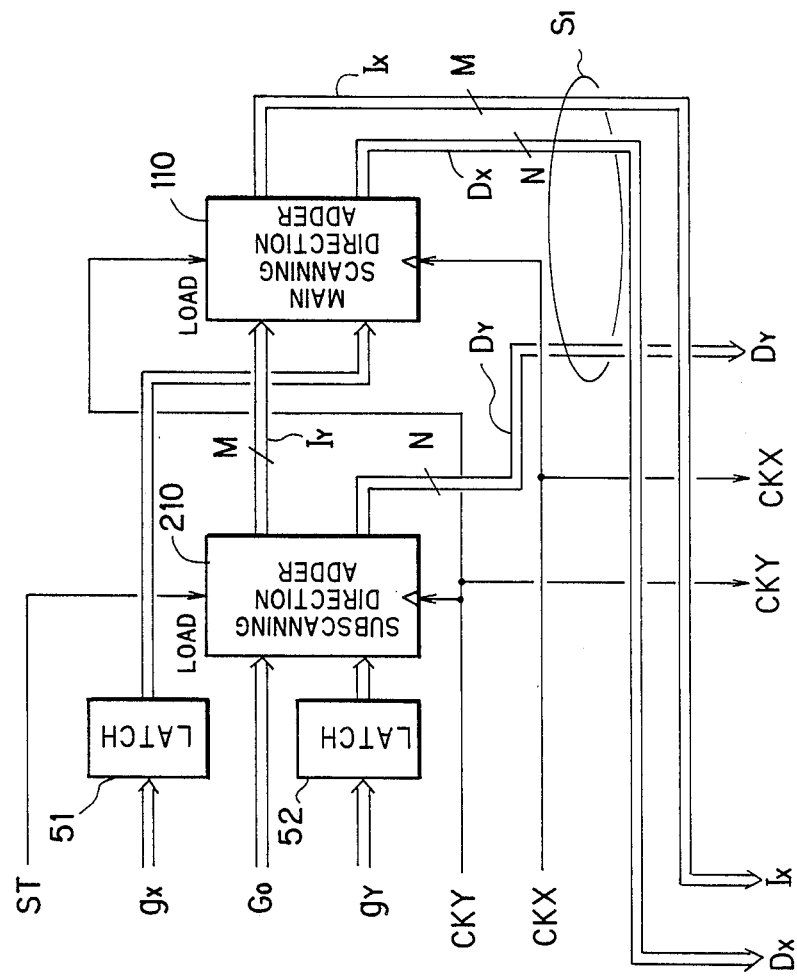
FIG. 3A and FIG. 3B are block diagrams showing the structure of a gradation-inclined image generator formed as a first embodiment of the present invention.
Figure 3B:
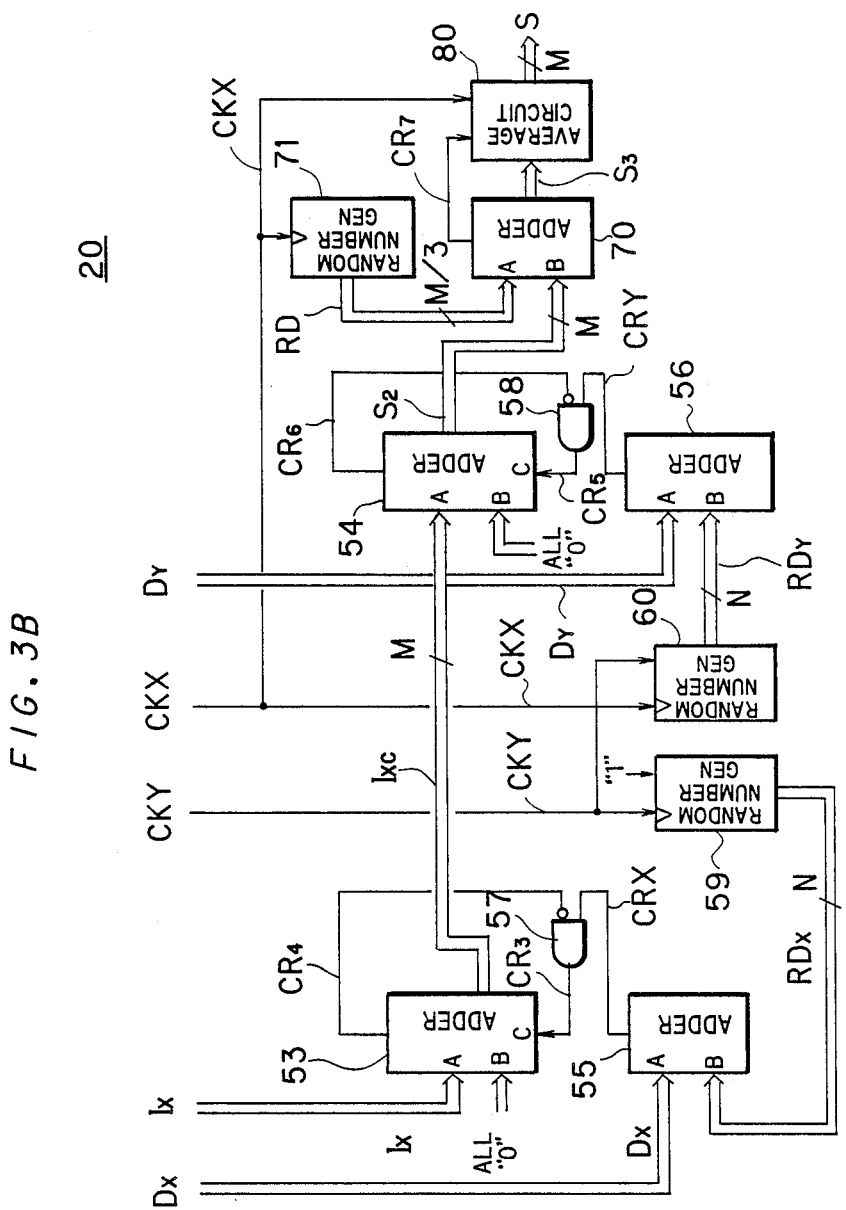

FIG. 3A and FIG. 3B are block diagrams showing internal structure of the gradation-inclined image generator 20. As hereinabove described, gradation-inclined image generator 20 is adapted to generate image data for recording inclined halftone images on the photosensitive material 4. Examples of gradation distribution of the inclined halftone images are shown in FIG. 4. Namely, a region 4a on the photosensitive material 4 in FIG. 4 shows an inclined halftone image (hereinafter referred to as "main scanning direction inclined halftone image") whose gradation is monotonically changed along the main scanning direction. A region 4b shows an inclined halftone image (hereinafter referred to as "subscanning direction inclined halftone image") whose gradation is monotonically changed along subscanning direction Y. Further, a region 4c shows an inclined halftone image whose gradation is changed along an arbitrary direction P.

As will become obvious from the following description, the gradation-inclined image generator 20 can generate image data for recording of inclined halftone images in various directions. The image data are generated in such a manner to effectively eliminate any influence of tone jumps.

In the following sections, description is first set forth on the regeneration of image data for recording the main scanning direction inclined halftone images by circuitry shown in FIG. 3A and FIG. 3B, and thereafter description is set forth on the generation of image data with respect to recording the subscanning direction and arbitrary direction inclined halftone images respectively. General matters required for later reference are set forth in the explanation of generation of the main scanning direction inclined halftone images.

In the following description, an integral value "1." of the decimal system is expressed with a decimal point as "1." in order to discriminate the same from "1" indicating the state of a specific bit of data. Similarly, "2" as an integral value of the decimal system is expressed as "2.", etc.

(A-3) Generation of Main Scanning Direction Inclined Halftone Image

(A-3a) Data Input

In generation of the main scanning direction inclined halftone image, an operator first selects the main scanning direction X as a direction of gradation change at keyboard 22 of FIG. 2. The following data respectively indicated in FIG. 5 are also inputted.

Figure 5:
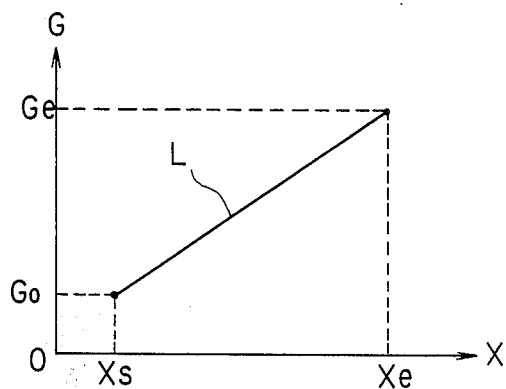
FIG. 5 is an explanatory diagram of input data in generation of a main scanning direction halftone image.

(1) Inclined halftone generation start position $X_s$
Inclined halftone generation end position $X_e$
(2) Gradation initial value $G_o$ at the inclined halftone generation start position $X_s$
(3) Parameter indicating gradation changing rate (Inclination of gradation changing line L in FIG. 5)

In place of the gradation change rate parameter, a gradation end value $G_e$ at the inclined halftone generation position $X_e$ may be inputted.

Upon input of this data, a microcomputer (not shown) provided in the control circuit 21 calculates gradation variation $g_X$ per pixel in the main scanning direction X. The gradation variation $g_X$ value is hereinafter referred as "main scanning direction gradation variation".

The main scanning direction gradation variation $g_X$ value is supplied to the gradation inclined image generator 20 of FIG. 3A. The gradation-inclined image generator 20 is adapted to receive gradation variation $g_Y$ per pixel with respect to the subscanning direction Y. The data $g_Y$ is also calculated by the microcomputer and is hereinafter refered to as "subscanning direction gradation variation".

However, when generating the main scanning direction inclined halftone image, the subscanning direction gradation variation $g_Y$ is zero.

The gradation initial value $G_O$ is fetched by a subscanning direction adder 210 in the gradation-inclined image generator 20. The subscanning direction gradation variation $g_Y(=0)$ is also fetched by the subscanning direction adder 210 after being latched in a latch circuit 52. On the other hand, the main scanning direction variation $g_X$ is latched by a latch circuit 51, to be thereafter fetched by the main scanning data generator 110.

(A-3b) Structure of Main Scanning Direction Adder 110

Figure 6:
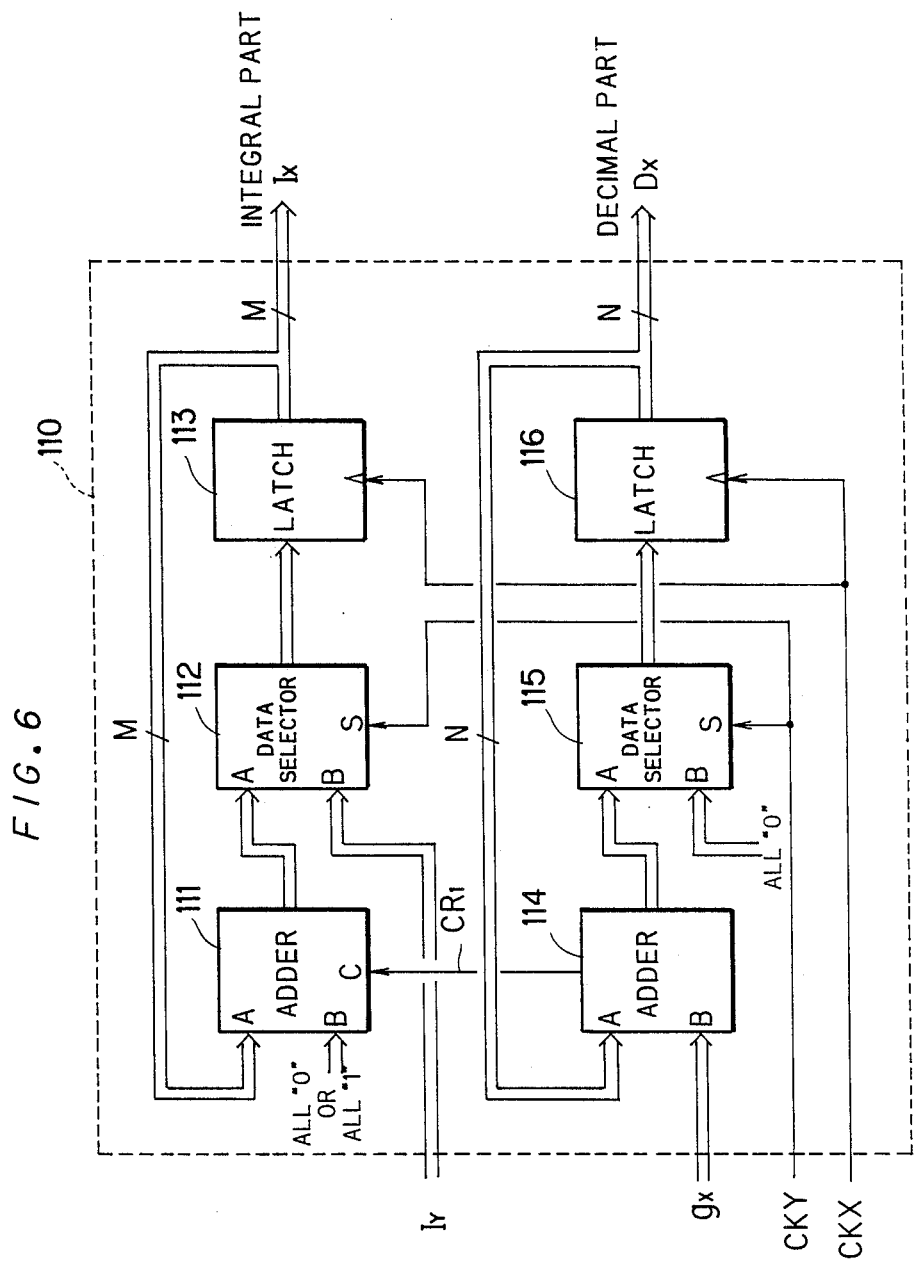
FIG. 6 and FIG. 7 are block diagrams showing the internal structure of a main scanning direction adder 100 and a subscanning direction adder 200, respectively.

FIG. 6 is block diagram showing internal structure of the main scanning direction adder 110. Circuits included in the main scanning direction adder 110, an adder 111, a data selector 112, and a latch circuit 113, are capable of processing data having data length corresponding to the data length of image data employed for the image recording. Therefore, when gradation is expressed by M bits when image recording, for example, these circuits are formed to process M bits.

On the other hand, adder 114, a data selector 115, and a latch circuit 116, are capable of processing arbitrary data lengths (e.g., N bits). A carry signal $CR_1$ outputted from the adder 114 serves as carry input for the adder 111, whereby the main scanning direction adder 110 is capable of processing data of (M+N) bits formed by higher order M bits and lower order N bits as a whole. For example, eight bits are assigned to M and N respectively.

Within these bits, the higher order M bits are employed for gradation expression in image recording, and the least significant bit thereof corresponds to the minimum unit of gradation expression. Thus, the higher order M bits are assigned integral parts of image data or gradation data. The lower order N bits are not directly included in the final image data, but are employed only for processing by the gradation-inclined image generator 20. Thus, the lower order N bits are assigned to decimal notation of the gradation data.

(A-3c) Structure of Subscanning Direction Adder 210

Figure 7:
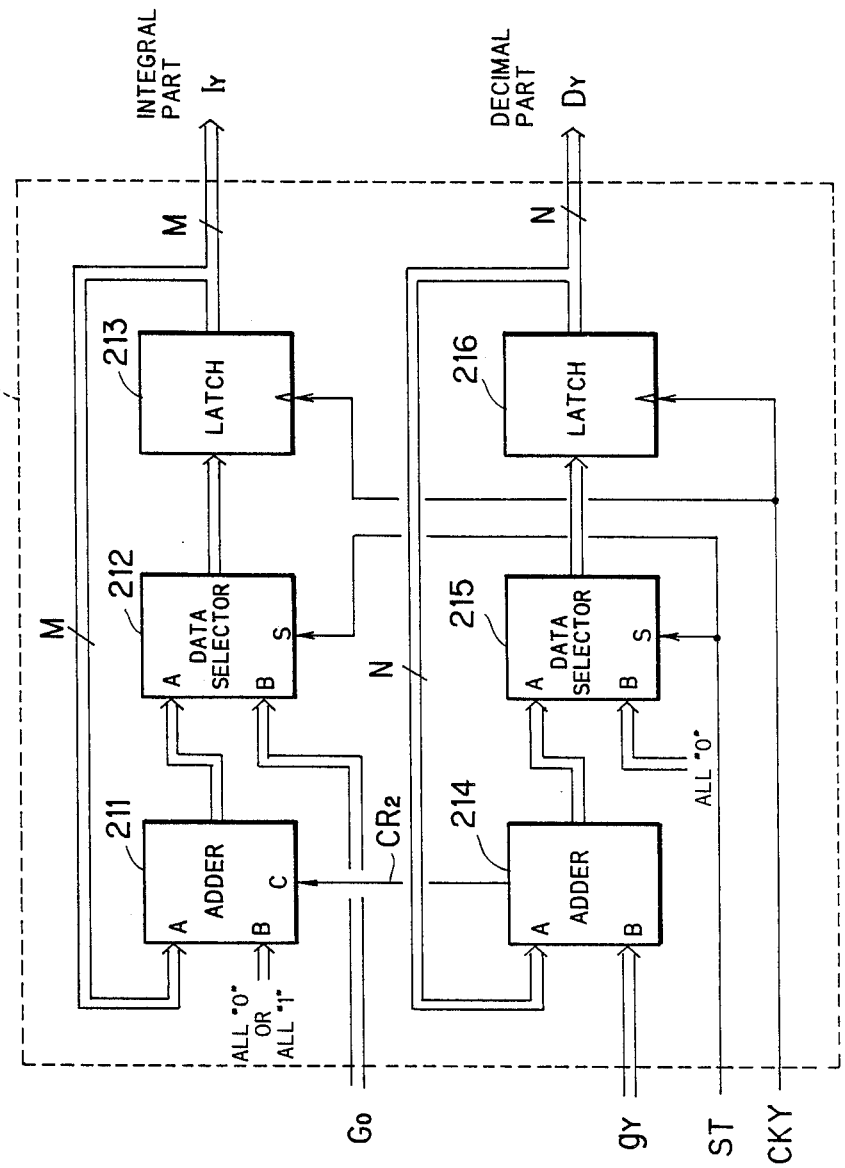

FIG. 7 is a block diagram internal structure of the subscanning direction adder 210. As can be seen from comparison of FIG. 7 with FIG. 6, subscanning direction adder 210 is similar in structure to the main scanning direction adder 110 of FIG. 6, differing only in data contents and operation timing. The subscanning direction adder 210 is provided with an adder 211, a data selector 212 and a latch circuit 213 for processing the integral portions of M bits. Further provided in the subscanning adder 210 are, an adder 214, a data selector 215 and a latch circuit 216 for processing the decimal parts of N bit.

(A-3d) Relation between Integral Parts and Decimal Parts

Figure 8A:
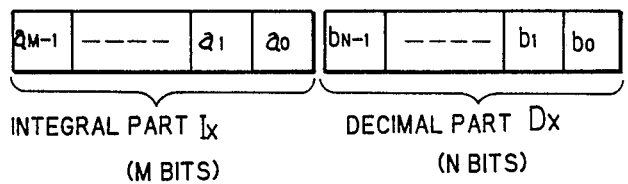
FIGS. 8A and 8B are diagrams showing the relation between integral parts and decimal parts.
Figure 8B:
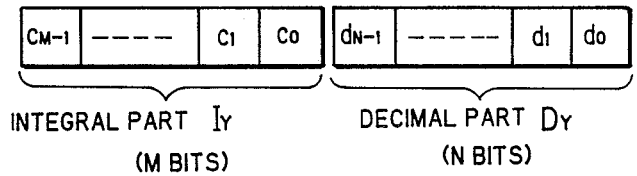

FIG. 8 shows relation between the integral parts and decimal parts. Namely, FIG. 8(a) expresses integral parts $I_x$ and decimal parts $D_x$ in the main scanning direction adder 110 respectively by M bit data:
$a_{M-1}, \ldots, a_1, a_0$ and N bit data:
$b_{N-1}, \ldots, b_1, b_0$ Further, FIG. 8(b) expresses integral parts $I_Y$ and decimal parts $D_Y$ in the subscanning direction adder 210 by M bit data:
$c_{M-1}, \ldots, c_1, c_0$
and N bit data:
$d_{N-1}, \ldots, d_1, d_0$ respectively.

(A-3e) Operation of Subscanning Direction Adder 210

Under this premise, description is now set forth concerning the operation of the subscanning direction adder 210. The gradation initial value $G_0$ in the subscanning direction adder 210 is supplied to the data selector 212 as B input thereof. Corresponding to M-bit signals as the image data for the image recording, the gradation initial value $G_0$ is also M bits. A recording start signal ST supplied from the control circuit 21 of FIG. 2 is employed as a selection signal in the data selector 212. The recording start signal ST is generated in response to closing a start switch (not shown) provided in the operation panel 23. When the recording start signal ST is supplied, the data selector 212 selects its B input, i.e., the gradation initial value $G_0$, to output to the latch circuit 213. This latch circuit 213 latches inputted data and supplies it to the A input of the adder 211. The B input of this adder 211 is supplied with:
"00 . . . 00" (M bits)
when gradation levels are sequentially raised in the subscanning direction Y, or when no gradation change with respect to the subscanning direction Y takes place. When the gradation levels are sequentially lowered along the subscanning direction Y,
"11 . . . 11" (M bits)
is supplied to the B input of the adder 211. Thus, when gradation change is provided only in the main scanning direction X as herein considered, the B input of the adder 211 is
"00 . . . 00".

The adder 211 adds up its inputs A and B with a carry signal $CR_2$ from the other adder 214, and supplies the result to the A input of the data selector 212. After starting the above operations, the recording start signal ST maintains an inactive level, and the data selector 212 selects its A input to output the same. This output is newly latched by the latch circuit 213.

Thus, the B input of the adder 211 and the carry signal $CR_2$ from the other adder 214 are repeatedly added to the gradation initial value $G_0$. The cycle period of the repeat operation is determined by latch timing of the latch circuit 213. The main scanning start clocks CKY are employed as the latch signal for determining this latch timing. Therefore, the repeating operation is performed only once in each main scanning.

On the other hand, the B input of the adder 214 is supplied with the subscanning direction variation $g_Y$. The adder 214 adds up the B input and A input supplied from a latch circuit 216, and supplies the result to the A input of the data selector 215. However, when a carry is caused by the addition, the carry signal $CR_2$ is supplied to the adder 211.

The B input of the data selector 215 is always supplied with: p1 "00 . . . 00" (N bits)
When the recording start signal ST serving as a selection signal is supplied, the B input is selected. The A input is selected in other cases. The data thus selected are latched by the latch circuit 216, to be supplied to the A input of the adder 214. The cycle of repetition is determined by the main scanning start clocks CKY which serve as the latch signal of the latch circuit 216.

Namely, the B input of the data selector 215 is fetched upon start up of to initialize a repeating loop, while the subscanning direction gradation variation $g_Y$ of N bits is sequentially added upon every completion of main scanning. When a carry is caused in the adder 214, this carry is reflected by the integral part $I_Y$ by the carry signal $CR_2$. The output of the latch circuit 216 is outputted as the decimal part $D_Y$.

Figure 9:
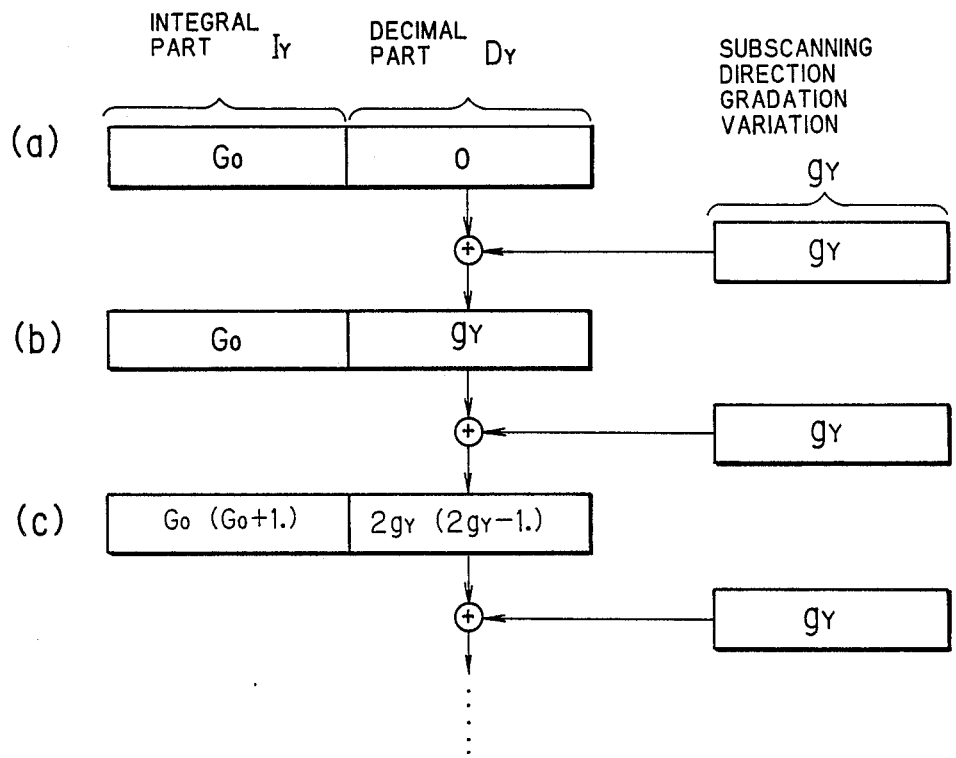
FIG. 9 is an explanatory diagram of operation for adding subscanning direction gradation variation to decimal parts.

The above description can be summarized as follows: Namely, subscanning direction adder 210 first fetches the gradation initial value $G_0$ as a value of the integral parts $I_Y$ to start the operation. (Shown in FIG. 9(a)). At this time, the decimal part $D_Y$ is initialized at "0". In a subsequent main scanning cycle, the subscanning direction gradation variation $g_Y$ is added to the decimal part to obtain $D_Y = g_Y$ (FIG. 9(b)). In main scanning cycle subsequent thereto, the subscanning direction gradation variation $g_Y$ is added to the decimal part $D_Y$ so that $D_Y = 2g_Y$ (FIG. 9(c)). A carry is caused when $2g_Y \geq 1$, so that the integral part $I_Y$ is ($G_0 + 1$.) and the decimal part $D_Y$ is ($2g_Y - 1$.). The operation is then repeated. However, since $g_Y = 0$ in case of the main scanning direction inclined halftone image herein considered, the decimal part $D_Y$ remains at "0" and the integral part $I_Y$ remains at $G_0$ even if the subscanning progresses.

Figure 10A:
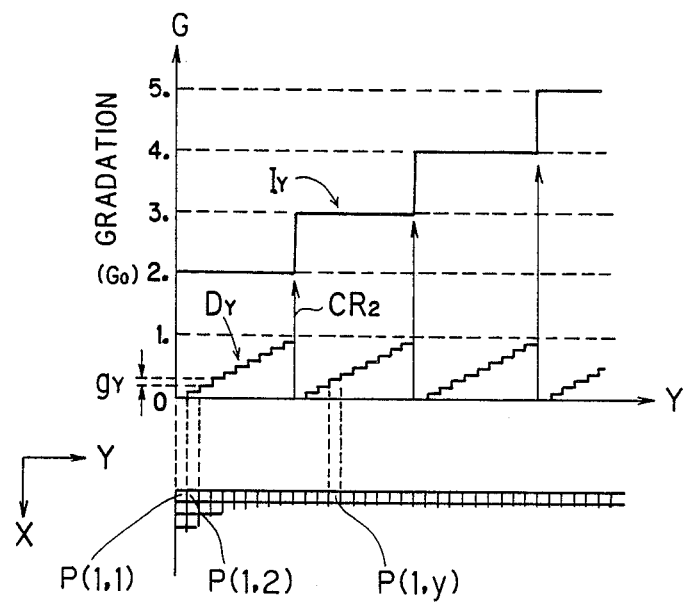
FIG. 10A and FIG. 10B are explanatory diagrams to explain the operation of the subscanning direction adder 200.

FIG. 10A illustrates the aforementioned operation when $g_Y \neq 0$ (hereinafter described) from another point of view. As can be seen in FIG. 10A, when respective pixels are indicated as P(x, y) by main scanning coordinates x and subscanning coordinates y, the decimal parts $D_Y$ assigned to the first pixels P(1, 1), P(1, 2), . . . on the respective main scanning lines are changed in value by the subscanning direction gradation variation $g_Y$ per scanning line. When the accumulated value thereof reaches "1.", the carry signal $CR_2$ is generated while the value of the decimal part $D_Y$ is returned to:
(accumulated value − 1.) FIG. 10A shows the case where the decimal part $D_Y$ is returned to "0".

On the other hand, the integral part $I_Y$ is incremented by (+1.) every time it receives the carry signal $CR_2$.

Figure 10B:
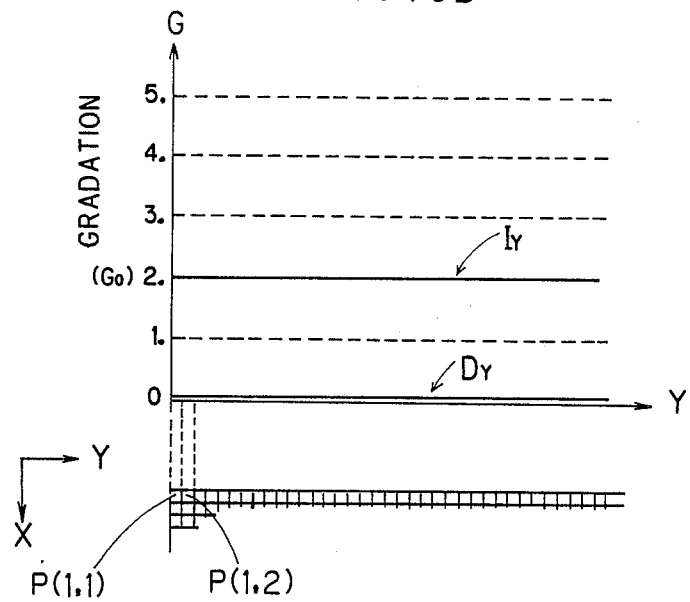

Since $g_Y=$"0" when generating the main scanning direction inclined halftone iamge as hereinabove described, the decimal part $D_Y$ is always "0" and the integral part $I_Y$ is always $G_0$ as shown in FIG. 10B. Therefore, when main scanning direction inclined halftome images, the subscanning direction adder 210 of FIG. 3 continuously ouptuts $I_Y=G_0$ and $D_Y=$"0".

(A-3f) Operation of Main Scanning Direction Adder 110

On the other hand, integral part $I_Y$ provided by the subscanning direction adder 210 is supplied to the main scanning direction adder 110 as an initial value for one scanning line. Main scanning direction adder 110 structure is shown in FIG. 6, as hereinabove described. The function thereof is substantially equal to that of the subscanning direction adder 210 shown in FIG. 7, differening only by the data content to be processed and the operation timing. The main scanning direction adder 110 functions as follows:

First, the loop formed by the adder 114, the data selector 115 and the latch circuit 116 is initialized at "0" (N bits) upon supply of the main scanning start clock signal CKY to the data selector 115. Thereafter, this loop sequentially adds the main scanning direction gradation variation $g_X$ to the initial value of each pixel in response to the pixel clocks CKX. When a carry occurs in the N-bit adder 114, the adder 114 generates a carry signal $CR_1$, and outputs it to the adder 111.

On the other hand, the loop formed by the adder 111, the data selector 112 and the latch circuit 113 fetches the integral part $I_Y$ supplied from the subscanning direction adder 210 as an initial value of one main scanning operation. The integral part $I_X$ is then circulated within this loop in synchronization with the pixel clocks CKX. When the carry signal $CR_1$ is generated, the integral part $I_X$ is incremented by (+1.). The B input of the adder 111 is then supplied with "all 0".

Figure 11B:
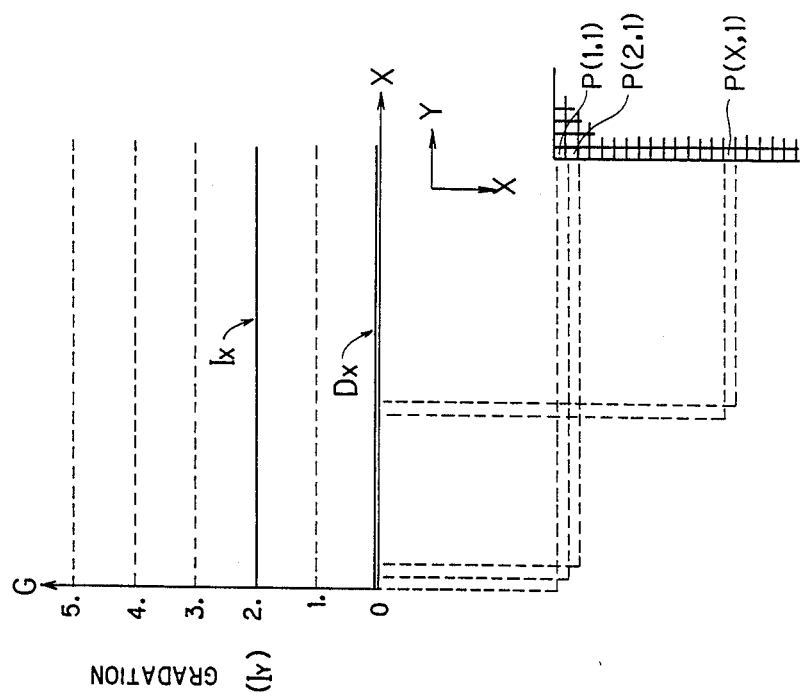
FIG. 11A anf FIG. 11B are diagrams to explain the operation of the main scanning direction adder 100.
Figure 11A:
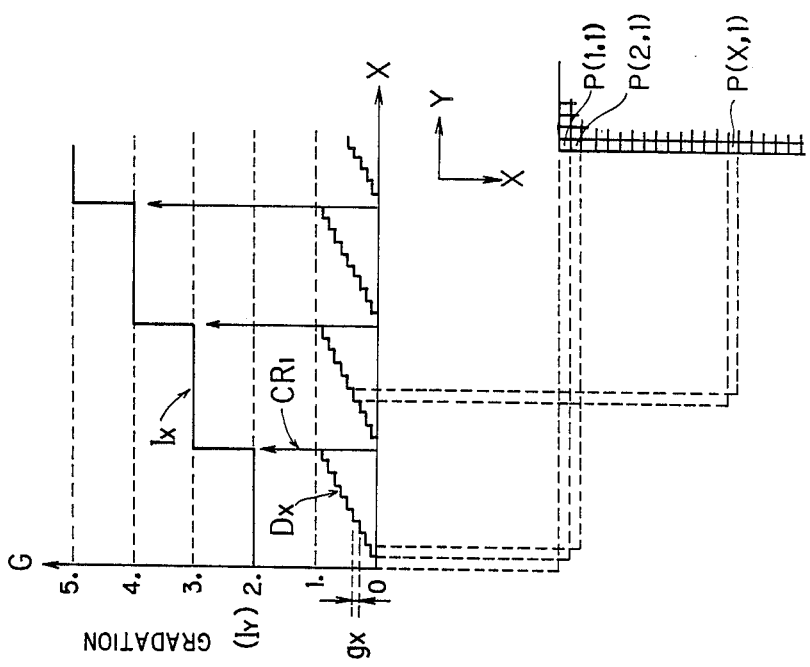

Therefore, the integral part $I_X$ and the decimal part $D_X$ of the output from the main scanning direction adder 110 are changed along the main scanning direction X, as shown in FIG. 11A. Gradation data for each pixel formed by the integral part $I_X$ and the decimal part $D_X$ are "first gradation data $S_1$", shown in FIG. 3A. The integral part $I_Y$ with respect to the subscanning direction Y is not changed even if subscanning progresses, when generating the main scanning direction inclined halftone image. In this case the change as shown in FIG. 11A is common to the respective main scanning lines.

(A-3g) Composition of Decimal Parts and Random Numbers

In the data thus generated, the decimal parts $D_X$ and $D_Y$ are supplied to the adders 55 and 56 of FIG. 3B respectively. Other inputs (B inputs) of these adders 55 and 56 are supplied with N-bit random numbers $RD_X$ and $RD_Y$ from random number generators 59 and 60 respectively. FIG. 12 shows the structure of the random number generator 59 and 60. Referring to FIG. 12, data signals with parenthesis refer to the random number generator 60 and without parenthesis are data with respect to the other random number generator 59.

As can be seen in FIG. 12, each of the random number generators 59 and 60 has a counter 61 and a ROM 62. The ROM 62 is adapted to receive the output of the counter 61 as address signals AR. The ROM 62 previously stored N-bit random numbers in a table system.

With respect to the random number generator 59, the main scanning start clocks CKY are inputted as clock signals to the counter 61. The counter 61 counts up (or counts down) by one every time one main scanning operation is completed, to supply a new address signal AR to the ROM 62. Initialize signal CLR of the counter 61 is always "1 (not cleared)". Therefore, the random number generator 59 outputs a random number $RD_X$ which is common on one scanning line and updated to a new value upon each complete main scanning operation.

Referring to random number generator 60, the pixel clocks CKX are clock signals for the counter 61, and main scanning start clocks CKY are inputted as initialize signal CLR. The random number generator 60 then generates a random number $RD_Y$ which is changed pixel by pixel with respect to the main scanning direction X with a cycle period of one main scanning operation.

FIGS. 13A and 13B show examples of such random numbers expressed in decimal numbers. As shown in FIG. 13A, the random numbers $RD_X$ outputted from the random number generator 59 have the same values as pixels having identical subscanning coordinates Y. As shown in FIG. 13(b), random numbers $RD_Y$ outputted from the other random number generator 60 have the same values as pixels having identical main scanning coordinates X.

The random numbers $RD_X$ are input to the adder 55 of FIG. 3B, to be added to the decimal parts $D_X$ for each pixel.

Figure 14A:
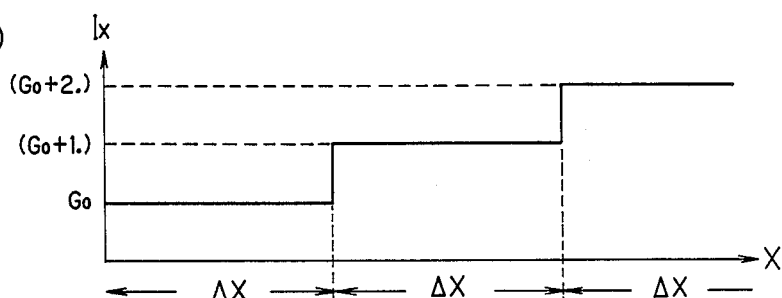
FIG. 14 is a diagram showing data change in generation of the main scanning direction inclined halftone image.
Figure 14B:
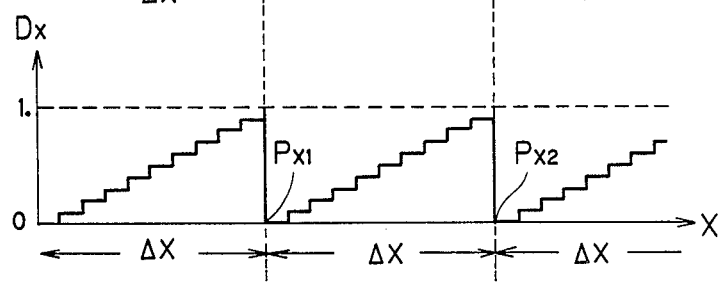
Figure 14C:
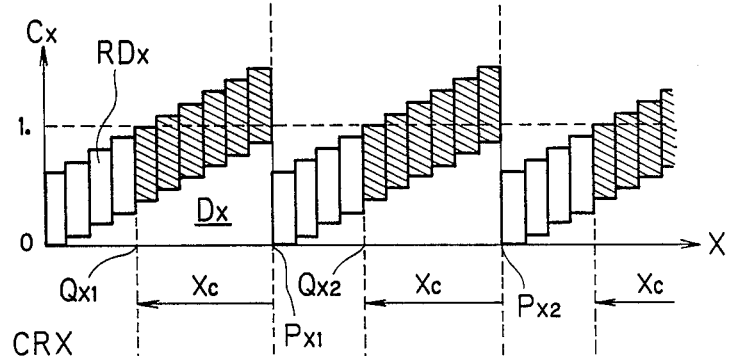

FIG. 14(c) shows the composition process of this addition. Namely, in the generation of a main scanning direction inclined halftone image, the same random number values $RD_X$ are added to the decimal parts $D_X$ for respective pixels along the main scanning direction X, in order to generate composition values $C_X$. As shown in FIG. 14(b), the decimal parts $D_X$ are linearly incremented to the value "1", and the composition values $C_X$ are correspondingly linearly increased. At a certain pixel $Q_{X1}$ included in an interval $\Delta X$ (FIG. 14(b)) where a decimal part $D_X$ is increasing from zero to "1.", the composition value $C_X$ reaches "1." The value "1." serves as a reference value for pixel $Q_{X1}$.

Figure 14D:
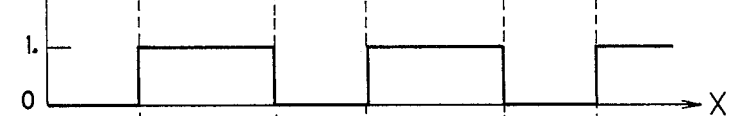
Figure 14E:
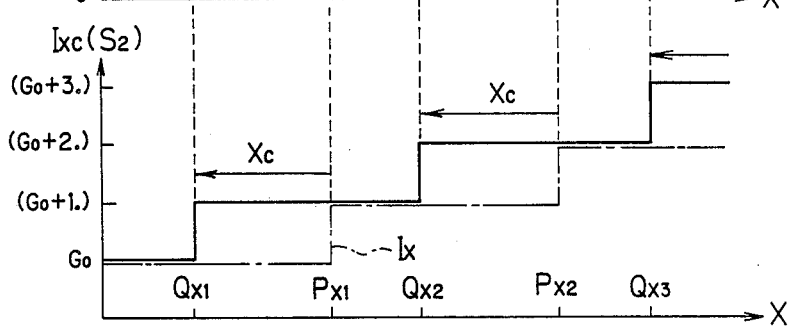

The adder 55 outputs the carry signals CRX with respect to the pixel $Q_{X1}$ pixels thereafter. The carry signals CRX are continuously outputted until the decimal part $D_X$ itself reaches a pixel $P_{X1}$ (FIG. 14(b) and 14(c)) and where the decimal part $C_X$ reaches "1." causing a carry to an integral part $I_X$. FIG. 14(d) shows the generation of such carry signals CRX.

On the other hand, the other adder 56 also functions to generate decimal parts $D_Y$ and random numbers $RD_Y$ with respect to the subscanning direction Y. However, since the decimal part $D_Y$ is always "0" when in a main scanning direction inclined halftone image, the composition value $C_Y$ is always smaller than "1." even if the random number $RD_Y$, which is an N-bit decimal number, is composed with the decimal part $D_Y$. In this case, no carry signals CRY are generated from the adder 56.

(A-3h) Modification of Integral Parts

The carry signals CRX generated by the adder 55 become carry signals $CR_3$ through an AND circuit 57, and become carry input to the adder 53. The A input of the adder 53 is supplied with the integral parts $I_X$ from the main scanning direction adder 110, while the B input is input "00 . . . 00" (M bits). Therefore, the adder 53 adds up the integral parts $I_X$ and the carry signals $CR_3$, to output the results of addition as M-bit signals $I_{XC}$.

Further, a carry signal $CR_4$ is generated when both a carry occurs in the adder 53, and a signal obtained by inverting the carry signal $CR_4$ is supplied to the AND circuit 57. Therefore, the output $CR_3$ of the AND circuit 57 becomes "0" when a carry occurs in the adder 53, otherwise, $CR_3 = CRX$. This structure prevents the adder 53 from overflowing caused by the addition of the carry signal CRX to the value of the integral part $I_X$ when the integral part $I_X$ is $(2^M - 1.)$. Therefore, $CR_3 = CRX$ in most cases, and the following description is made on the assumption that the carry signal $CR_3$ is identical to the carry signal CRX.

When the adder 53 performs such addition, the integral part $I_X$ shown in FIG. 14(a) is incremented by "1." to an integral part $I_{XC}$ in pixels when the carry signals CRX are generated. As seen from comparison of FIGS. 14(a) and 14(c), tone jump positions $Q_{X1}$, $Q_{X2}$, . . . of the new integral part $I_{XC}$ are shifted by this modification by a distance $X_C$ with respect to tone jump positions $P_{X1}$, $P_{X2}$, . . . in the original integral part $I_X$. Each increment with respect to the respective tone jump points is the same amount $X_C$ since the same value is employed as the random number $RD_X$ on one scanning line. Therefore, the interdistance between each pair of neighbouring tone jump points in the new integral value $I_{XC}$ is identical to the interdistance $\Delta X$ between each pair of neighbouring tone jump points in the original integral value $I_X$.

When the gradation values are expressed by symbols as shown in FIG. 15, distribution of the integral part $I_X$ of FIG. 16(a) is uniformly shifted by the distance $X_C$ in a direction $(-X)$ opposite the main scanning direction X, to become the distribution of the integral part $I_{XC}$ shown in FIG. 16(b). Note that pixels are shown in rectangular configuration in FIG. 16(a) for convenience of illustration.

The new integral part $I_{XC}$ thus obtained is input to the adder 54 of FIG. 3 as the A input thereof. The B input of the adder 54 is "00 . . . 00" (M bits) similar to the adder 53. Further, a carry signal $CR_5$ obtained by passing the carry signal CRY from the adder 56 through the AND circuit 58 is the carry input of the adder 54. A carry signal $CR_6$ of the adder 54 is inverted to be the second input of the AND circuit 58 for preventing overflow, similar to the AND circuit 57 as hereinabove described.

However, no carry signals CRY are generated in the case of the main scanning direction inclined halftone image. Therefore, substantial additions are not performed by the adder 54, but M-bit gradation data $S_2$ ("second gradation data") outputted from the adder 54 is the same value as the modified integral part $I_{XC}$.

This operation occurs with respect to each pixel on each scanning line, and the random number $RD_X$ supplied to the adder 55 is changed to a new value upon completion of main scanning. Therefore, the positions $Q_{X1}$, $Q_{X2}$, . . . where the composition value $C_X$ reaches "1." as shown in FIG. 14(c) are changed for each scanning line.

Refer to FIGS. 17 and 18 for the following. On a scanning line with a relatively small random number $RD_X$ value (FIG. 17), the number of pixels, where the composition value $C_X$ is more than the reference value "1.", is increased, and the discrepancy $X_C$ between spatial distribution of the gradation data $S_2$ and the original integral part $I_X$ is reduced. On the other hand, the discrepancy $X_C$ is increased on a main scanning line with a relatively large random number $RD_X$ value, as shown in FIG. 18.

The range of change in discrepancy $X_C$ is determined as follows: First, when $RD_X = 0$, no carries are caused in the adder 55 of FIG. 3, whereby no carry signals CRX are generated and the discrepancy $X_C$ remains zero. When $RD_X$ is $(1. - 2^{-N})$, (the maximum value thereof), a carry is caused when the decimal part $D_X$ exceeds $2^{-N}$. Therefore, the carry signal CRX is generated immediately after the integral part $I_X$ is incremented by the carry signal $CR_1$ of FIG. 6. Therefore, by employment of a random number having the decimal value of random number $RD_X$, the discrepancy $X_C$ is changed within the range of:

$$0 \leq X_C \leq \Delta X$$

Figure 19A:
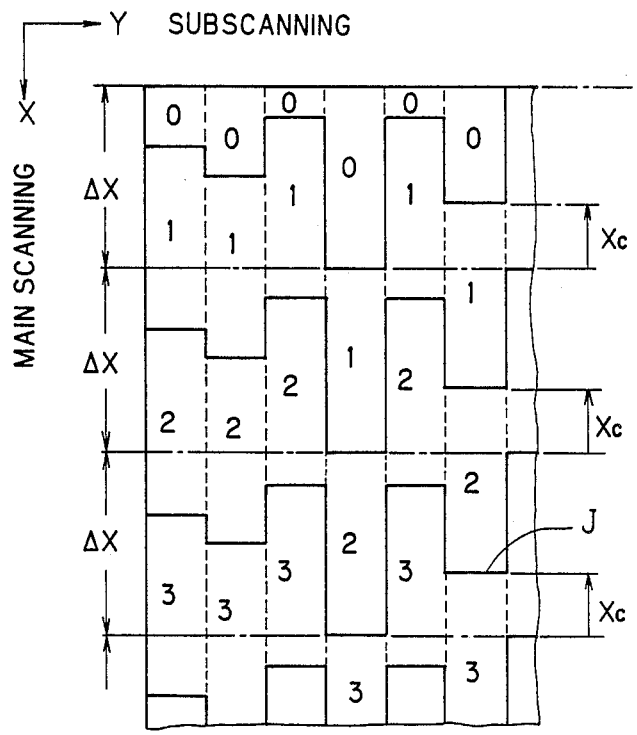
FIG. 19A is a schmatic diagram showing an example of spatial distribution of second gradation data obtained in case of generating a main scanning direction inclined halftone image through the first embodiment of the present invention.

FIG. 19A shows an example of spatial distribution of the second gradation data $S_2$ thus obtained. Symbols in FIG. 19A are identical to those employed in FIG. 15. Since the values of the random numbers $RD_X$ are varied with the respective scanning lines, a tone jump position J for example, between $(G_0 + 2.)$ and $(G_0 + 3.)$, is randomly varied by scanning line position (i.e., subscanning coordinates Y) in a range within $\Delta X$. (This also applies to other tone jump positions.) Therefore, tone jump points are randomly dispersed in space when image data for halftone dot recording is generated on the basis of second gradation data $S_2$. Thus, tone jumps are hardly recognized in visualization of the recorded image. The amount of discrepancy $X_C$ is identical on one main scanning line, whereby the spatial change rate of gradation maintains the designated value.

Spatial dispersion of the tone jump points is performed with substantially equal probability within a range of $0 \leq X_C \leq \Delta X$ by the random character of the random numbers $RD_X$. Thus, a new rule caused in dispersion of the tone jump points such that the tone jump points are undesirably arrayed in a specific oblique direction is not possible.

(A-3i) Composition of Random Numbers to Second Gradation Data

In this particular embodiment, another random number is generated in conjunction with the second gradation data $S_2$ in order to further eliminate the influence of tone jumps. Namely, the second gradation data $S_2$ obtained in the aforementioned manner is input to an M-bit adder 70 in FIG. 3. Then a random number RD generated in a random number generator 71 for each pixel and the second gradation data $S_2$ are added in the adder 70. Random number RD has an integral value of data length of about M/3, for example.

Third gradation data $S_3$, which make presence of the tone jump points further unrecognizable, are thus obtained.

The level of the third gradation data $S_3$ is increased by about $2^{(M/3-1)}$ in average as compared with the second gradation data $S_2$, and hence the gradation initial value $G_0$ may be lowly set to cancel the change of the average gradation level.

(A-3j) Averaging Processing

When random number RD is generated in conjunction with the gradation data $S_2$, the gradation of the image is irregularized to some extent pixel by pixel. In order to remove this irregularity and obtain a smooth recording image, the third gradation data $S_3$ is supplied to an averaging circuit 80 of FIG. 3. Spatial averaging processing occurs in the averaging circuit 80.

FIG. 20 is a block diagram showing internal structure of the averaging circuit 80. Referring to FIG. 20, the third gradation data $S_3$ is sequentially transferred pixel by pixel to latch circuits 81 and 82 in synchronization with the pixel clocks CKX. In the illustrated point in time, gradation data on three pixels $G_{n-1}$, $G_n$ and $G_{n+1}$ (FIG. 21), continuous along the main scanning direction X, are sequentially transferred to the latch circuits 81 and 82. The gradation data on the pixels $G_n$ and $G_{n-1}$ are latched by the latch circuits 81 and 82 respectively. This data is hereafter referred to as $G_{n-1}$, $G_n$ and $G_{n+1}$.

The data $G_{n+1}$ supplied to the latch circuit 81 and the data $G_{n-1}$ latched by the latch circuit 82 are transferred to an M-bit adder 83 and added. As shown in FIG. 22, only higher order (M−1) bits within M-bit data, the result of the addition, are fetched and a carry signal $CR_8$ from the adder 83 is added to the higher order side thereof, to be supplied to the B input of an adder 84 of a subsequent stage. Therefore, $$(G_{n-1}+G_{n+1})/2$$

is inputted in the B input of the adder 84.

On the other hand, the data $G_n$ outputted from the latch circuit 81 is input to the A input of the adder 84. The adder 84 adds up the A and B inputs, and the result of addition and a carry signal $CR_9$ are assembled in a format similar to FIG. 22, to be input to the A input of a data selector 85. Therefore, the A input of the data selector 85 is:

$$[G_n+(G_{n-1}+G_{n+1})/2]/2=(G_{n-1}+2G_n+G_{n+1})/4$$

It is evident that the A input is equal to double the average:

$$[(G_{n-1}+G_n)/2+(G_n+G_{n-1})/2]/2$$

of the data $G_{n-1}$, $G_n$ and $G_{n+1}$.

On the other hand, the carry signal $CR_7$ of the adder 70 of FIG. 3 is employed as the selection signal for the data selector 85. When the carry signal $CR_7$ is inactive level, the A input of the data selector 85 is output to the image processing circuit 17 of FIG. 2 as the image data S. Therefore, the averaging circuit 80 performs averages the third gradation data $S_3$ with the processing unit of spatial region formed by three pixels sequentially adjacent in the main scanning direction.

When the carry signal $CR_7$ is input from the adder 70 of FIG. 3, the data selector 85 of FIG. 20 selects "11 . . . 11" (M bits), as the B input thereof, to ouput the same as the image data S, and prevents overflow of the averaging circuit 80.

A main scanning direction inclined halftone image with unrecognizable tone jumps is then recorded on the photosensitive material 4 by the aforementioned processing.

(A-4) Generation of Subscanning Direction Inclined Halftone Image

When of generating a subscanning direction inclined halftone image, the main scanning direction gradation variation $g_X$ is set to zero and the subscanning direction gradation variation $g_Y$ is set at a desired value corresponding to the image to be recorded. Then the subscanning direction adder 210 performs the processing shown in FIG. 10A. The integral part $I_Y$ obtained as the result is transferred to the main scanning direction adder 110. Since the main scanning direction gradation variation $g_X$ is zero, the main scanning direction adder 110 performs no substantial operations, but continuously outputs $I_X=I_Y$ and $D_X=0$ as shown in FIG. 11B.

Since $D_X=0$, no carry signals CRX are generated when the adder 55 of FIG. 3 adds the random number $RD_X$ to the decimal part $D_X$. Therefore, $I_{XC}$ outputted from the adder 53 has the same value of integral part $I_X$.

On the other hand, decimal parts $D_Y$ varied with the main scanning lines are inputted to the A input of the adder 56 of FIG. 3, as shown in FIG. 10A. Therefore, the decimal part $D_Y$ is a constant value on one main scanning line. The random number $RD_Y$ supplied from the random number generator 60 is added to the decimal part $D_Y$. Since the random number generator 60 generates the random numbers $RD_Y$ in synchronization with the pixel clocks CKX as hereinabove described, the random numbers $RD_Y$ have values varied with pixels.

Figure 23:
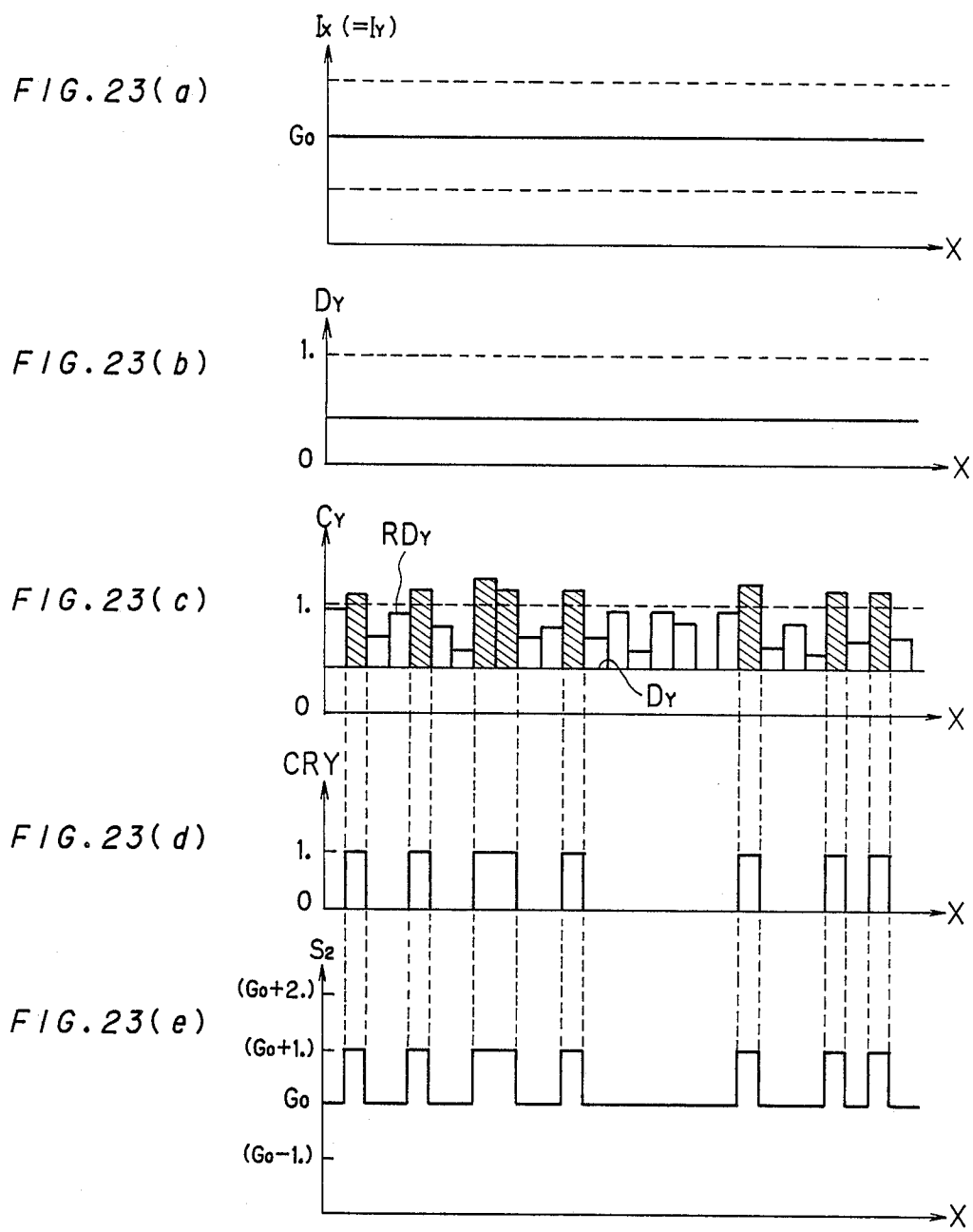
FIG. 23 and FIG. 24 are diagrams showing data change in the main scanning direction and the subscanning direction in generation of a subscanning direction inclined halftone image respectively.

When attention is drawn to one main scanning line, the random number $RD_Y$ for each pixel is composed with the constant value of the decimal part $D_Y$ shown in FIG. 23(b), so that a composition value $C_Y$ shown in FIG. 23(c) is obtained. In pixels having the composition values reading or exceeding "1.", the carry signals CRY are outputted from the adder 56 of FIG. 3. The example of carry signals CRY is illustrated in FIG. 23(d).

The carry signals CRY are supplied to the adder 54 as carry signal $CR_5$ through an AND circuit 58 of FIG. 3. Therefore, the adder 54 adds the carry signals CRY to the integral parts $I_X$ of FIG. 23(a) to output gradation data $S_2$ as illustrated in FIG. 23(e). As evident in FIG. 23(e), the gradation data $S_2$ comprise a waveform obtained by randomly adding the carry signals CRY having a level of unit amount "1." on the integral parts $I_X$.

Figure 24:
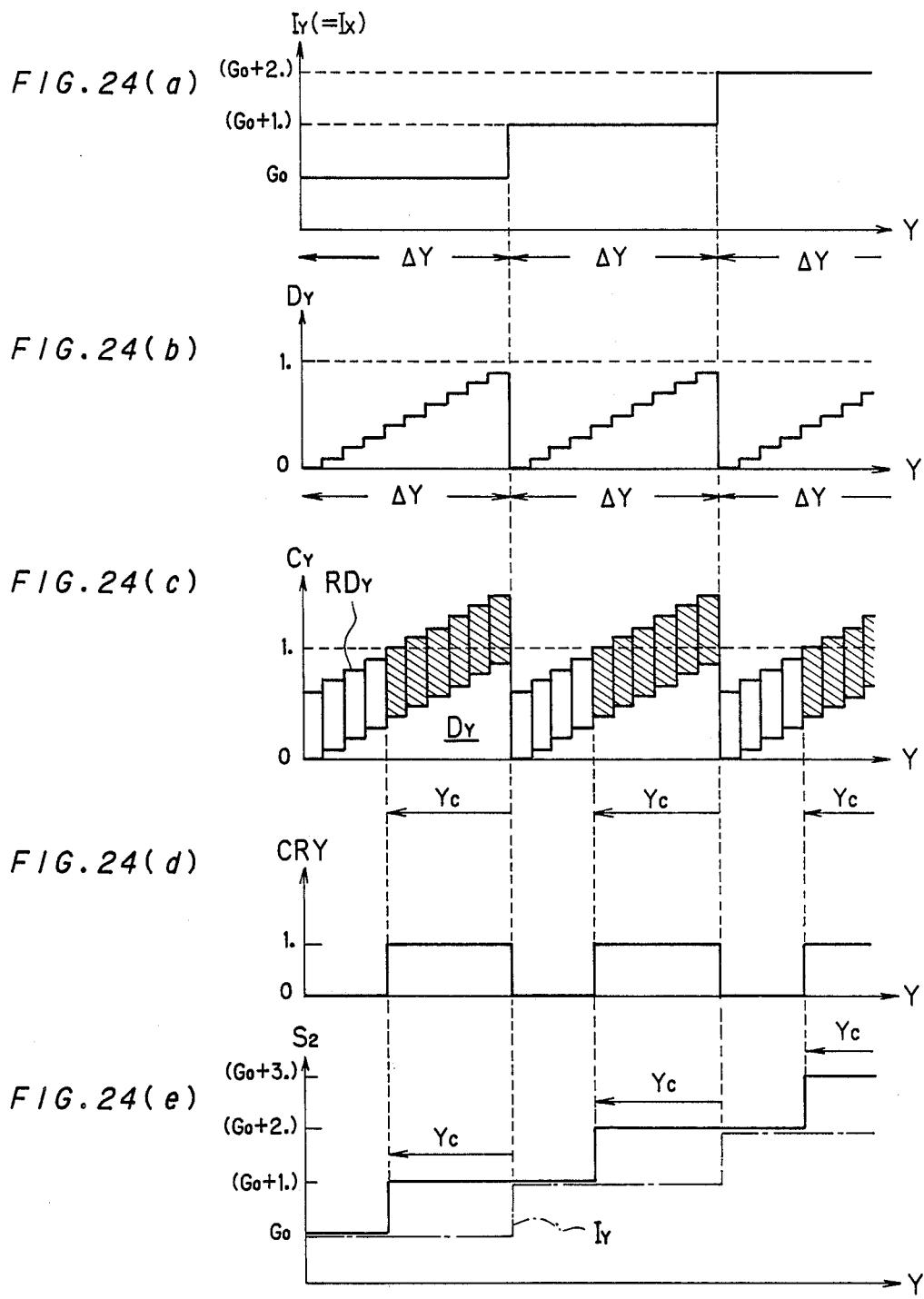

When generation of such second gradation data $S_2$ is completed with respect to pixels on one scanning line, the process is advanced to second generation of gradation data $S_2$ for a subsequent main scanning line. With respect to a pixel array having identical main scanning coordinates, the integral parts $I_Y$ and the decimal parts $D_Y$ are changed with progress of subscanning as shown in FIG. 10A. Identical values are supplied as the random numbers $RD_Y$ with respect to pixels having identical main scanning coordinates. Therefore, the respective waveforms are as shown in FIG. 24 when viewed along the subscanning direction.

Namely, the random numbers $RD_Y$ having identical values are supplied to the pixels having identical main scanning coordinates by initializing the random number generator 60 of FIG. 3 upon completion of each main scanning operation, whereby the integral parts $I_Y$ are displaced by the same distance $Y_C$ along the subscanning direction Y with respect to one main scanning coordinate, to give the second gradation data $S_2$. Such discrepancy $Y_C$ is randomly varied with the main scanning coordinates.

Figure 19B:
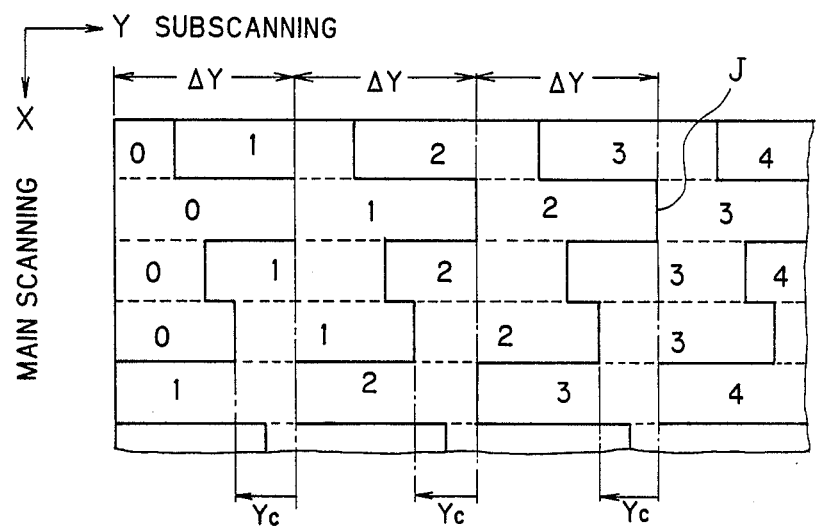
FIG. 19B is a schmatic diagram showing an example of spatial distribution of second gradation data in generation of a subscanning direction inclined halftone image.

The second gradation data $S_2$ thus obtained has the spatial distribution as shown in FIG. 19B, for example. Thus, the tone jump points J are distributed in a range within an interdistance $\Delta Y$ between each pair of original tone jump points in the integral parts $I_Y$ along the subscanning direction Y, so that the tone jumps are hardly recognized.

While the random number processing by the adder 70 and the averaging processing by the averaging circuit 80 of FIG. 3 are also performed to generate the subscanning direction inclined halftone image, description is omitted since the processing is similar to that of generating the main scanning direction inclined halftone image.

(A-5) Generation of Gradation Inclined Halftone Image Whose Gradation Levels are Changed in Arbitraly Direction In this case, finite values are supplied to both the main scanning direction gradation variation $g_X$ and the subscanning direction gradation variation $g_Y$ of FIG. 3. Then, both the main scanning direction adder 110 and the subscanning direction adder 210 perform addition. Both of the carry signals CRX and CRY are also generated.

Figure 25:
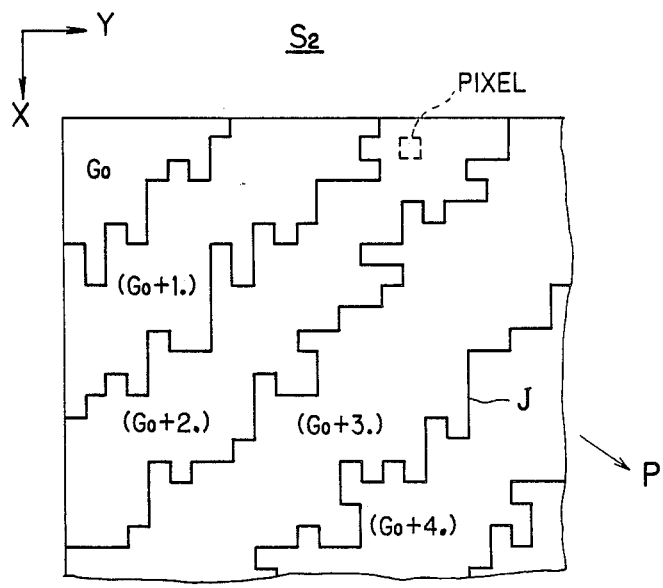
FIG. 25 is a diagram schmatically showing spatial distribution of second gradation data in generation of a gradation-inclined halftone image in an arbitrary direction.

Therefore, the spatial distribution of the second gradation data $S_2$ is randomly displaced in both of the main scanning direction X and the subscanning direction Y. FIG. 25 is a diagram example. As shown in FIG. 25, the tone jump positions J are randomly distributed, whereby the influence by tone jumps can be effectively prevented.

(A-6) Inclined Halftone Image Whose Gradation Levels are Decreased along Main Scanning Direction X While the inclined halftone image whose gradation levels are increased along the main scanning direction X has been described, the following process is followed in the case of an inclined halftone image whose gradation levels are decreased along the main scanning direction X. First, the B input of the adder 111 included in the main scanning direction adder 110 of FIG. 6:

"11 ... 11" (M bits)

is inputted. Then the data "11 ... 11" is added to the integral part $I_X$ every time the pixel clock signal CKX is input to the latch circuit 113.

As well known in the art, addition of "11 ... 11" (M bits) is equivalent to subtraction of "00 ... 01" (M bits), which is two's complement with respect to this data. Therefore, the integral part $I_X$ is decremented by (−1.) when no carry signals $CR_1$ are generated. When the carry signal $CR_1$ is generated, the contrary

"11 ... 11" + $CR_1$

= "11 ... 11" + "00 ... 01"

= "00 ... 00"

holds, and hence the integral part $I_X$ retains the value immediately ahead thereof.

On the other hand, two's complement with respect to an absolute value to be decremented along the main scanning direction X is provided as the main scanning direction gradation variation $g_X$. When, for example, the gradation level is decremented by "00 ... 01" (N bits) as a decimal value with respect to one pixel, it is assumed that:

$g_X$ = "11 ... 11" (N bits)

Then the adder 114 of FIG. 6 substantially performs subtraction of "00 ... 01" (N bits) in each pixel. As the result, the adder 114 repeats the following arithmetic:

"00 ... 00" + $g_X$ = "11 ... 11"

"11 ... 11" + $g_X$ = "11 ... 10" + $CR_1$

"11 ... 10" + $g_X$ = "11 ... 00" + $CR_1$

...

"00 ... 01" + $g_X$ = "00 ... 00" + $CR_1$

"00 ... 00" + $g_X$ = "11 ... 11"

...

In this example, therefore, a pixel generating no carry signal $CR_1$ appears in every $2^N$ pixels, in which the integral part $I_X$ is decremented.

By this change of the integral parts $I_X$ and the decimal parts $D_X$, the waveform shown in FIG. 14 becomes that shown in FIGS. 26(a) to (e). Thus, the influence of tone jumps can also be effectively prevented in halftone images with decreased gradation levels. When the inclined halftone image is decreased in gradation in the subscanning direction, "11 ... 11" may be supplied to the B input of the adder 211 of FIG. 7.

B. Modifications of the First Embodiment

While the random numbers $RD_X$ and $RD_Y$ having the value range of:

$(1. - 2^{-N}) > RD_X, RD_Y \geq 0$ have been employed in the first embodiment as the random numbers to be generated in conjunction with the decimal parts, random numbers of other value ranges can be employed. When random numbers of small values are employed, no carriers are caused unless the values of the decimal parts $D_X$ and $D_Y$ are increased to some extent, whereby the maximum values of descrepancy amounts $X_C$ and $Y_C$ of FIGS. 14 and 24 are smaller than $\Delta X$ and $\Delta Y$ respectively. Such a modification is effective when the amounts $X_C$ and $Y_C$ of discrepancy are small.

Figure 27:
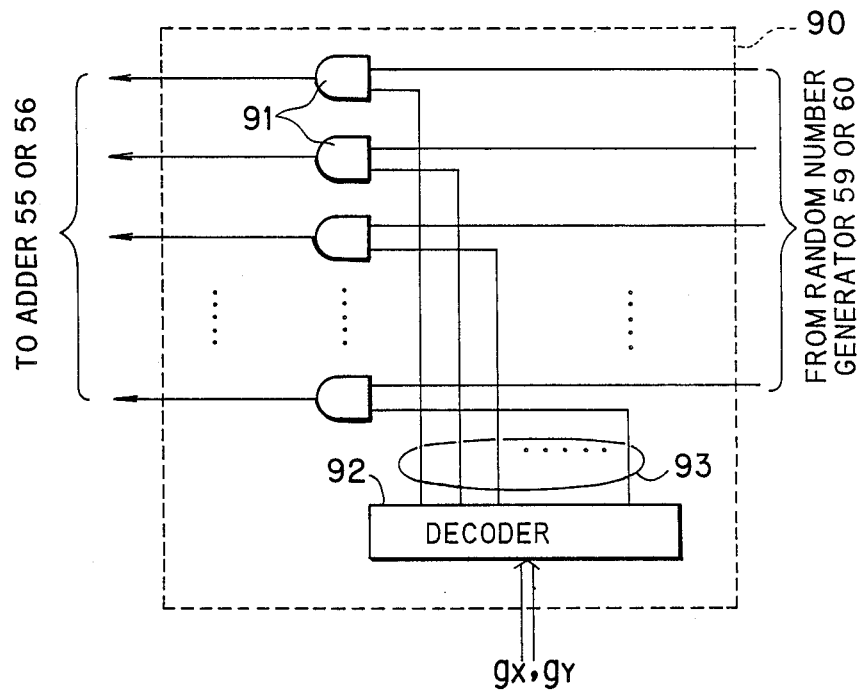
FIG. 27 is a block diagram showing a random number gate circuit for making the data length of random numbers variable.
Figure 26A:
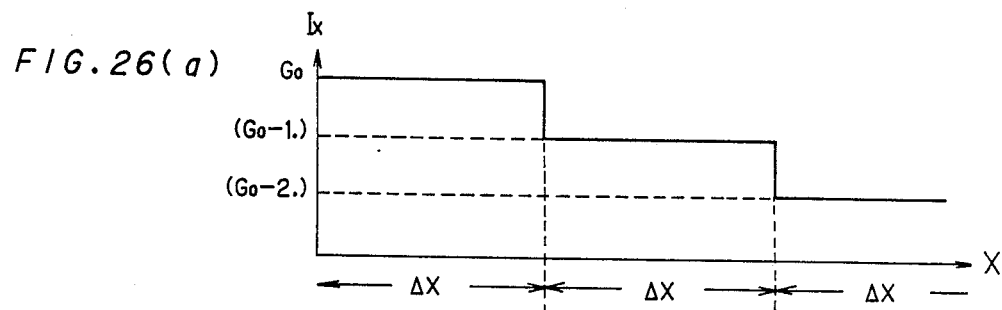
FIG. 26 is an explanatory diagram of operation for generating a halftone image with decreased gradation levels.
Figure 26B:
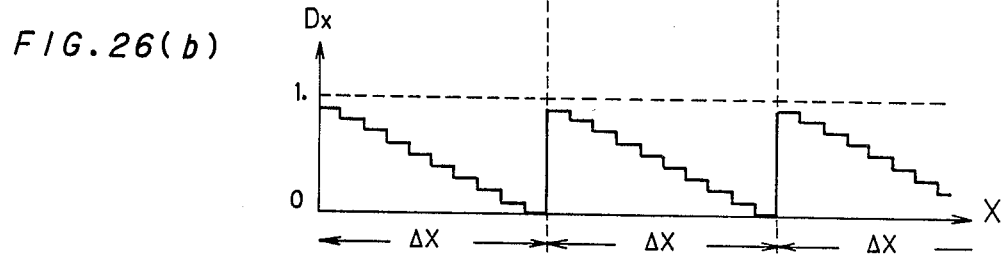
Figure 26C:
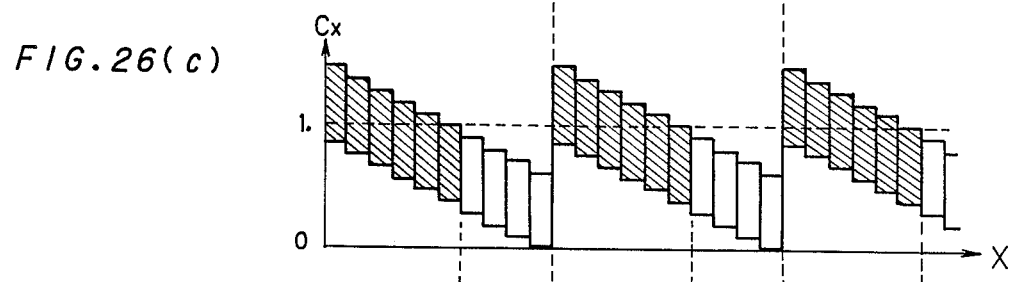
Figure 26D:
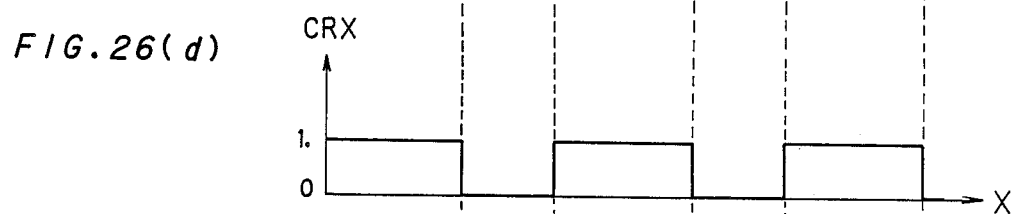
Figure 26E:
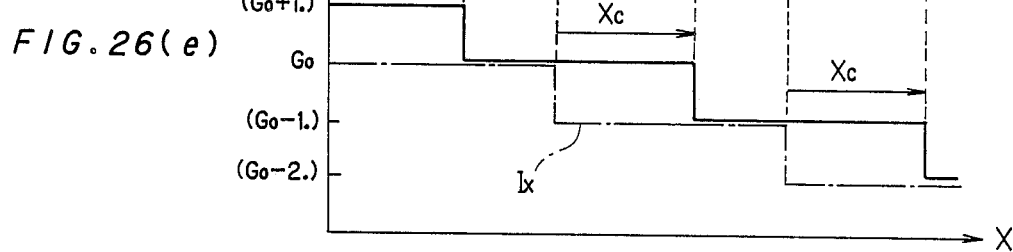

Further, the random numbers can be made variable in data length in response to the main scanning direction gradation variation $g_X$ and the subscanning direction gradation variation $g_Y$. In this case, random numbers having large data lengths are stored in the random number generators 59 and 60. Then, a random number gate array 90 shown in FIG. 27 is provided so that respective bits of the random numbers from the random number generators 59 and 60 are inputted to an AND circuit 91 in gate array 90. The other input of the AND circuit 91 is supplied with a decode signal 93 from a decoder 92.

This decoder 92 receives the main scanning direction gradation variation $g_X$ or the subscanning direction gradation variation rate $g_Y$, and generates the decode signal 93, wherein the number of bits in an active level is increased as the values $g_X$ and $g_Y$ are reduced. This decode signal 93 selects the passing bit width successively from the lower order side of the inputted random numbers. The random numbers formed by the bit width thus selected are input to the adders 55 and 56 of FIG. 3.

Therefore, when, for example, the main scanning direction gradation variation $g_X$ is relatively small, random numbers having a relatively wide value area are generated in conjunction with the decimal parts $D_X$, whereby the range of generation of the carry signals CRX is widened. On the other hand, the fact that the main scanning variation $g_X$ is small means that the gradation changing period $\Delta X$ of the integral parts $I_X$ is large and the tone jumps are easily recognized. Therefore, when the carry signals CRX are generated in a wide range in the aforementioned manner the randomness of the tone jumps is increased, and the influence by tone jumps is effectively prevented.

However, the maximum value of displacement of the gradation data $S_2$ is also $\Delta X$ in the first embodiment, whereby the change period $\Delta X$ of the integral parts $I_X$ is increased when the main scanning direction gradation variation $g_X$ is small, so that the range of random distribution is automatically widened. Therefore, this modification may be applied only in a particular requrement.

Generation of the decimal parts and the random numbers can take place in a subtractor while modifying the integral parts through borrow signals. Further, it is not indispensably required to generate the image data S in an on-line manner, but the image data S may be generated off-line, to be stored in a mass storage memory such as a magnetic disk. It is also possible to transmit the image data S thus obtained to other locations by telecommunications to be processed later.

Although the halftone dot generator 18 is employed in the first embodiment shown in FIG. 2, it is not indispensable to employ the halftone dot generator 18, as continuous recording can be performed using image data.

C. Second Embodiment

Figure 28A:
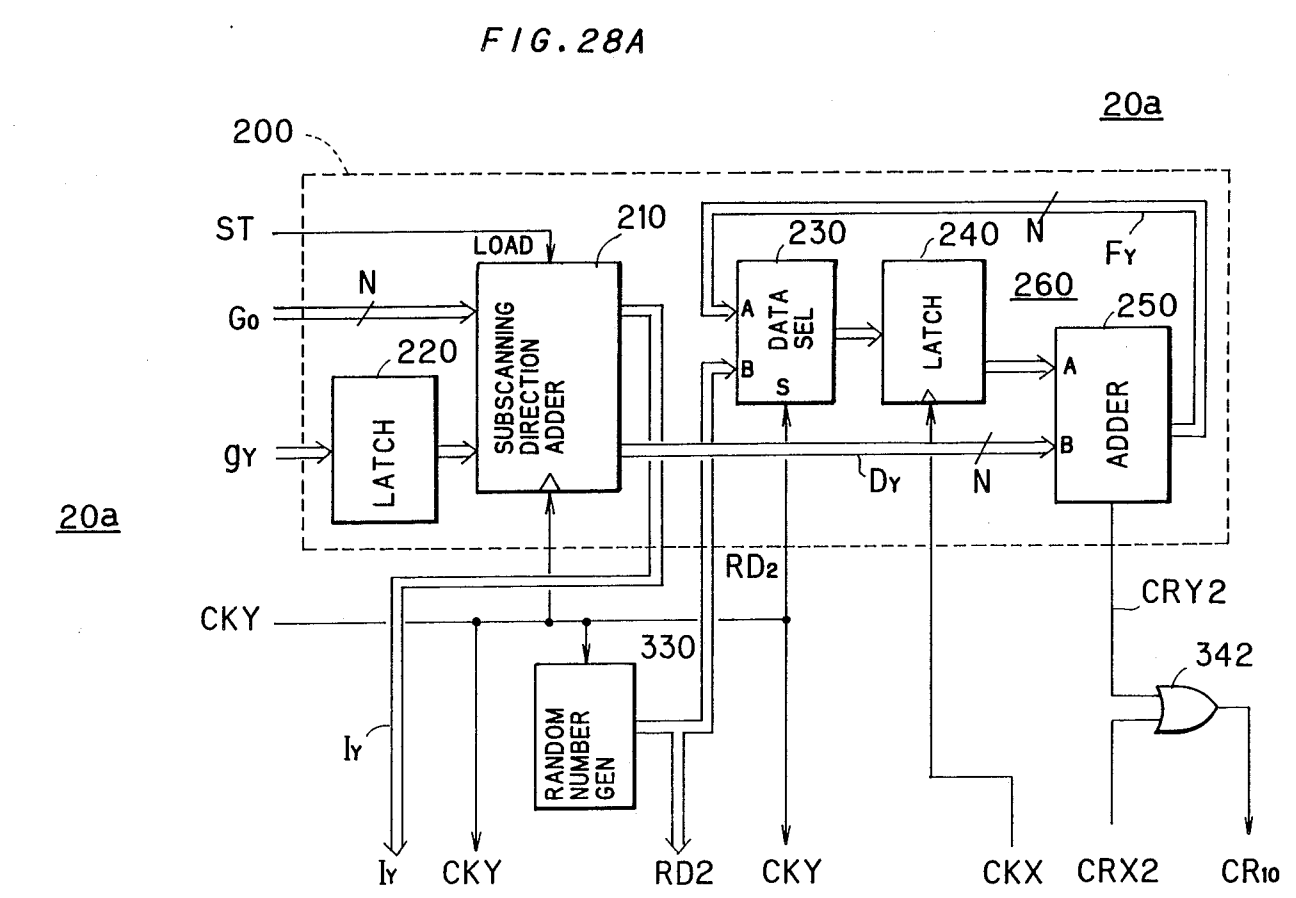
Figure 28B:
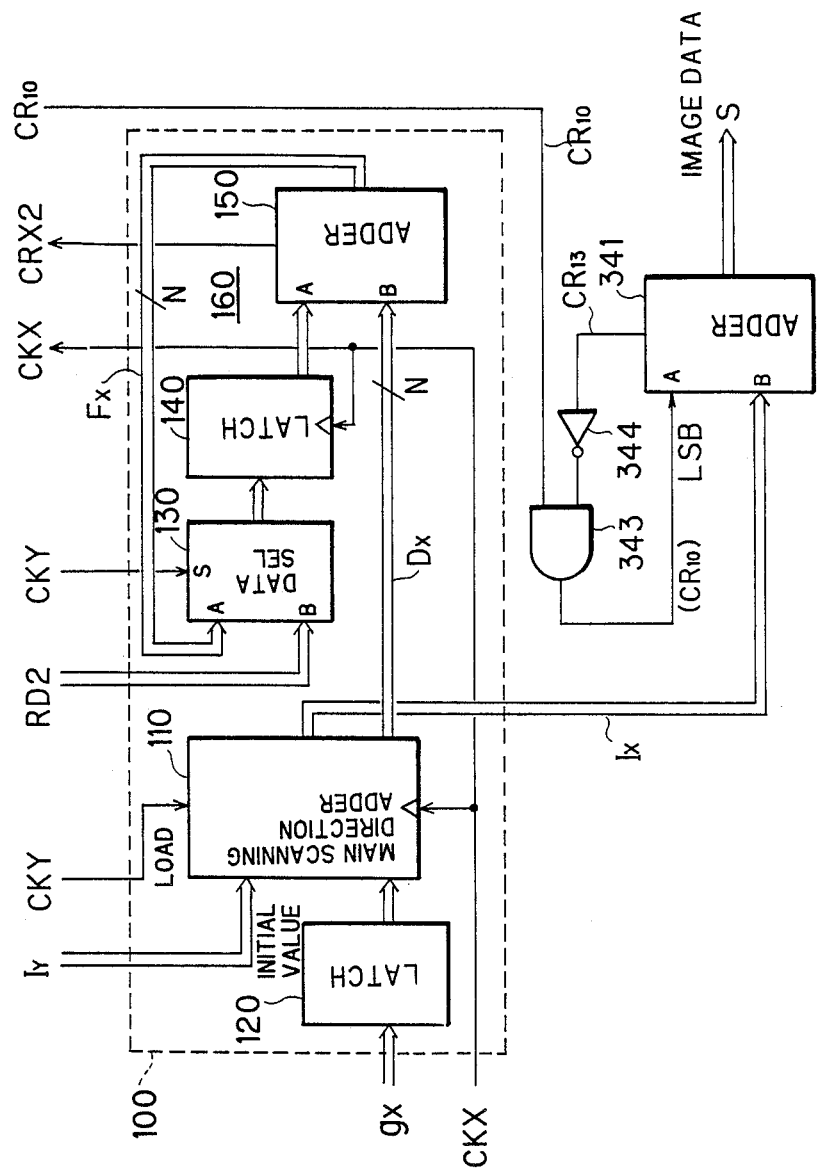

FIG. 28A and FIG. 28B are block diagrams showing the internal structure of a gradation-inclined image generator 20a according to a second embodiment of the present invention. This gradation-inclined image generator 20a can be used in place of the gradation image generator 20 of the first embodiment. The construction of gradation-inclined image generator 20a is similar to that of the first embodiment, and therefore, the explanation of the second embodiment will be set forth only for the gradation-inclined image generator 20a.

Referring to FIG. 28A, the gradation initial value $G_0$ is fetched by the subscanning direction adder 210 provided in a subscanning data generator 200. The subscanning direction gradation variation $g_Y$ (=0) is also fetched by the subscanning direction adder 210 after being latched in a latch circuit 220. On the other hand, the main scanning direction gradation variation $g_X$ is latched by a latch circuit 120 of FIG. 28B, to be thereafter fetched by the main scanning direction adder 110 provided in a main scanning data generator 100.

The main scanning direction adder 110 and the subscanning direction adder 210 are shown in FIG. 6 and FIG. 7, respectively. The integral parts $I_X$, $I_Y$ and the decimal parts $D_X$, $D_Y$ are outputted from the adders 110 and 210 respectively, as explained in the first embodiment.

(C-1) Generation of Main Scanning Direction Inclined Halftone Image

(C-1a) Operation of Subscanning Data Generator 200

A loop 260 formed by a data selector 230, a latch circuit 240 and an adder 250 provided in the subscanning data generator 200 of FIG. 28A accumulates the decimal part $D_Y$ outputted from the subscanning direction adder 210 every time the pixel clock CKX is input. When the accumulation reaches a value larger by one bit ($2^{-N}$) then a maximum storable value of the N-bit adder 250, i.e., "1.", the adder 250 outputs a carry signal CRY2 in the form of a pulse. When such a carry occurs, the output of the adder 250 is:

(accumulated value $-1$.)

and the accumulation is started again.

Thus, this loop 260 outputs a pulse CRY2 every time the accumulation of the decimal part $D_Y$ reaches a multiple of "1." (including "1." itself).

However, since $D_Y$="0" when generating the main scanning inclined halftone image, accumulation will not reach "1." even if the decimal parts are endlessly accumulated. Therefore, no carry signals CRY2 are generated. The data selector 230 is supplied with a random number RD from a random number generator 330 as its B input. This random number RD2 is used as an initial value of the accumulation. The reason for providing such a random number RD2 is hereinafter described.

(C-1b) Operation of Main Scanning Data Generator 100

On the other hand, the integral part $I_Y$ provided by the subscanning direction adder 210 is input to the main scanning direction adder 110 with in the main scanning direction data generator 100 as an initial value in each scanning line. This main scanning direction adder 110 is shown in FIG. 6, as hereinabove described. The function thereof is substantially equal to that of the subscanning direction adder 210 shown in FIG. 7, differing only in data content and operation timing. The main scanning direction adder 110 outputs the integral part $I_X$ and the decimal part $D_X$.

The decimal part $D_X$ is supplied to the adder 150 of FIG. 28B. The decimal part $D_X$ is accumulated in synchronization with the pixel clocks CKX by a loop 160 formed by the data selector 130, the latch circuit 140 and adder 150. The N-bit random number RD2 input from the random number generator 330 is used as the initial value of accumulation. This description is made on the assumption that the initial value of accumulation is "0", while the effect of using such a random number RD2 as the initial value of accumulation is hereinafter described.

Figures 29A, 29B:
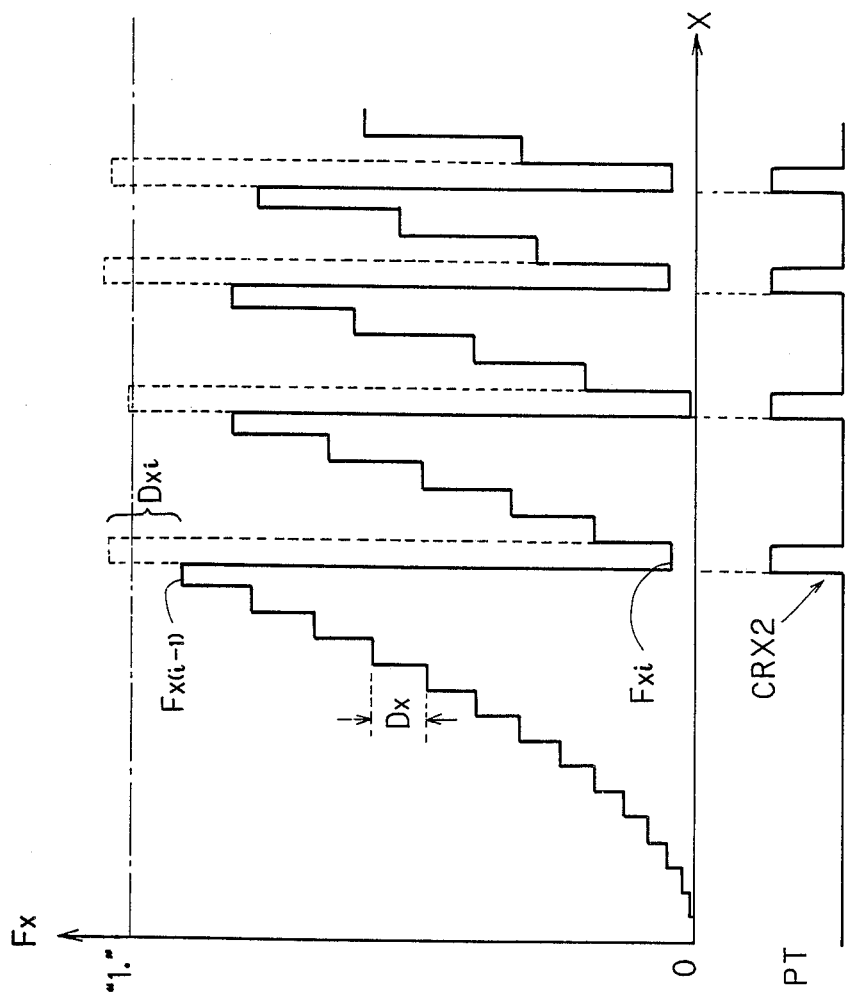
FIG. 29 and FIG. 30 are explanatory diagrams of accumulation of decimal parts and generation of carry signals.

As shown in FIG. 11A, the decimal part $D_X$ is changed as:

$0, g_X, 2g_X, 3g_X, \ldots$ along the main scanning direction X. Therefore, if such decimal parts $D_X$ are sequentially accumulated along the main scanning direction X, the accumulated value $F_X$ thereof is sequentially increased as shown in FIG. 29(a). When the accumulated value $F_X$ reaches "1.", a carry is caused such that the carry signal CRX2 is outputted from the adder 150 in pulse form and the accumulated value $F_{Xi}$ with respect to a next pixel is:

$$F_{Xi} = F_{X(i-1)} + D_{Xi} - 1 \qquad (1)$$

where
$F_{X(i-1)}$ and $D_{Xi}$ are defined as follows:
$F_{X(i-1)}$: accumulated value immediately before a carry takes place
$D_{Xi}$: value of the decimal part $D_X$ with respect to the pixel causing the carry This operation is repeated to generate a pulse train PT formed by a chain of the carry signals CRX2 as shown in FIG. 29(b). As evident from FIG. 29(b), the pulse intervals of the pulse train PT are gradually decreased. This is because the value of the decimal part $D_X$ to be accumulated is sequentially increased, whereby the interval in which the accumulated value $F_X$ reaches "1." is gradually decreased following the progress of main scanning.

Figure 30A:
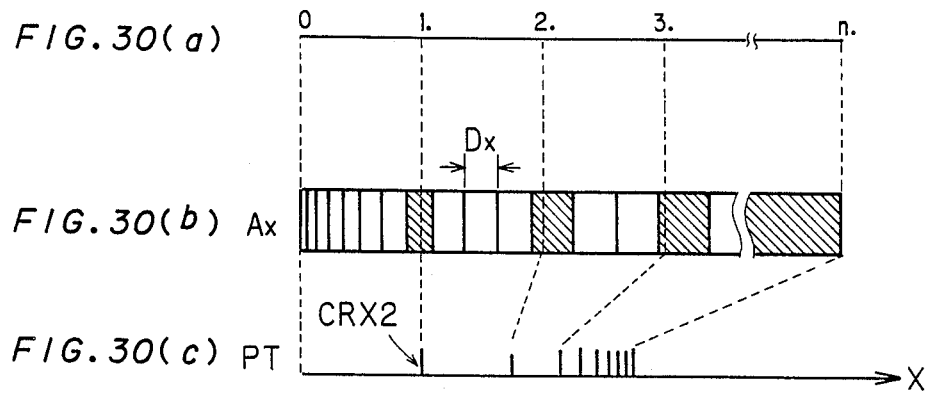

FIG. 30 illustrates this situation from another point of view. FIG. 30(b) shows an accumulated value $A_X$ obtained by sequentially accumulating the decimal parts $D_X$ for respective pixels along the main scanning direction X. However, this accumulated value $A_X$ is drawn in a continuous form with no regard to a carry, dissimilarly to the aforementioned accumulated value $F_X$. Further, FIG. 30(a) illustrates a numerical scale showing integers being multiples of "1." as the reference value: "1.", "2.", ... "n."

Also, decimal parts corresponding to pixels in which the accumulated value $A_X$ reaches these integers are shown in a shaded fashion.

On the other hand, the adder 150 of FIG. 28B sequentially accumulates the decimal parts $D_X$ to generate the carry signal CRX2 every time the accumulated value reaches "1.", as hereinabove described. Thus, the adder 150 is adapted to indirectly specify pixels ("multiple-reaching pixels") having the decimal parts shaded in FIG. 30(b) and generates the carry signals CRX2 in these multiple-reaching pixels.

The pulse time intervals of the pulse train PT formed by the carry signals CRX2 are sequentially narrowed with increase in the decimal parts $D_X$ as shown in FIG. 30(c). When a carry causes the decimal part $D_X$ to accumulate itself, the integral part $I_X$ is incremented by (+1.) so that the decimal part $D_X$ is returned to a value (e.g., "0") smaller than "1." as shown in FIG. 11A. Thus, compressional change of the pulse train PT of FIG. 30(c) is repeated every time the value of integral part $I_X$ is changed.

Figure 31A:
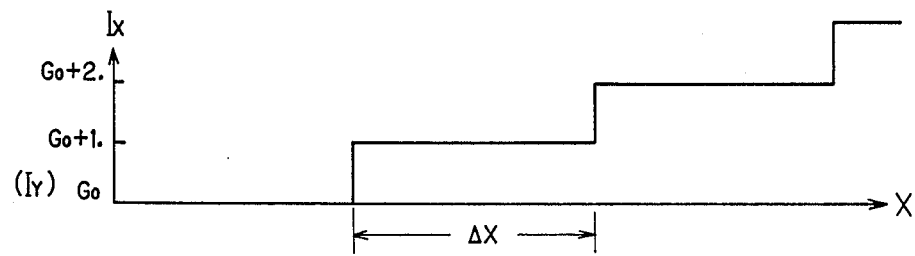
FIG. 31 is a waveform diagram showing a process in which image data are obtained in the second embodiment of the present invention.
Figure 31B:
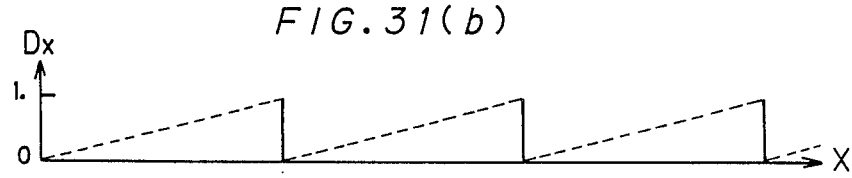
Figure 31C:
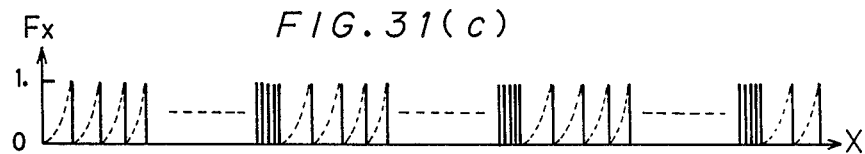

FIG. 31(a) to FIG. 31(d) show the aforementioned situation, where small stepped changes in the unit of pixels is abbreviatedly shown by broken lines for convenience of illustration. Referring to FIG. 31, the integral part $I_X$ is stepped from initial value $I_Y$ $_{(=G_0)}$ (FIG. 31(a)). The decimal part $D_X$ is sequentially stepped in the unit of pixels, while being returned to "0" or a value in the vicinity thereof in the positions where the integral part $I_X$ is changed (FIG. 31(b)). The accumulated value $F_X$ of the decimal parts $D_X$ is parabolically increased while stepped, to be returned to the value expressed by the expression (1) every time the same reaches "1." (FIG. 31(c)). FIG. 31(c) shows only a part of the waveform. Further, the cycle period in which the accumulated value $F_X$ is returned to the value of the expression (1) is sequentially narrowed toward the position where the value of the integral part $I_X$ is changed in FIG. 31(c).

Figure 31D:

In the positions where the accumulated value $F_X$ is returned to the value of the expression (1), the carry signals CRX2 of FIG. 31(d) are generated. The generation intervals between the carry signals CRX2 are sequentially shortened toward the positions where the value of the integral part $I_X$ is changed. After the integral part $I_X$ is changed, the carry signals CRX2 are again generated at wide time intervals, and thereafter the generation intervals thereof are sequentially narrowed. The compression cycle coincides with the change cycle period $\Delta X$ of the integral part $I_X$.

(C-1c) Operation of Composing Integral Part and Carry Signal (Pulse)

Thus, the main scanning direction adder 110 of FIG. 28B outputs the integral parts $I_X$ of FIG. 31(a) and the adder 150 outpus the carrier signals CRX2 of FIG. 31(d). The integral parts $I_X$ are supplied to the B input of the adder 341 of FIG. 28B. The carry signals CRX2 input the OR circuit 342 of FIG. 28A, which outputs carry signals $CR_{10}$. In case of the main scanning direction inclined halftone image, the carry signals CRY2 received in the other input of the OR circuit 342 are always "0", whereby the carry signals $CR_{10}$ outputted from the OR circuit 342 have the same data values as the carry signals CRX2 from the adder 150. The carry signals $CR_{10}$ pass through the AND circuit 343 to be received in the least significant bit (LSB) of the A input of the adder 341.

The other input of the AND circuit 343 is supplied with signals obtained by inverting carry signals $CR_{13}$ from the adder 341 by an inverter 344. Therefore, when no carries are caused in the adder 341, the inverter 344 outputs "1." and the outputs from the AND circuit 343 are the same values as the carry signals $CR_{10}$ ($=CRX2$).

Thus, the adder 341 has a function of composing the integral parts $I_X$ and the carry signals $CR_{10}$ ($=CRX2$) to generate "second gradation date" by adding the integral parts $I_X$ and the carry signal CR10. As the result, image data S, which are outputted from the adder 341 as the second gradation data, have the wave form shown in FIG. 31(e).

Figure 31E:
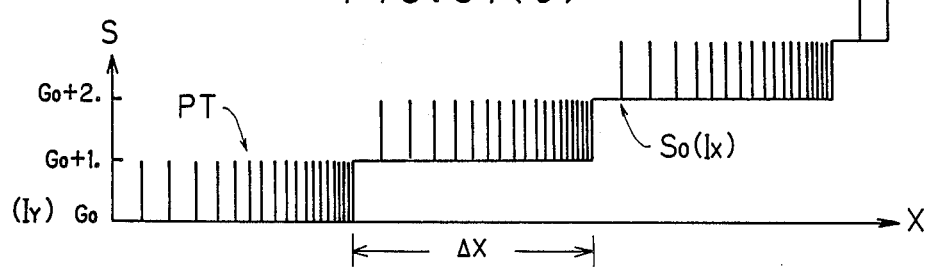

As shown in FIG. 31(e), the image data S thus obtained superimpose the pulse train PT on stepwise signals $S_0$ corresponding to the integral parts $I_X$. Pulse density in the pulse train PT is sequentially increased toward a position where the level of the stepwise signal $S_0$ is increased by (+1.). Therefore, when recording the main scanning direction inclined halftone image through image data S, the gradation is macroscopically visualized to be continuously changing. Therefore, infuluence by tone jumps in the recorded image can be effectively prevented by employing such a method.

Figure 32A:
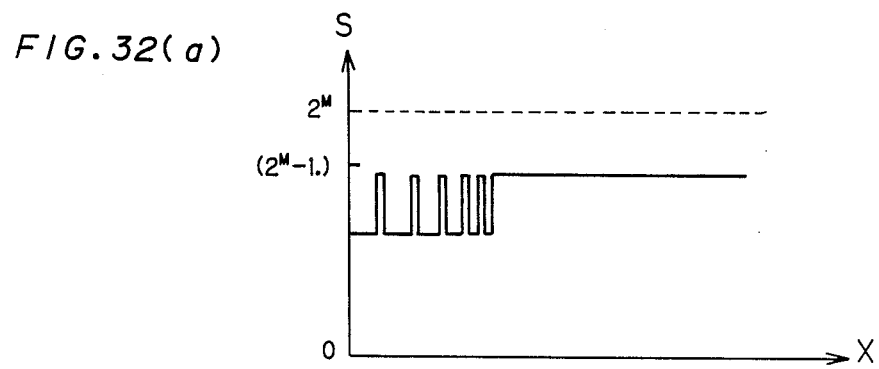
FIG. 32 is an explanatory diagram of overflow inhibiting processing.
Figure 32B:
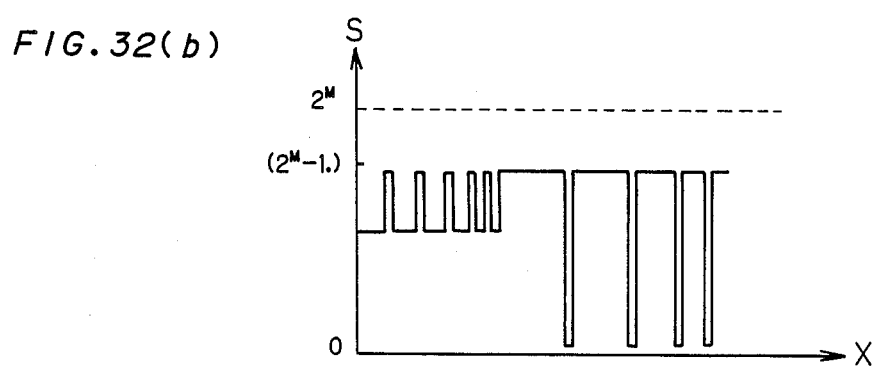

When a carry occurs in the adder 341 by addition of the carry signals CRX2 of FIG. 28B, the AND circuit 343 outputs "0". Therefore, the A input of the adder 341 is "0" at this time and the value of the integral part $I_X$ directly becomes the output S of the adder 341. Therefore, image data S shown in FIG. 32(a) is obtained. If such circuitry is not employed, overflow may be caused in the upper limit $2^M$ of gradation expression as shown in FIG. 32(b). Therefore, it is preferable to provide the AND circuit 343 and the like.

(C-1d) Advantage of Employing a Random Number as an Initial Value of Accumulation and Operation of Random Number Generator 330

Description now addresses why the random number RD2 generated from the random number generator 330 of FIG. 28A is employed as the initial value of accumulation. As hereinabove described, any influence by tone jumps is effectively prevented by employing the gradation-inclined image generator 200. However, the pulse train PT added to prevent the influence by tone jumps is an pulse array common to the respective main scanning lines.

Figure 33:
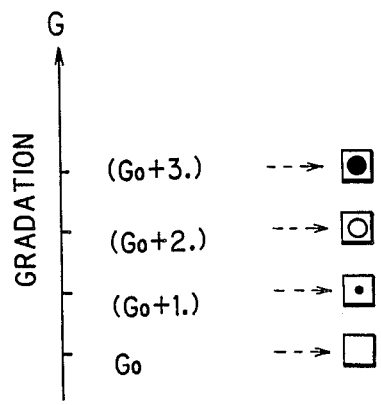
FIG. 33, FIG. 34A and FIG. 34B are explanatory diagrams of effects of provision of random numbers.
Figure 34A:
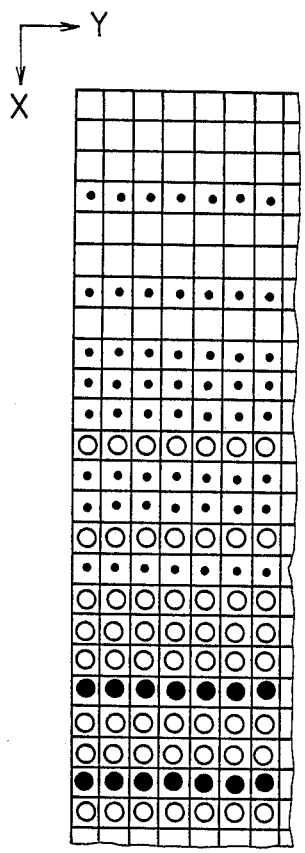

When the symbols shown in FIG. 33 are employed to show the gradation levels, the image data obtained without the random number generator 330 are in a pixel array as shown in FIG. 34A. As shown in FIG. 34A, pulses obtained from the carry signals CRX2 are arrayed in line along the subscanning direction Y. It is possible that these lines can be visualized. In order to cope with this, the random number RD2 is employed as the initial value of acumulation of the decimal parts $D_X$ for each main scanning line.

Figure 35:
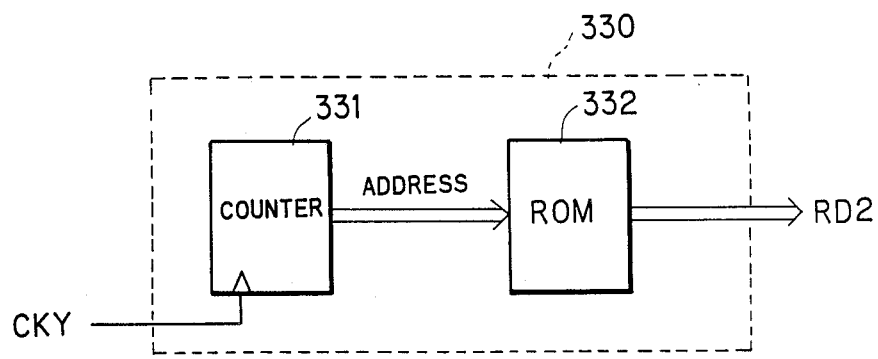
FIG. 35 is an internal structural diagram of a random number generator.

FIG. 35 is a block diagram showing internal structure of random number generator 330. Referring to FIG. 35, a counter 331 is incremented by (+1) when the main scanning start clock CKY is input to the counter 331, to outputs its count value to a ROM 332 as address data. The ROM 332 stores a series of tabled random numbers RD2. The random number RD2 is outputted from the designated address.

This random nubmer RD2 is the B input for the data selector 130 of FIG. 28B. When the main scanning start clock CKY is input as the selection signal for the data selector 130, the B input is supplied to the latch circuit 140. Thereafter the data selector 130 selects the A input supplied from the adder 150 to output the same in the interval before starting main scanning. Thus, the random number RD2 is employed as a common value on one main scanning line, and a new random number is generated every time scanning is shifted to a subsequent main scanning line.

Figure 34B:
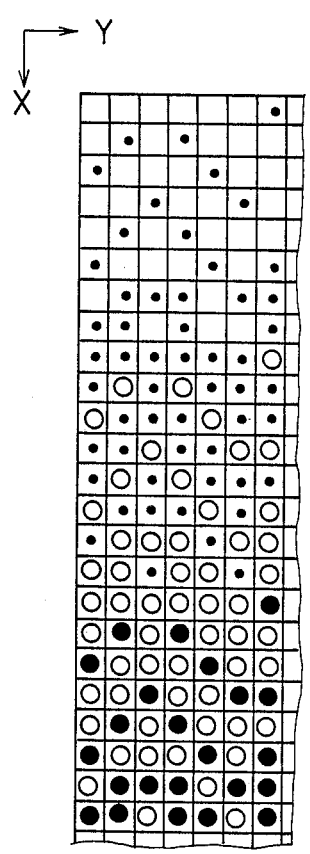

Thus, the random number RD2 is used as the initial value for accumulating the decimal parts $D_X$. Generation timing of the carry signals CRX2 is varied with the scanning lines. Therefore, as shown in FIG. 34B, the pulses obtained from the carry signals CRX2 are dispersed in the units of the scanning lines and prevents linear arrangement of the pulses along the subscanning direction Y to be visualized.

(C-1e) Inclined Halftone Image whose Gradation Levels are Decreased along Main Scanning Direction X When the gradation levels of the inclined halftone image are decreased along the main scanning direction X, the B input of the adder 111 of FIG. 6 and the main scanning direction gradation variation $G_X$ are supplied in the same manner already explained in the section (A-6) of the first embodiment. The waveforms of the integral parts $I_X$ and others are shown in FIGS. 36(a) to (e).

(C-1f) Generation of Subscanning Direction Inclined Halftone Image

When generaion of the subscanning direction inclined halftone image is performed, "0" is supplied as the main scanning direction gradation variation $g_X$ and a value ($\neq$"0") in response to the designated gradation change rate is supplied as the subscanning direction gradation variation $g_Y$. Then, the loop formed by the adder 214, the data selector 215 and the latch circuit 216 provided in the subscanning direction adder 210 of FIG. 7 accumulates the subscanning direction gradation variation $g_Y$ synchronously with the main scanning start clocks CKY.

As the result, the decimal part $D_Y$ is changed as:

0, $g_Y$, $2g_Y$, $3g_Y$, ...

with progress of subscanning. When a carry occurs in the adder 214, the output of the other adder 211 is changed by (+1.) or (−1.), whereby the integral part $I_Y$ is also incremented or decremented. Therefore, in case of the inclined halftone image whose gradation levels are increased along the subscanning direction Y, the integral part $I_Y$ and the decimal part $D_Y$ with respect to the first pixel of each main scanning line are changed as shown in FIG. 10A as hereinabove described. Such decimal parts $D_Y$ are sequentially input to the adder 250 of FIG. 28A.

Figures 37A, 37B:
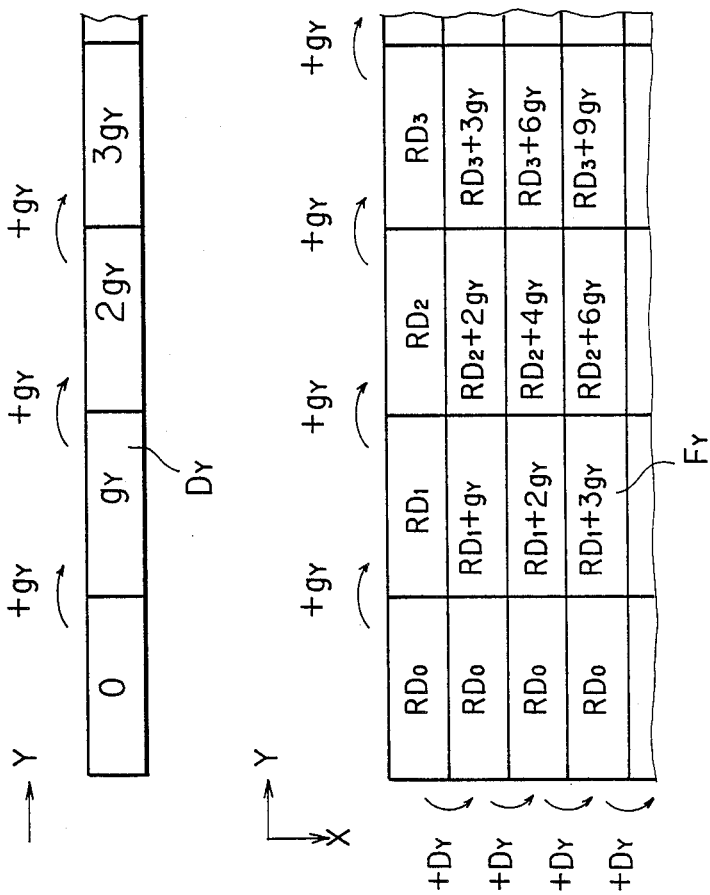
FIG. 37, FIG. 38A, FIG. 38B and FIG. 39 are explanatory diagrams of operation for generating image data with respect to a subscanning direction inclined halftone image.

This adder 250 performs accumulation of the decimal parts $D_Y$ through the data selector 230 and the latch circuit 240. The timing of this accumulation is determined by the pixel clocks CKX input to the latch circuit 240. Therefore, the decimal part $D_Y$ inputted in the adder 250 which maintains a constant value until the scanning is shifted to a subsequent main scanning line, and the accumulated value $F_Y$ of the decimal part $D_Y$ is changed by each pixel. Thus, the decimal part $D_Y$ for each scanning line is changed as shown in FIG. 37(a), while the accumulated value $F_Y$ in each pixel is changed as shown in FIG. 37(b). In FIG. 37(b), symbols $RD_0$, $RD_1$, ... indicate respective values of the random numbers RD2 provided by the random number generator 330 of FIG. 28A for the respective scanning lines.

On the other hand, the main scanning direction adder 110 of FIG. 6 receiving the integral part $I_Y$ as the initial value latches the value of this integral part $I_Y$ in the latch circuit 113 through the data selector 112. However, since the main scanning direction gradation variation $g_X$ supplied to the adder 114 is "0", the decimal part $D_X$ is always at "0". Therefore, no carry signals $CR_1$ are generated from the adder 114 whereby the integral part $I_X$ maintains the value of the initial value $I_Y$. Thus, the decimal part $D_X$ inputted to the adder of FIG. 28B is always "0", and the integral parts $I_X$ inputted to the adder 341 coincides with $I_Y$. Further, since $D_X$="0", the accumulated value $F_X$ of the accumulation loop 160 also maintains the value of the random number RD2 supplied as the initial value. As a result, no carry signals CRX2 are generated and the carry signal $CR_{10}$ outputted from the OR circuit 342 has the same wave form as the carry signal CRY2 from the subscanning data generator 200.

Figure 38B:
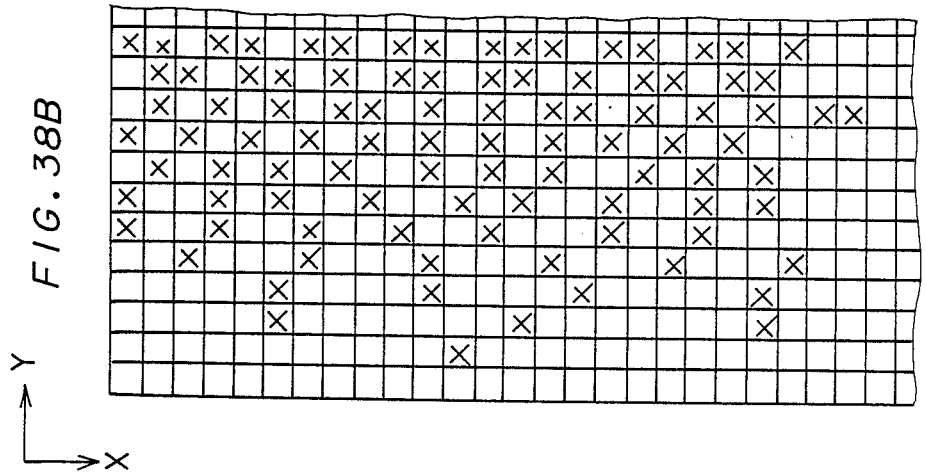
Figure 38A:
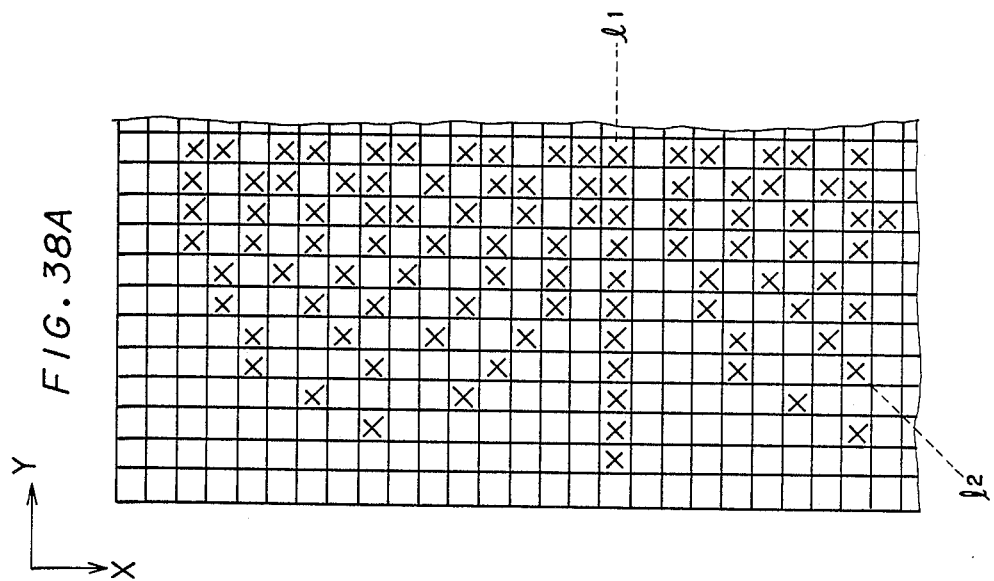

Generating the carry signal CRY2 supplied from the adder 250 to the OR circuit 342 is hereinabove described. The accumulation loop 260 including the adder 250 is provided in the subscanning direction data generator 200, the same being adapted to repeat accumulating operation along the pixel clocks CKX. Therefore, the carry signals CRY2 form a pulse train different from that of a pulse train obtained by simply replacing the "main scanning direction X" in generation of the main scanning direction inclined halftone image by the "subscanning direction Y". The details thereof are as follows:

On a first main scanning line, the accumulated value $F_Y$ is $RD_0 (<1.)$ regardless of the position X on the main scanning line, shown in FIG. 37(b). Therefore, no carry singals CRY2 are generated. Then, on a second main scanning line, the accumulated value $F_Y$ is increased by $D_Y(=g_Y)$ in each pixel with $RD_1$ being an intitial values, as shown in FIG. 37(b). The carry signal CRY2 is generated every time the accumulated value $F_Y$ reaches "1.". FIG. 38A shows this situation. In FIG. 38A, pixels generating the carry signals CRY2 are depicted by symbol "x". It is assumed that $g_y=2^{-4}$ for convenience of illustration, while random numbers RD2 are neglected.

Since $D_Y=2g_Y$ on third main scanning line (straight line in the position of Y=2 in FIG. 38A), the accumulated value $F_Y$ is increased by:

$$2 \times 2^{-4} = 2^{-3}$$

in each pixel along the main scanning direction X. Therefore, $F_X$ becomes "1." in every $\frac{1}{2}^{-3}=8$ pixels on the main scanning line, whereby the carry signal CRY2 is generated in each pixel indicated by "x" in FIG. 38A. This also applies to other main scanning lines.

Figure 39:
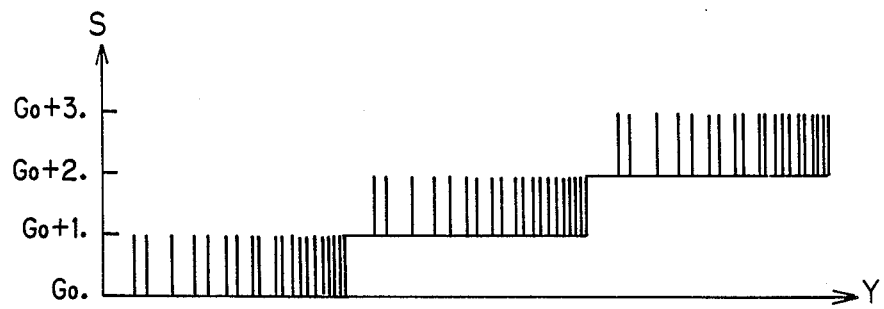

As shown in FIG. 38A, the array of the carry signals CRY2 along the subscanning direction Y is not necessarily sequentially narrowed in interval, but the array instead includes partial compression. However, such observation is in a microscopic point of view, and the pulse intervals are sequentially narrowed in a macroscpopic point of view. Therefore, when such carry signals CRY2 are in conjunction with the integral parts $I_Y$ in the adder 341 of FIG. 28B, image data S shown in FIG. 39, for example, is obtained along the subscanning direction Y. Thus, the influence by tone jumps is effectively eliminated.

As shown in FIG. 38A, the pulses formed by the carry signals CRY2 are not arrayed in a direction parallel to the main scanning direction X. However, since the accumulated value $F_Y$ is obtained along a prescribed rule, there is such a possibility that the pulses of the carry signals CRY2 are arrayed on a straight line $l_1$ along the subscanning direction Y or a straight line $l_2$ in a diagonal direction as shown in FIG. 38A. According to this embodiment, therefore, the random number RD2 from the random number generator 330 of FIG. 28A is fetched to the accumulation loop 260 through the data selector 230 as the initial value for each main scanning, thereby to randomize distribution of the carry signals CRY2. As the result, image data as shown in FIG. 38B can be obtained.

The main scanning start clocks CKY may be input to the latch circuit 240 of FIG. 28A, so that a waveform identical to that shown in FIG. 31 can be obtained along the subscanning direction Y. No particular problems are caused by such modification.

(C-1g) Generation of Inclined Halftone Image in Aritrary Directions

In the case of an arbitrary direction P (FIG. 4), finite values ($g_X \neq 0$ and $g_Y \neq 0$) are supplied to both of the main scanning direction gradation variation $g_X$ and the subscanning direction gradation variation $g_Y$, respectively. Then, the integral part $I_Y$ is changed along the subscanning direction Y, while the integral part $I_X$ with respect to the main scanning direction is changed with the integral part $I_Y$ serving as the initial value for each scanning line. Further, two types of carry signals CRX2 and CRY2 are independently generated. A carry signal $CR_{10}$ including both of the carry signals CRX2 and CRY2 is generated by the OR circuit 342, so that the carry signal $CR_{10}$ is composed with the integral part $I_X$ to provide the image data S.

Figure 40:
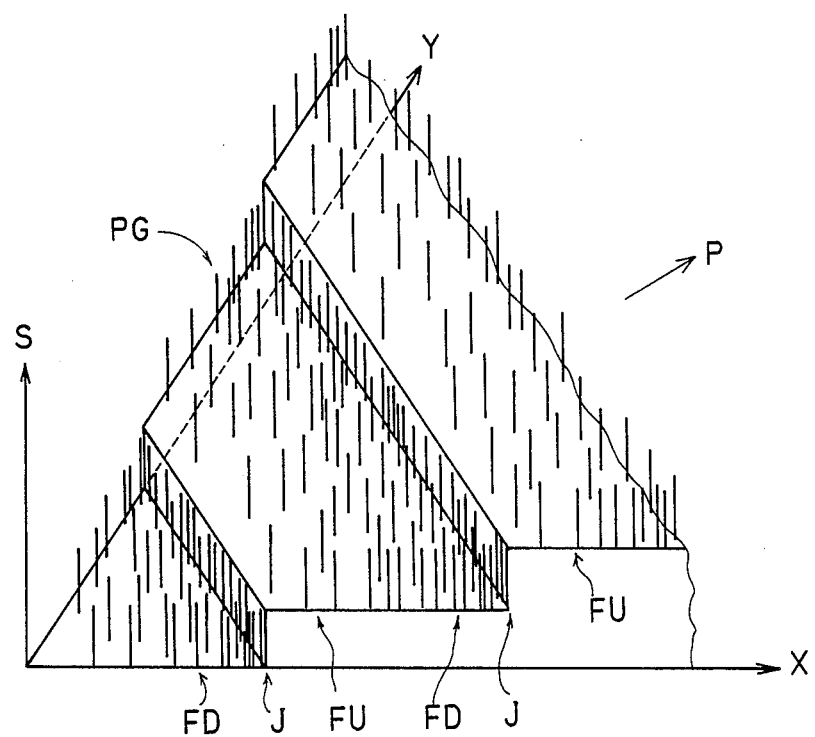
FIG. 40 is an explantory diagram of image data with respect to an inclined halftone image having an arbitrary gradation inclination direction.

Therefore, as shown in FIG. 40 is schematic form, the image data S has a pulse group PG being at a high density in a flat halftone part FD under a step of a gradation jump point J and at a low density in a flat halftone part FU above the step. Thus, the tone jump is eliminated in a macroscopic point of view, whereby the inclined halftone image thus provided has smooth spatial gradation change.

D. Third Embodiment (D-1) Overall Structure of Third Emodiment

Figure 41:
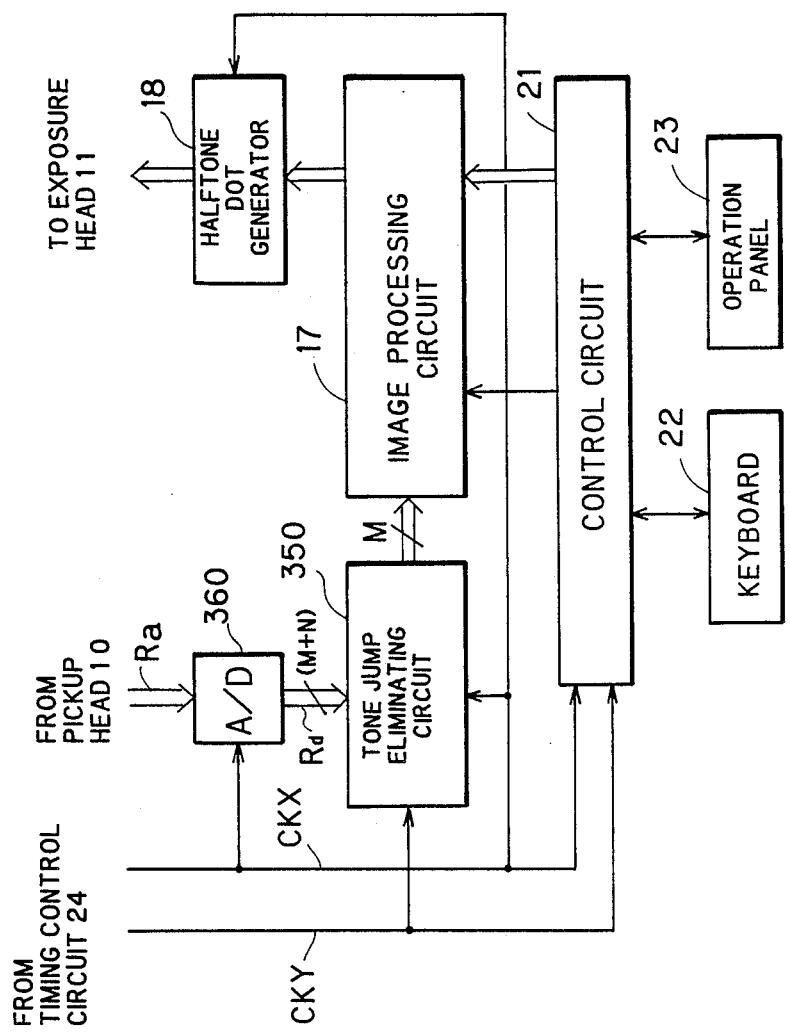
FIG. 41 is a partial block diagram of a process scanner in which a third embodiment is assembled.

FIG. 41 is a partial schematic diagram showing a process scanner in which an image data generating apparatus according to a third embodiment of the present invention. Parts not shown in FIG. 41 are identical in structure to those of the scanner as shown in FIG. 2, and hence description thereof is omitted.

Referring to FIG. 41, this scanner is different in structure from the second embodiment in the following points: First, the image data generating apparatus according to the present embodiment is not formed as a gradation-inclined image generator, but as a tone jump eliminating circuit 350 for receiving digital image data Rd obtained by A-D converting analog image data $R_a$ which is obtained from pickup head 10. While the second embodiment is directed to a circuit which generates the image (inclined halftone image) to be recorded internally, the third embodiment is directed to the apparatus to eliminate tone jumps existing in recording an externally generated image.

Therefore, the tone jump eliminating circuit 350 is supplied with digital image input $R_d$ after A-D conversion by an A-D converter 360. The output of the tone jump eliminating circuit 350 is subjected to processing such as gradation change in an image processing circuit 17, to be outputted to a halftone dot generator 18. The gradation-inclined image generator 20 of FIG. 2 is not drawn in FIG. 41, since it is not necessary for the explanation of the third embodiment. Therefore, the gradation-inclined image generator 20 may be arbitrarily assembled in the apparatus of FIG. 41 in a similar manner to FIG. 2.

The second feature of the apparatus shown in FIG. 41 resides in employment of a high resolution A-D converter in A-D converter 360 to obtain digital image data $R_d$ of (M+N) bits. Symbol M indicates the data length of the image data to be outputted similar to the first and second embodiments, and symbol N indicates the data length of decimal parts to be described. Integral parts and decimal parts are fetched from the inputted image data $R_d$ in the third embodiment, as hereinafter described.

(D-2) Structure and Operation of Tone Jump Eliminating Circuit 350

Figure 42:
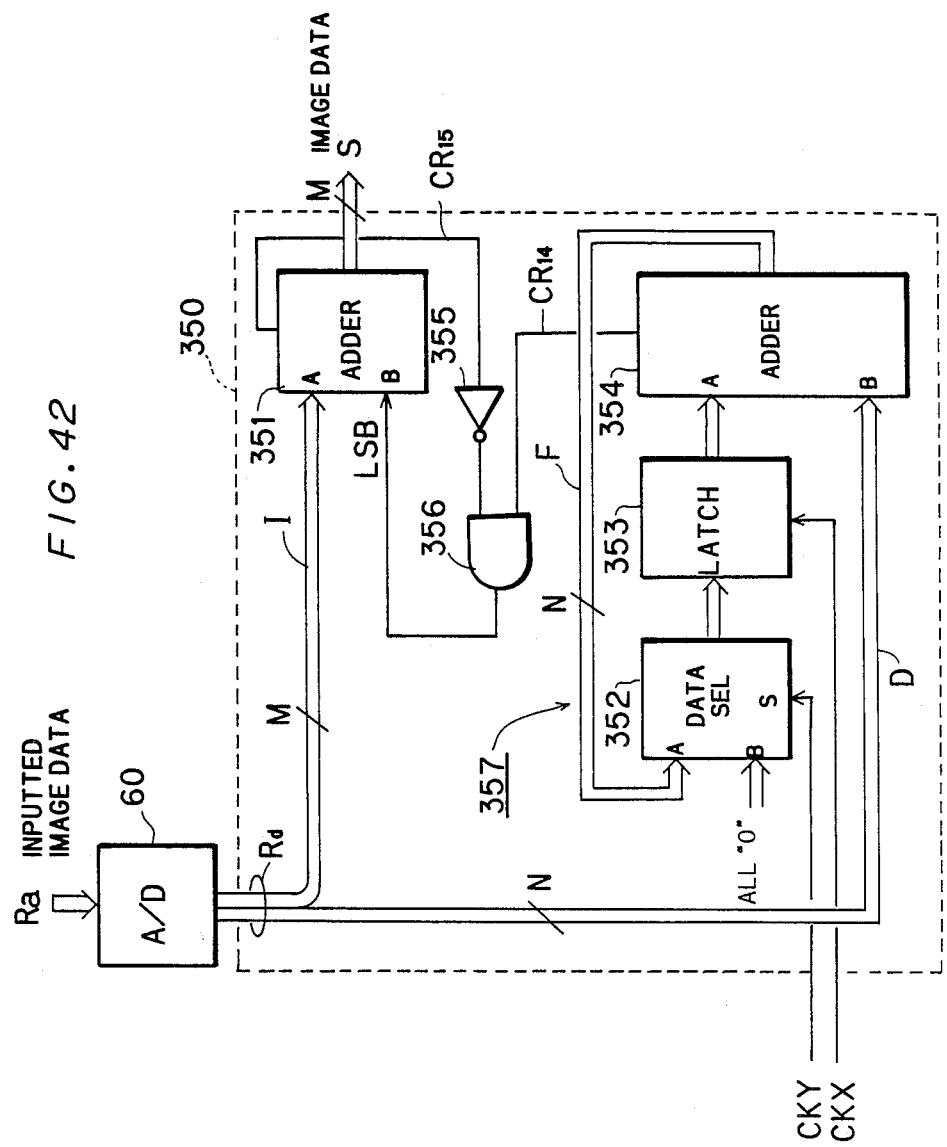
FIG. 42 is a block dagram showing internal structure of a tone jump eliminating circuit 350 formed as the third embodiment.

FIG. 42 illustrates the internal structure of the tone jump eliminating circuit 350. Referring to FIG. 42, higher order M bits within input image data $R_d$ converted into data of (M+N) bits by the A-D converter 350 are input to the A input of an M-bit adder 351 as integral parts I. On the other hand, lower order N bits of the image data $R_d$ are input to the B input of an N-bit adder 354 as decimal parts D.

This adder 354 with a data selector 352 and a latch circuit 353 forms an accumulation loop 357 for sequentially accumulating the decimal parts D for each pixel. The data selector 352 is adapted to select "0" (N bits), which is the B input thereof, as an initial value upon input of a main scanning start clock CKY and selects the output of the adder 354 thereafter to output the selected data to the latch circuit 354. Thus, this accumulation loop 357 performs a function similar to that of the accumulation loop 160 in FIG. 28B. However, no random numbers need be employed in the circuit of FIG. 42. When random numbers are employed, output of a random number generator may be supplied to the B input of the data selector 352.

When a carry is caused in the adder 354, a carry signal $CR_{14}$ is generated for input to the least significant bit within the B input of the adder 351 through an AND circuit 356. The AND circuit 356 includes an inverter 355 which inverts carry signal $CR_{15}$ of the adder 351 are provided to prevent overflow of the adder 351, similarly to the second embodiment.

Figure 43A:
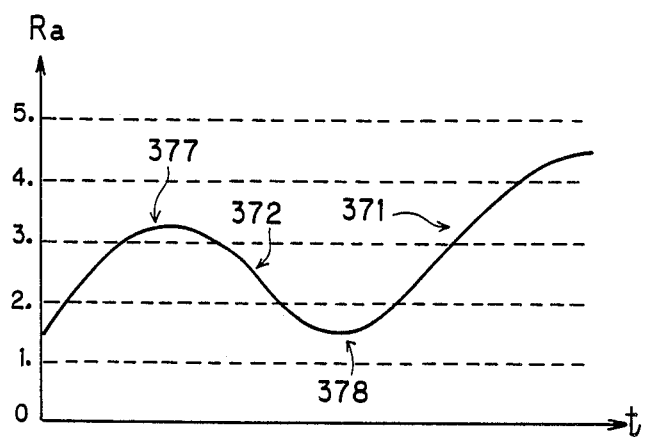

The operation of the tone jump eliminating circuit 350 is now described with reference to the case where input analog image data $R_a$ shown in FIG. 43(a) are suppied to the A-D converter 360. The horizontal axis t of FIG. 43 indicates the time or scanning distance corresponding thereto.

Figure 43B:
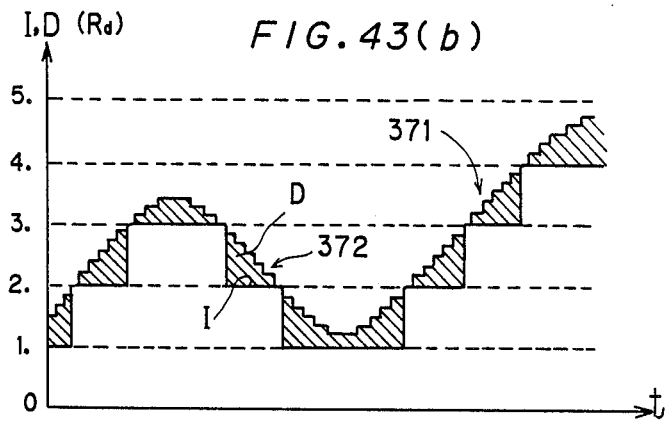

First, the input image data $R_a$ is converted into data $R_d$ of (M+N) bits in the A-D converter 360 and the image data $R_d$ is separated into integral parts I of M bits and decimal parts D of N bits as shown in FIG. 43(b). Referring to FIG. 43(b), shaded portions correspond to the decimal parts D.

The decimal parts D are accumulated pixel by pixel in the acumulation loop 357. Every time the accumulated value F reaches "1.", the carry signal $CR_{14}$ is outputted and the accumulated value F is returned to the value of (F−1.). Thus, the accumulation loop 357 substantially functions as a circuit for generating the carry signal $CR_{14}$ as a pulse signal every time the accumulated value of the decimal parts D reaches an integral value (multiple of "1.").

Figure 43C:
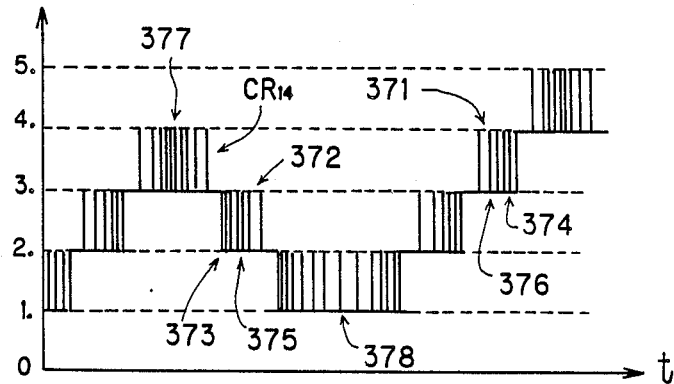

The carry signal $CR_{14}$ is composed with the integral parts I in an adder 351. As the result, the image data S has a waveform shown in FIG. 43(c). As shown in FIG. 43, the decimal parts D are sequentially increased in a region 371 where the level of the input image data $R_a$ is increased with respect to the time t. As the result, time intervals of the carry signals $CR_{14}$ are sequentially narrowed. On the other hand, a reverse phenomenon is caused in a region 372 where the level of the input image data $R_a$ is decreased. Therefore, pulses of high density are supplied to parts 375 and 376 of lower gradation levels in the vicinity of points (e.g., 373 and 374) causing tone jumps. Further, pulses of high density are supplied around a maximum point 377 of gradation while the pulse density is lowered around a minimum point 378.

The image expressed by the gradation change of FIG. 43(c) is macroscopically visualized as an image having smooth gradation change approximate to the input image data $R_a$ of FIG. 43(a).

When the level of the inut image data $R_a$ is an integral value as shown in FIG. 44(a), no carry signals $CR_{14}$ are generated since the decimal part D is "0", whereby image data S identical to the input image data $R_a$ shown in FIG. 44(c) is outputted.

Further, when input image data $R_a$ having a non-integral constant level as shown in FIG. 44(c) is supplied, the decimal parts D also maintain constant values so that the carry signals $CR_{14}$ are periodically generated to be superimposed on the integral parts I as shown in FIG. 44(d). Thus, this apparatus has not only the effect of eliminating influence by tone jumps but also an effect of expressing the halftone image in fidelity with respect to parts where the input image data $R_a$ are constant.

The A-D converter 360 and the tone jump eliminating circuit 350 are interposed between the pickup head 10 and the image processing circuit 17 in FIG. 41, while the same may be inserted between the image processing circuit 17 and the halftone dot generator 18. The A-D converter 16 shown in FIG. 2 is unnecessary in this case. The image processing circuit 17 comprises an analog processing circuit.

E. Modification of Second and Third Embodiments

The carry signals may not be directly utilized in order to obtain a pulse train composed of integral parts. For example, a circuit for generating pulses having desired size by receiving carry signals may be provided to compose the pulses thus obtained with integral parts. The pulses may be generated not in the pixels reaching multiples of "1." themselves, but in pixels in the vicinity thereof. Further, the pulses may be generated in small regions (e.g., regions having several pixels) including both of the same. FIG. 45 shows an example of this case. The level of the pulses is not restricted to "1.", but it may be other value, e.g., "2.". According to the second and third embodiments, therefore, the value of the integral parts may be pulsingly changed by a prescribed amount at the multiple reaching pixels and/or the pixels in the vicinity thereof.

The values of the integral parts may be modified in a negative direction as shown in FIG. 46, in order to pulsingly modify the same. In this case, two's complements of the decimal parts are obtained and accumulated, thereby to invert the density change direction of the negative pulse.

In order to specify the multiple reaching pixels by accumulation of decimal parts, a desired reference value and the accumulated values may be compared with each other by a comparator. It is not indispensable to set "1." as the reference value, but another value may be set. When it is desired to set "2." as the reference value, for example, a circuit which can process numerical values within a range up to "2." is employed as an accumulation loop to employ a carry signal generated when the accumulated value reaches "2.". In this case, the pulse density is half that in the aforementioned embodiments.

The second and third embodiments employ the adders 150, 250 and 354 which cannot count integral digits of the accumulated values but are capable of counting only decimal digits. This is because multiple pixels can be specified only by the carry signals CRX2, CRY2 and $CR_{14}$ without counting integral digits of the accumulated values since the reference value is "1.". However, it is not inhibited to count the accumulated values up to integral digits. It is possible to perform accumulation by a subtracter; i.e. to generate pulses by borrow signals.

Figure 47A:
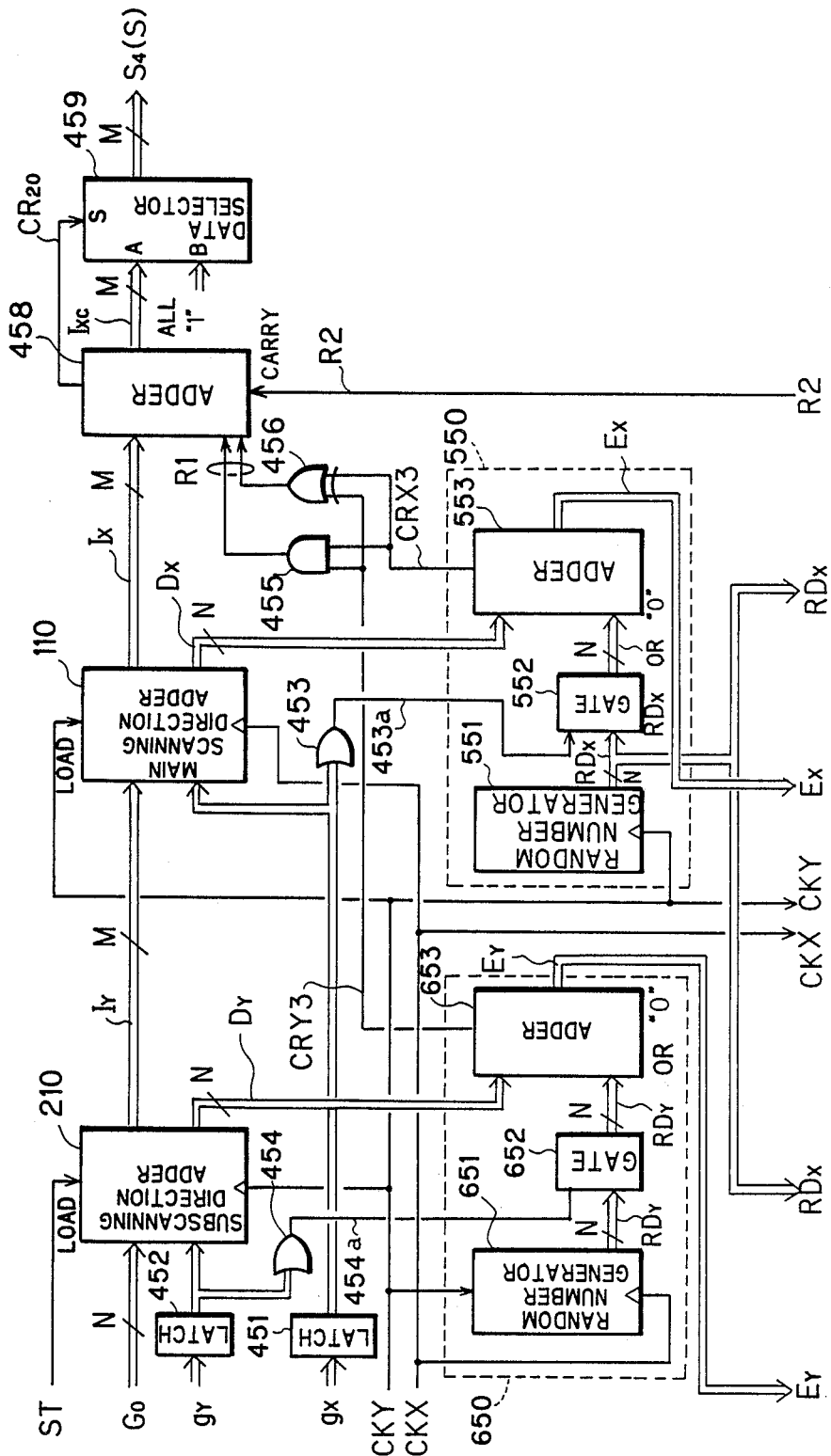
FIG. 47A and FIG. 47B are block diagrams showing the structure of a gradation-inclined image generator forming a fourth embodiment of the present invention.
Figure 47B:
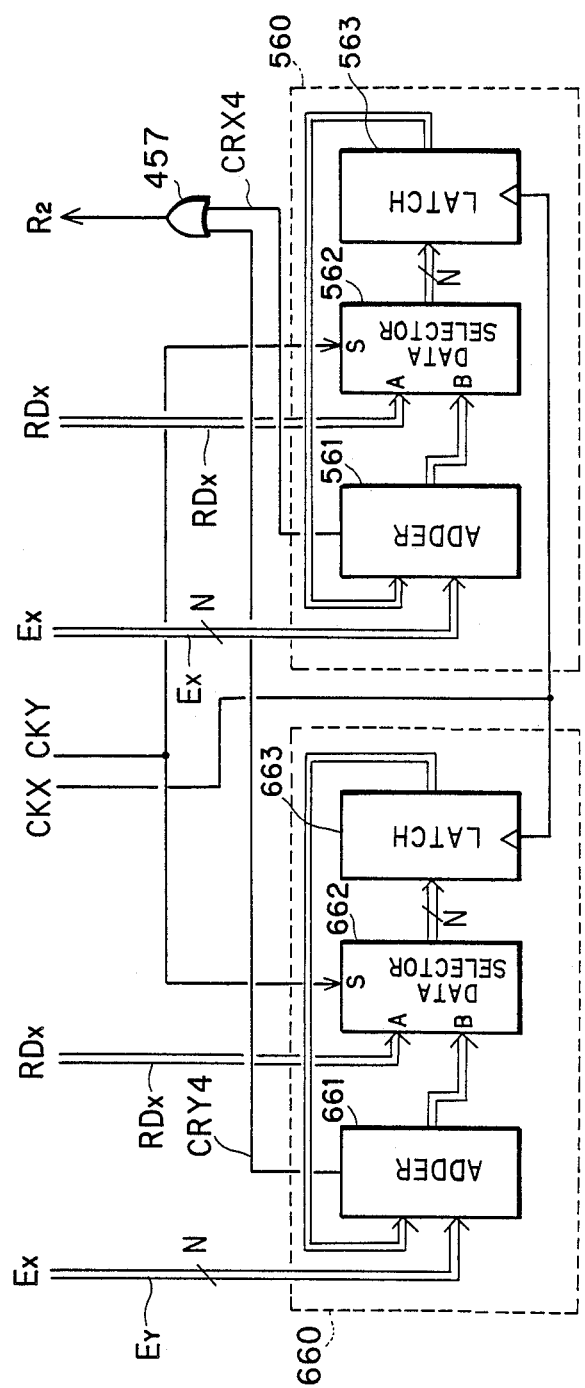

F. Fourth Embodiment (F-1) Generation of Main Scanning Direction Inclined Halftone Image FIG. 47A and FIG. 47B are block diagrams showing a gradation-inclined halftone image generator 20b of a fourth embodiment of the present invention. The fourth embodiment is characterized in that both the composition of the decimal parts with random numbers and the accumulation of the decimal parts are performed to modify integral parts with carry signals generated in the above composition and accumulation. In other words, the first and second embodiments in combination produce the fourth embodiment. Constructions other than the gradation-inclined image generator 20b are identical to those of the first embodiment and explanation thereof is omitted.

Referring to FIG. 47A, the subscanning direction adder 210 and the main scanning direction adder 110 are provided to generate the integral parts $I_X$, $I_Y$ and the decimal parts $D_X$, $D_Y$. The construction and operation of these adders 210 and 110 are identical to those of the first and second embodiments. Latch circuits 451 and 452 correspond to the latch circuits 51 and 52 of FIG. 3A respectively. The gradation-inclined halftone image generator 20b of FIG. 47A is provided with random number composition circuit 550 and 650. The first random number composition circuit 550 comprises a random number generator 551, a gate circuit 552 and an adder 553. Similarly, the second random number composition circuit 650 comprises a random number generator 651, a gate circuit 652 and an adder 653. The first random number generator 550 is constructed similarly to the random number generator 59 of FIG. 3B and generates the random numbers $RD_X$ in response to the main scanning start clocks CKY. On the other hand, the second random number generator 651 is constructed similarly to the random number generator 60 of FIG. 3B and generates the random numbers $DR_Y$ in response to the pixel clocks CKX.

Within the random numbers $RD_X$ and $RD_Y$ thus generated, the random numbers $RD_X$ are inputted to the gate circuit 552. This gate circuit 552 is supplied with the output of an OR circuit 453 as a gate signal 453a. The OR circuit 453 is adapted to obtain the logical sum of the respective bits forming the main scanning direction variation $g_X$. Therefore, the gate signal 453a becomes "0" only when $g_X$="00 ... 0", while the gate signal 453a is "1" otherwise.

Figure 48:
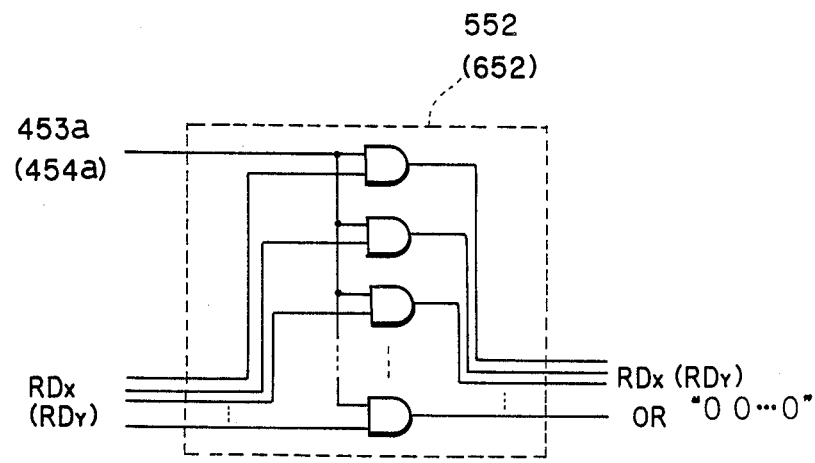
FIG. 48 is a circuit diagram of gate circuits 552 and 652.

FIG. 48 is a circuit diagram showing internal structure of the gate circuit 552. This gate circuit 552 includes AND circuits, and outputs the inputted random number $RD_X$ when the gate signal 453a is "1". When the gate signal 453a is "0", the gate circuit 552 outputs "00 ... 0". In other words, the gate circuit 552 passes the random number $RD_X$ when the main scanning direction variation $g_X$ is a finite value, while outputting "00 .. 0" when $g_X$="00 ... 0". Thus, the random number $RD_X$ supplied to the adder 553 through the gate circuit 552 in case of the main scanning direction inclined halftone image, is added to the decimal part $D_X$ supplied from the main scanning direction adder 110.

Figure 49A:
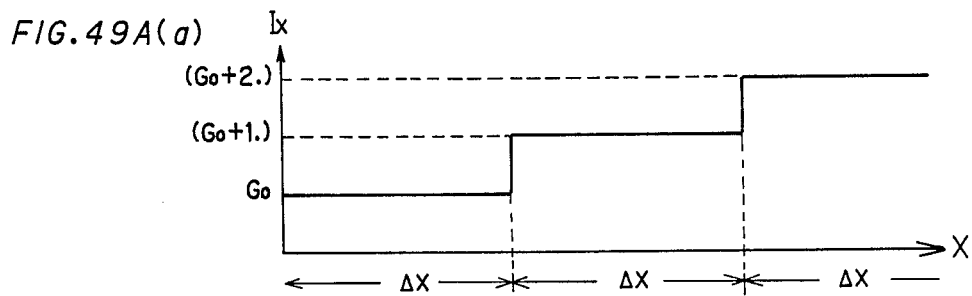
Figure 49A:
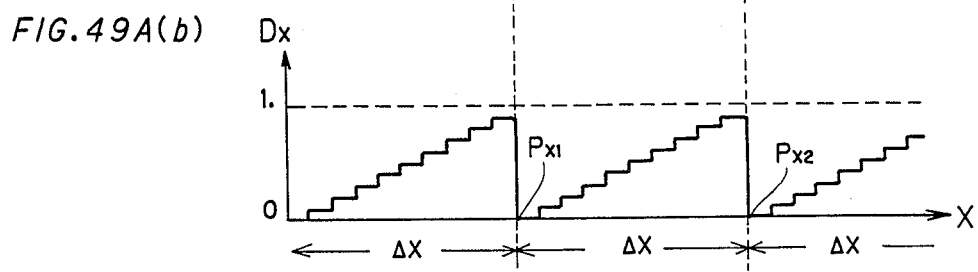
Figure 49A:
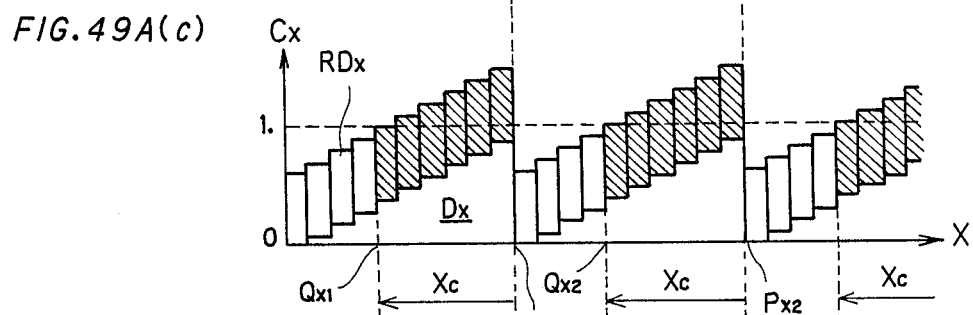
Figure 49A:
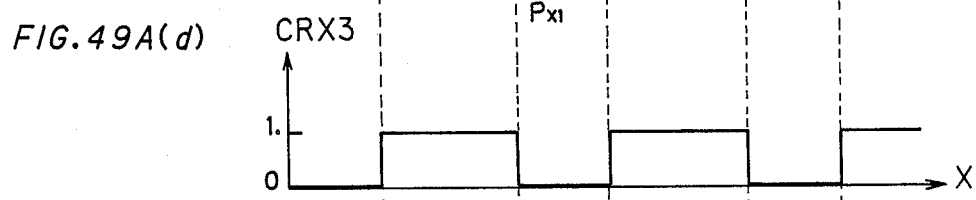
Figure 49A:
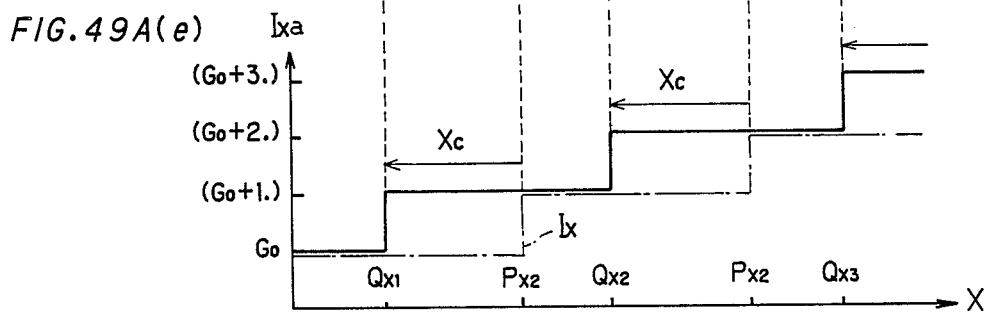

Therefore, the first random number composition circuit 550 generates the random number $RD_X$ in conjunction with the decimal part $D_X$ to provide a composite value $C_X$, similar to the adder 55 and the random number generator 59 in FIG. 3B. When the value $C_X$ obtained by the composition in the adder 553 reaches "1.", a carry signal CRX3 is generated. The generating distribution of the carry signal CRX3 is shown in FIG. 49A (d).

On the other hand, the adder 653 of FIG. 47A composes the decimal parts $D_Y$ and the random numbers $RD_Y$ with respect to the subscanning direction Y to obtain composite values $C_Y$, similar to the adder 56 and the random number generator 60 in FIG. 3B. A AND gate circuit 652 is interposed between the random number generator 651 and the adder 653 as shown in FIG. 47A, and a gate signal 54a thereof is supplied from an OR circuit 454. The OR circuit 454 is adapted to obtain the logical sum of the respective bits forming the subscanning direction variation $g_Y$.

Therefore, the gate circuit 652 outputs "00 ... 0" in case of the main scanning direction inclined halftone image, whereby the adder 653 performs no substantial addition. As a result, a carry signal CRY3 from the adder 653 will not become "1" in the case of the main scanning direction incluined halftone image, but the carry signal CRY3 will be generated in case of an inclined halftone image in another direction.

The carry signals CRX3 and CRY3 thus obtained are used to modify the first integral parts $I_X$ in order to generate second integral parts $I_{XC}$ (M bits) in FIG. 47A. Thus, the carry signals CRX3 and CRY3 are termed "(first) modification requiring signals". Further, second decimal parts $E_X$ and $E_Y$ are defined by decimal parts (i.e., parts not exceeding the first reference value "1.") of the composite values $C_X$ and $C_Y$ respectively. The second decimal parts $E_X$ and $E_Y$ are supplied to a main scanning accumulation circuit 560 and a subscanning accumulation circuit 660 of FIG. 47B, respectively.

The main scanning accumlation circuit 560 and the subscanning accumulation circuit 660 accumlate the second decimal parts $E_X$, and $E_Y$ pixel by pixel to output carry signals CRX4 and CRY4 respectively every time the accumlated values reach or exceed a second reference value "1.". The accumlation processes and the carry signal generating processes in the accumulation circuits 560 and 660 are identical to those of the accumulation loops 160 and 260 in FIG. 28B and FIG. 28A, respectively. The equation (1) set forth in the second embodiment also holds in the fourth embodiment when the decimal part $D_X$ ($D_Y$) in the equation (1) is substituted by the second decimal parts $E_X$ ($E_Y$). Namely, the following expression:

$$F_{xi}=F_{x(i-1)}+E_{xi}-1 \qquad (2)$$

holds in the fourth embodiment, for example.

The carry signal CRX4 and CRY4 are "second modification requiring signals" for a modification of the integral parts $I_X$ and $I_Y$, as hereinafter described. Generation of the carry signal CRX2 causes a pulse train similar to the pulse train PT shown in FIG. 30.

The subscanning accumulation circuit 660 has an acumulation loop formed by an adder 661, a data selector 662 and a latch circuit 663, accumulates the second decimal parts $E_Y$ outputted from the random number generating circuit 660 in the aforementioned manner with each input of the pixel clock CKX. Namely, when the main scanning start clock CKY is input to the data selector 662 at the starting point of each main scanning, this data selector 662 selects its A input (random number $RD_X$ from the random number generator 551) to input the latch circuit 663. Therefore, the random number $RD_X$ is loaded in the subscanning accumulation circuit 660 as an initial value.

Thereafter when the main scanning start clock CKY becomes "0", the data selector 662 selects its B input (output of the adder 661) to input the latch circuit 663. Therefore, the decimal parts $D_Y$ with respect to each pixel are accumulated with the random number $RD_X$ being processed as an initial value every time the pixel clock CKX is input. When accumulation reaches a value larger by one bit ($2^{-N}$) than the maximum allowable value for storage in the N-bit adder 661, i.e., "1.", the adder 661 outputs the carry signal CRY4 in the form of pulse. When such a carry occurs, the adder 661 outputs:

(accumulated value −1.)

and thereafter accumulation is again started.

Thus, the subscanning accumulation circuit 660 outputs a pulse (carry signal CRY4) every time accumulation of the decimal parts $E_Y$ reaches a multiple of "1." including "1." itself.

However, even if the decimal parts $E_Y$ are unlimitedly accumulated, the result of accumulation will not reach "1." when generating the main scanning direction inclined halftone image, since $D_Y=E_Y=$"0". Therefore, no carry signals CRY4 are generated in this case. The reason for providing the random nubmer $RD_X$ as the initial value of accumulation is hereinabove described in the description of second embodiment.

On the other hand, the decimal parts $E_X$ supplied from the random number generating circuit 550 are inputted to the adder 561 within the main scanning accumulation circuit 560. This main scanning accumulation circuit 560 also has an accumulation loop formed by the adder 561, a data selector 162 and a latch circuit 563. Within these, an input selection rule in the data selector 562 is similar to the input selection rule in the data selector 662 within the subscanning accumulation circuit 660 as hereinabove described. Therefore, the N-bits random numbers $RD_X$ supplied from the random number generator 551 are used as initial values of accumulation. The decimal parts $E_X$ are accumlated pixel by pixel to provide the accumulated value. Every time the accumulated value reachs or exceeds the second reference value "1.", the carry signal CRX4 is generated.

The pulse intervals of a pulse train PT2 formed of the carry signals CRX4 as shown in FIG. 49B(d) is sequentially narrowed with an increase in the decimal parts $E_X$ similar to the pulse train PT in FIG. 30. When a carry occurs in a decimal part $E_X$ itself, the decimal part $E_X$ outputted from the adder 553 is returned to a value (e.g., "0") smaller than "1.". Compression change of the pulse train PT2 is repeated in a similar manner every time the carry signal CRX3 is outputted from the adder 553.

As hereinabove described, the gradation-inclined halftone image generator 20b of FIG. 47A and FIG. 47B generates the four types of carry signals CRX3, CRY3, CRX4 and CRY4. The first integral parts $I_X$ are modified in pixels wherein at least either the carry signals CRX3 and CRY3 (first modification requiring signals) based on random number composition or the carry signals CRX4 and CRY4 (second modification requring signals) based on decimal part accumulation are generated. The modification is performed in the following manner:

First, the carry signals CRX3 and CRY3 (first generated on the basis of random number composition) are supplied to an AND circuit 455 and an exclusive OR circuit 456 of FIG. 47A. The AND circuit 455 and the exclusive OR circuit 456 convert the carry signals CRX3 and CRY3 into binary two-bit signals R1. Namely, if (CRX3, CRY3)=(0, 0), then R1="(0, 0)", if (CRX3, CRY3)=(1, 1), then, R1="(1, 0)", and if (CRX3, CRY3)=(1, 0), or (0, 1), then R1="(0, 1)".

The remaining two types of carry signals CRX4 and CRY4 are supplied to an OR circuit 457, to be converted into one-bit signals R2.

Data signals R1 and R2 are added to the integral parts $I_X$ by an adder 458. In more concrete terms, the two-bit signals R1 are added to low order two bits of the integral parts $I_X$, while the one-bit signals R2 are processed as carry input.

Therefore, the values of the first integral parts $I_X$ modified in pixels, in which at least one of the carry signals CRX3 to CRY4 is generated, whereby the second integral parts $I_{XC}$ are generated, and the detail of this modification process is as follows: First, the binary two-bit signals R1 (not shown in FIG. 49A) are generated on the basis of the carry signals CRX3 as shown in FIG. 49A(d). Since the carry signal CRY3 with respect to the subscanning direction is "0", the binary two-bit signals R1 are the same as carry signals CR3.

Signals $I_{Xa}$ are obtained by addition of the binary two-bit signals R1 to the first integral parts $I_X$ (FIG. 49A(a)) and are the values shown in FIG. 49A(e). These signals $I_{Xa}$ are generated in the adder 458 of FIG. 47A and are not outputted, but are drawn in FIG. 49A to facilitate easy understanding of the effect of the addition of the random numbers. As evident from FIG. 49A(e), the signals $I_{Xa}$ waveform is obtained by shifting the change waveform of the first integral parts $I_X$ by the same amounts $X_C$ along the main scanning direction X. Therefore, when the first integral parts $I_X$ are stepped at $P_{X1}$, $P_{X2}$, ..., the signals $I_{Xa}$ are stepped at $Q_{X1}$, $Q_{X2}$, ...

On the other hand, FIG. 49B shows integral part modification processing based on decimal part accumulation. However, FIG. 49B expresses pixels in shorter intervals than those in FIG. 14A for convenience of illustration. Small time interval changes n the units of pixels are abbreviatedly shown by broken lines. Within FIG. 49B, FIG. 49B(a) is identical to FIG. 49A(e). The second decimal parts $E_X$ are sequentially stepped in each pixel, while being returned to "0" or values in the vicinity thereof when the signals $I_{Xa}$ are changed (FIG. 49B(b)).

Further, the accumulated values $F_X$ of the decimal parts $E_X$ are parabolically increased while being stepped, to be returned to the value shown by the expression (2) every time the same reach "1." (FIG. 49B(c)). It is to be noted that only a part of the waveform thereof is drawn in FIG. 49B(c). Referring to FIG. 49B(c), cycles returning the accumulated values $F_X$ to the value of the expression (1) are sequentially narrowed toward the positions $Q_{X1}$, $Q_{X2}$, ... where the values of the signals $I_{Xa}$ are stepped.

In positions where the accumulated values $F_X$ are returned to the value of the expression (2), the carry signals CRX4 of FIG. 49B(d) are generated. The generation intervals of the carry signals CRX4 are also sequentially shortened toward the positions $Q_{X1}$, $Q_{X2}$, ... where the signals $I_{Xa}$ are stepped. After the signals $I_{Xa}$ are changed, the carry signals CRX4 are again generated in wide time intervals, and thereafter the generation intervals are again sequentially narowed. The compression cycle coincides with the changed cycle $\Delta X$ of the signals $I_{Xa}$.

The carry signal CRY4 with respect to the subscanning direction is "0", whereby the one-bit signals R2 is the same values as the carry signals CRX4. As a result, the second integral parts $I_{XC}$ obtained by adding the one-bit signals R2 to the signals $I_{Xa}$ are the waveform as shown in FIG. 49B(e).

The second integral parts $I_{XC}$ are input to a data selector 459 of FIG. 47A. The data selector 459 performs input selection with carry signals $CR_{20}$ of the adder 458 serving as selection signals, while processing the second intergral parts $I_{XC}$ (A input) as second gradation data $S_4$ when no carry signal $CR_{20}$ is generated. The data selector 459 outputs the second gradation data $S_4$ to the halftone dot generator 18 (FIG. 2) through the image processing circuit 17 as recording image data S. When the carry signal $CR_{20}$ is generated, the data selector 459 outputs "all 1" (B input) as second gradation data $S_4$. This is used so as not to lower the level of the second gradation data $S_4$ by overflow of the adder 458.

The waveforms shown in FIG. 49A and FIG. 49B are those one scanning line is drawn, the waveforms of other scanning lines are obtained by shifting the same in the direction X or ($-X$). This is because the values of the random number $RD_X$ supplied from the random number generator 551 of FIG. 47A to the adder 553 are varied with the scanning lines. In more concrete terms, the shift amounts $X_C$ as shown in FIGS. 49A and 49B are changed by the values of the random numbers $RD_X$. As a result, the values of the signals $I_{Xa}$ are randomly shifted with each scanning line similar to the first embodiment (FIG. 19A).

Figure 50:
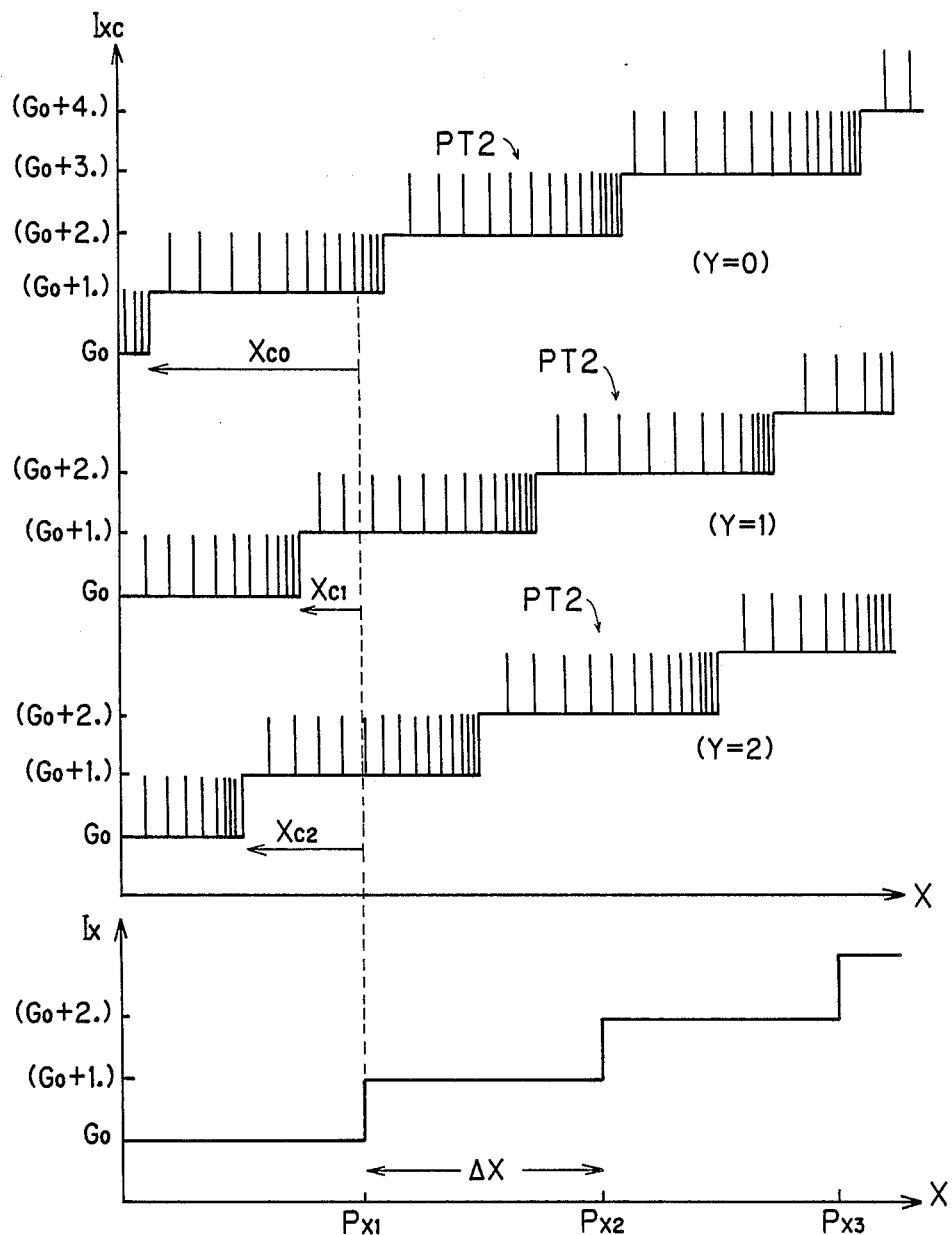
FIG. 50 is a diagram showing an example of spatial distribution of second integral parts obtained in case of generating a main scanning direction inclined halftone image by utilizing the fourth embodiment of the present invention.

When modification based on the carry signals CRX4 is further applied to the signals $I_{Xa}$, the second integral parts $I_{XC}$ as shown in FIG. 50 are obtained. In the second gradation data $I_{XC}$, positions of stepped gradation changes are randomly changed between scanning lines corresponding to respective ones of subscanning coordinates $Y=0, 1, 2, \ldots$ (i.e., the shift amounts $X_{C0}, X_{C1}, X_{C2}, \ldots$ of the waveforms are randomized. See FIG. 50). Therefore, these step positions are not easily viewer visualized. Further, pulse trains PT2 gradually stepped toward the direction of increase in gradation are superimposed on flat portions of respective gradation steps, further lowering visibility of the step positions.

Further, since the random numbers $RD_X$ are used as initial values of accumulation in the accumulation circuits 560 and 660, details of compression change of the pulse trains PT2 are varied with the scanning lines. Therefore, identical pulse trains do not appear on the respective scanning lines and hence the regularity thereof is not visable.

(F-2) Generation of Subscanning Direction Inclined Halftone Image

In case of generating a subscanning direction inclined halftone image, the main scanning direction variation $g_X$ is set at zero and the subscanning direction variation $g_Y$ is set at a desired value. Then, the subscanning direction adder 210 of FIG. 47A performs the processing shown in FIG. 10A, so that the integral parts $I_Y$ obtained as the result are input to the main scanning direction adder 110. Since the main scanning direction variation $g_X$ is zero, the main scanning direction adder 110 performs no substantial addition, but continuously outputs $I_X=I_Y$ and $D_X=0$ as shown in FIG. 11B.

Since $g_X=0$, the gate circuit 552 outputs "0" to the adder 553, Therefore, the adder 553 performs no substantial addition but continuously outputs $E_X=D_X=$"0" and CRX3="0".

On the other hand, the decimal parts $D_Y$ varying with the main scanning lines are inputted to the adder 653 as shown in FIG. 10A. Thus, the decimal parts $D_Y$ are at constant values on one main scanning line. The random numbers $RD_Y$ supplied from the random number generator 651 are added to the decimal parts $D_Y$. As hereinabove described, the random number generator 651 generates the random numbers $RD_Y$ syncronously with the pixel clock CKX, whereby values of the random numbers $RD_Y$ are varied with the pixels.

Figure 51A:
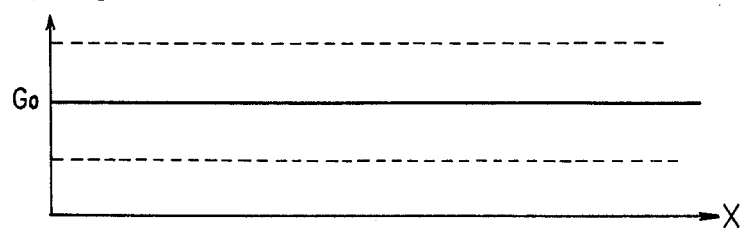
FIGS. 51 and FIG. 52 are explanatory diagrams of random number composition in generation of a subscanning direction inclined halftone image.
Figure 51B:
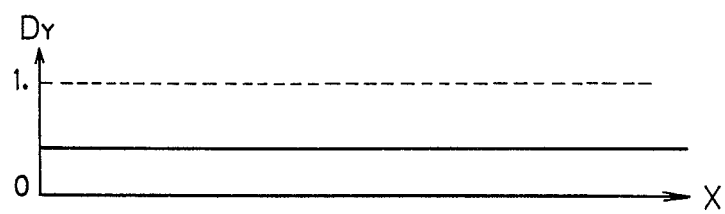
Figure 51C:
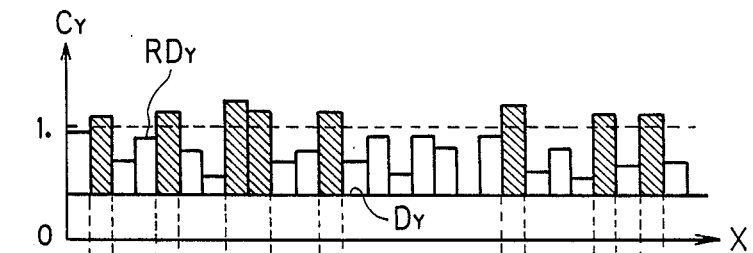
Figure 51D:
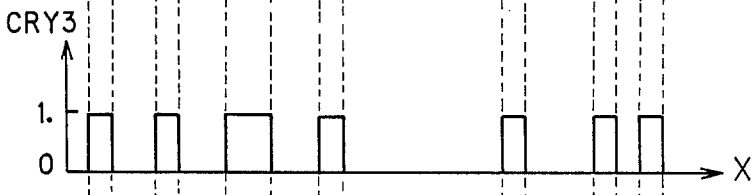

Therefore, when attention is drawn to one main scanning line, the random numbers $RD_Y$ for each pixel are composed with the constant decimal parts $D_Y$ shown in FIG. 51(b), and the composite values $C_Y$ shown in FIG. 51(c) are obtained. In pixels where the composite values $C_Y$ is equal to or exceeds "1.", the adder 653 of FIG. 47A generates the carry signals CRY3,. Carry signals CRY3 are illustrated in FIG. 51(d).

Figure 51E:
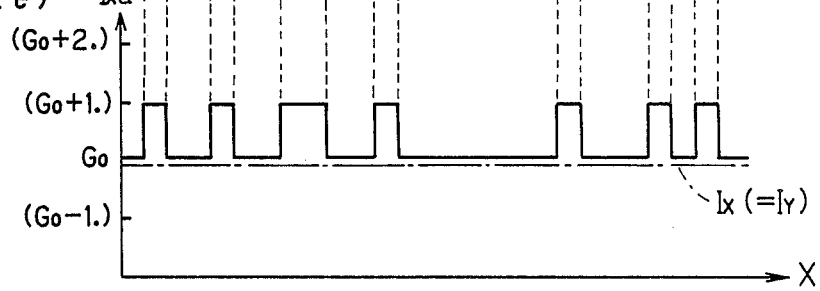
Figure 52A:
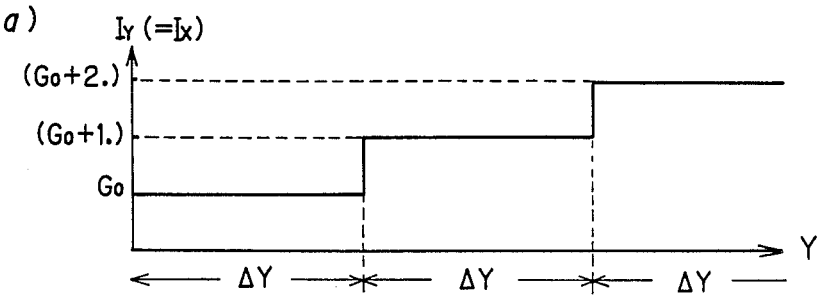
Figure 52B:
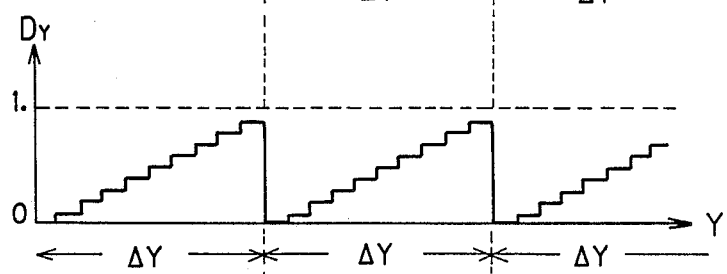
Figure 52C:
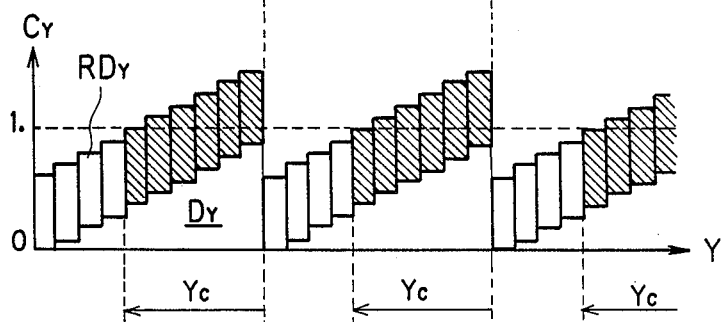
Figure 52D:
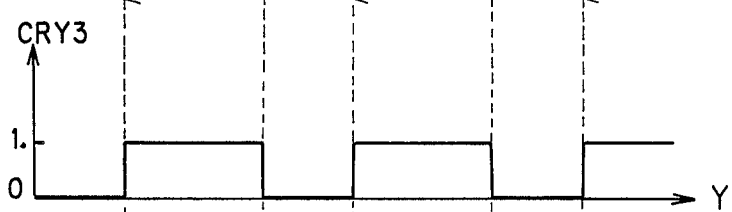
Figure 52E:
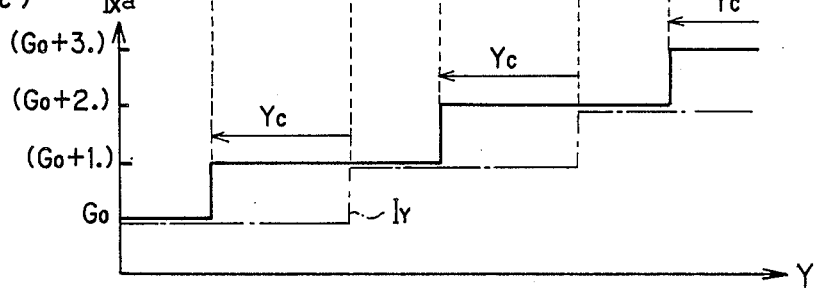

The adder 458 of FIG. 47A adds the values of the carry signals CRY3 to the integral parts $I_X$ of FIG. 51(a). The results of this addition is shown in FIG. 51(e) as signals $I_{Xa}$. As evident from FIG. 51(e), the signals $I_{Xa}$ have a waveform obtained by randomly adding the carry signals CRY3, having the level of the unit amount "1.", to the integral parts $I_X$. Addition of the carry singals CRY4 generated by this accumulation is hereinafter described.

When processing pixels on one main scanning line is completed, processing is progressed to a subsequent main scanning line. With respect to pixels having identical main scanning coordinates, the intergral parts $I_Y$ and the decimal parts $D_Y$ are changed as shown in FIG. 10A with the progress of subscanning. Further, identical values are provided as the random numbers $RD_Y$ with respect to pixels having identical main scanning coordinates. Therefore, waveforms of respective pixels are shown in FIG. 52 when viewed along the subscanning direction Y.

Namely, the random numbers $RD_Y$ having the same values are supplied to the pixels having identical main scanning coordinates by initializing the random number generator 651 every time one main scanning operation is completed, whereby a signal $I_{Xa}$ is obtained displacing the change waveform of the integral part $I_Y$ by the same distance $Y_C$ along the subscanning direction Y. This amount $Y_C$ of displacement is randomly changed with each main scanning coordinate.

The signals $I_{Xa}$ thus obtained are in spatial distribution as shown in FIG. 19B. Thus, the tone jump points J are randomly changed along the subscanning direction in a range within interdistance $\Delta Y$ between each pair of tone jump points in the integral parts $I_Y$ of each main scanning coordinate.

Figure 53A:
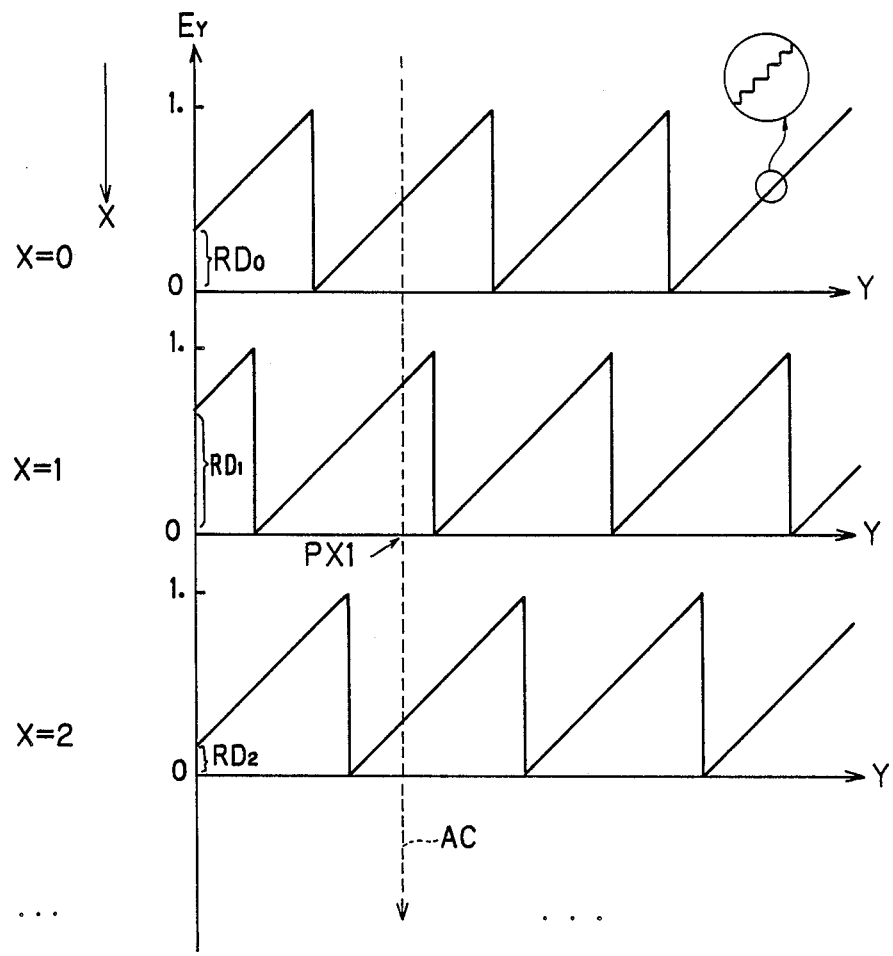
FIG. 53 is an explanatory diagram of accumulation processing in generation of the subscanning direction inclined halftone image.
Figure 53B:
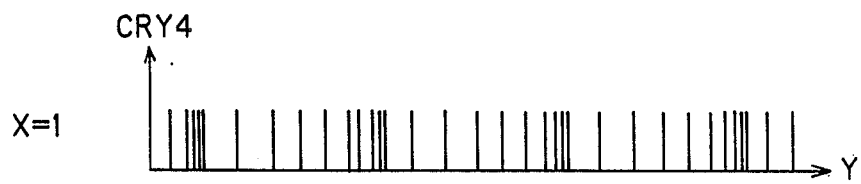

On the other hand, the subscanning accumulation circuit 660 accumulates the second decimal parts $E_Y$ corresponding to decimal parts of the composite values $C_Y$ (FIG. 51(c)) for pixels with identical subscanning coordinates in the main scanning direction. The carry signals CRY4 are generated when the accumulated values reach multiples of "1.". FIG. 53 is illustrates the carry signals CRY4. In FIG. 53(a), $X=0, 1, 2, \ldots$ represents main scanning coordinates and $RD_0, RD_1, \ldots$ are values of the random numbers $RD_Y$ to be generated in conjunction with the respective main scanning coordinates. Referring to FIG. 53, values of identical random numbers $RD_Y$ are provided to pixels having identical main scanning coordinates, and hence, in a pixel train having the main scanning coordinate of $X=0$, for example, the second decimal parts $E_Y$ are changed substantially in a sawtooth manner (inclined portions in FIG. 53 are stepped) with increase in the subscanning coordinates Y. This also applies to other main scanning coordinates ($X=1, 2, \ldots$). However, since the values of the random numbers $RD_0, RD_1, \ldots$ differ, positions where the sawtooth waveforms are stepped toward "0" are varied with the main scanning coordinates. No carry signals CRX4 are generated since $E_X=0$.

The carry signals CRY4 are generated in the subscanning accumulation circuit 660 in response to accumulation of the second decimal parts $E_Y$, whereby the probability of generation of the carry signal CRY4 in pixels is increased as values of the second decimal parts $E_Y$ with respect to the pixels are increased. Therefore, when the second decimal parts $E_Y$ are accumulated along an arrow AC in FIG. 53 for example, the probability of generation of the second carry signals CRY4 is increased (e.g., PX1) in which the value of the second decimal part $E_Y$ is large. A value obtained by performing accumulation depends on both the accumulated value to a pixel immediately ahead thereof and the value of the second decimal part of the pixel currently to be added, and hence the probability is statistically high.

Figure 54:
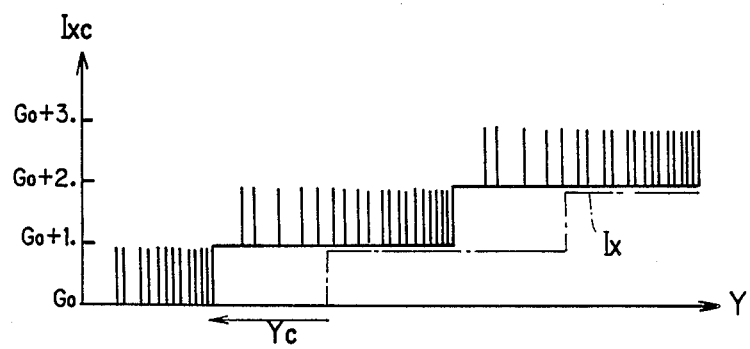
FIG. 54 is a diagram illustrating second integral parts in generation of the subscanning direction inclined halftone image.

In light of this probability, an outline of generating carry signals CRY4 can be obtained from the value of the second decimal part $E_Y$ of each pixel. Namely, in a portion X=1 of FIG. 53(a), for example, the generated density of carry signals CRY4 is substantially proportionate to the values of the second decimal parts $E_Y$ (FIG. 53(b)). This also applies to other values of X. Therefore, the adder 458 of FIG. 47A receiving the carry signals CRY4 as carry input outputs signals shown in FIG. 54 as the second integral parts $I_{XC}$. When the second integral parts $I_{XC}$ are expressed with respect to various values of X, waveforms substantially equal to those obtained by replacing the main scanning direction X and the subscanning direction Y by each other are obtained (See FIG. 50.). This also applies to the second gradation data $S_4$ obtained on the basis of the second integral parts $I_{XC}$.

Thus, a recording image with hardly visualized tone jumps can be obtained in the case of the subscanning direction inclined halftone image.

(F-3) Generation of Gradation-Inclined Halftone Image with Gradation Changed in Arbitrary Direction In this case, finite values are provided to both the main scanning direction variation $g_X$ and the subscanning direction variation $g_Y$ of FIG. 47A. Then, both the main scanning direction adder 110 and the subscanning direction adder 200 perform substantial addition, and all of the carry signals CRX3, CRY3, CRX4 and CRY4 are generated.

Figure 55:
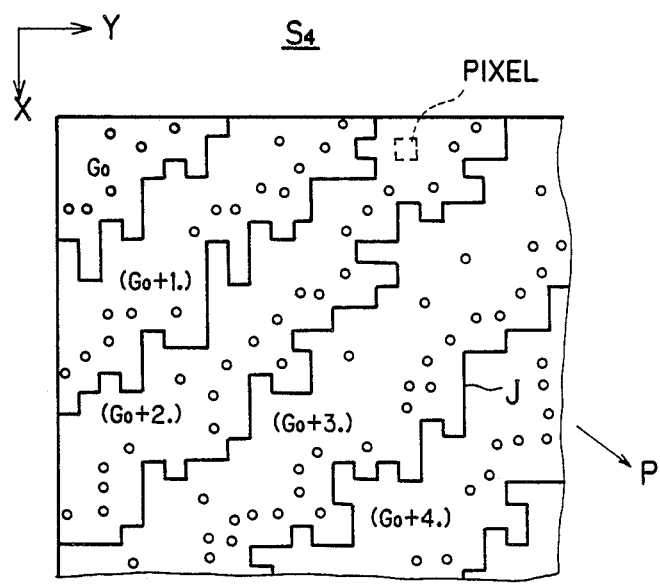
FIG. 55 is a diagram showing spatial distribution of second gradation data in generation of a gradation inclined halftone image in an arbitrary direction.

Therefore, spatial distribution of the second gradation data $S_4$ is randomly displaced in both the main scanning direction X and the subscanning direction Y. Further, compression-changed pulse trains are superimposed on the gradation steps. FIG. 55 schmatically shows an example. The direction of inclination of the inclined halftone image is shown by an arrow P in FIG. 55. Further, the pulses are schematically shown by small white circles. As evident in FIG. 55, the tone jump positions J are randomly distributed along with the effect of compression change of the pulses, and the undesired influence by tone jumps is effectively prevented.

(F-4) Inclined Halftone Image Whose Gradation Levels are Decreased

Figure 56A:
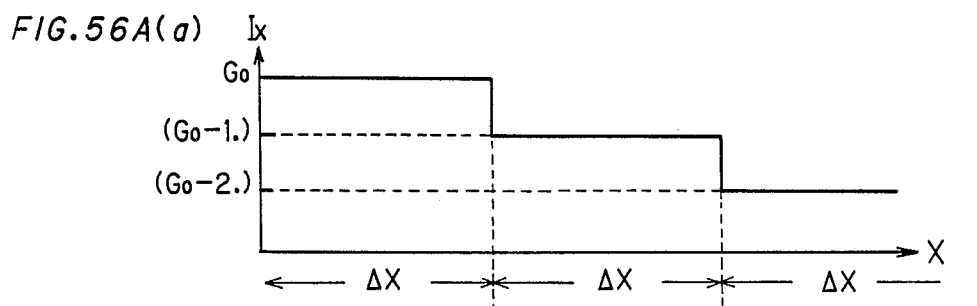
Figure 56A:
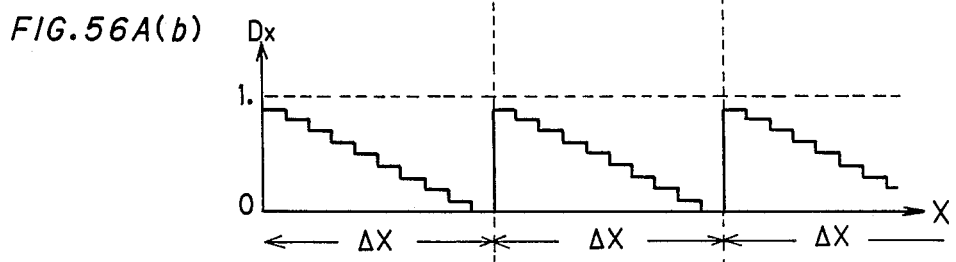
Figure 56A:
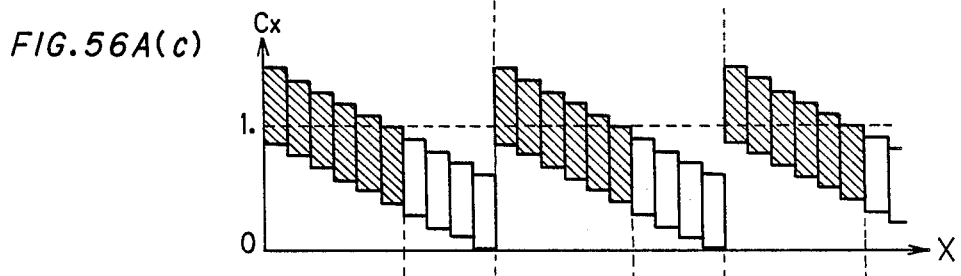
Figure 56A:
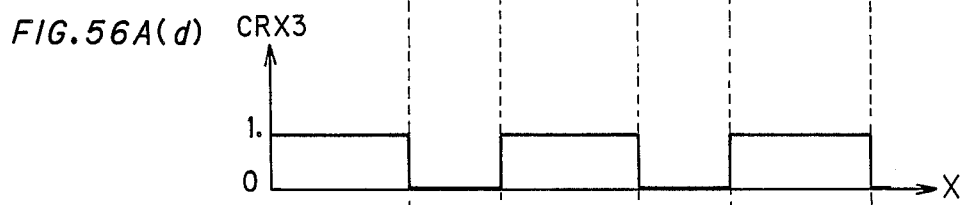
Figure 56A:
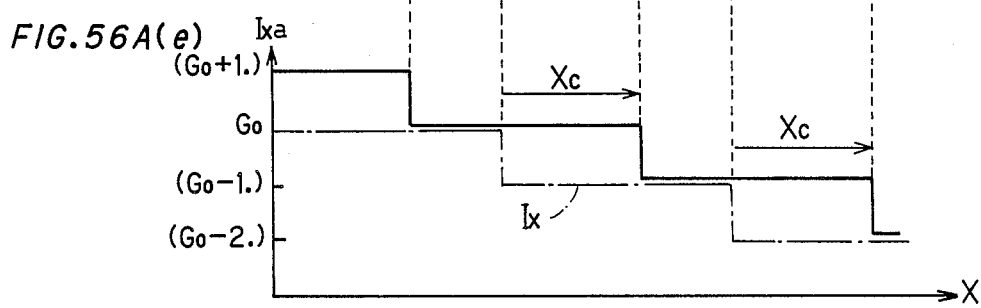

When the gradation levels are decreased in the main scanning direction, the B input of adder 111 of FIG. 6 and the main scanning direction gradation variation $g_X$ are input in the same manner as described in section (A-6). The waveforms of each signal are shown in FIG. 56A and FIG. 56B corresponding to FIGS. 49A(a) to (e) and FIGS. 49B(a) to (e) respectively. On the other hand, the gradation of the inclined halftone is decreased in the subscanning direction, and "11 . , . 11" may be supplied to the B input of the adder 211 of FIG. 7. The operation in those cases where gradation levels are decreased are easily understood by those skilled in the art on the basis of the descriptions already set forth, and hence, the explanation thereof is omitted.

G. Modification of Fourth Embodiment

The pixel shift amounts $X_C$ and $Y_C$ are not necessarily constant with respect to the main scanning direction and the subscanning direction respectively.

Figure 57:
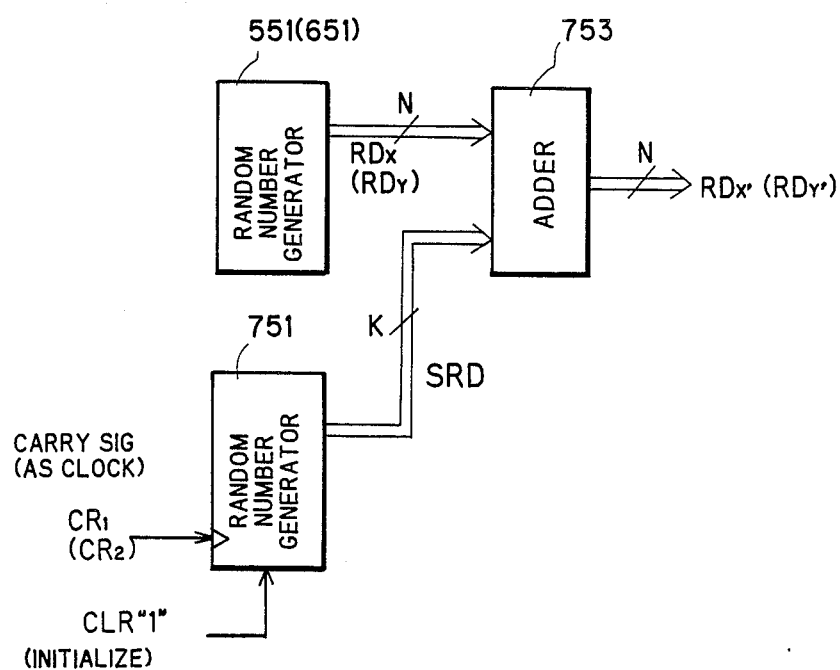
FIG. 57 is a diagram illustrating a random number generator in case of randomizing pixel shift amounts per gradation step.
Figure 58A:
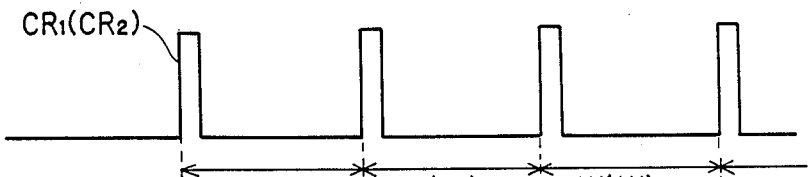
FIG. 58 is an explanatory diagram showing data change in the case of randomizing the pixel shift amounts in each gradation step.
Figure 58B:
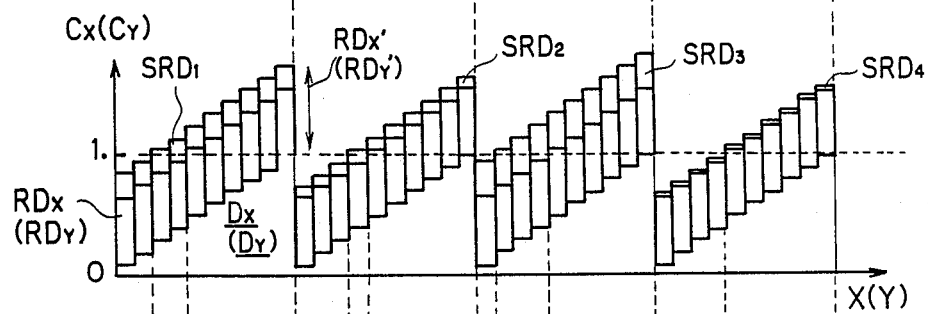
Figure 58C:
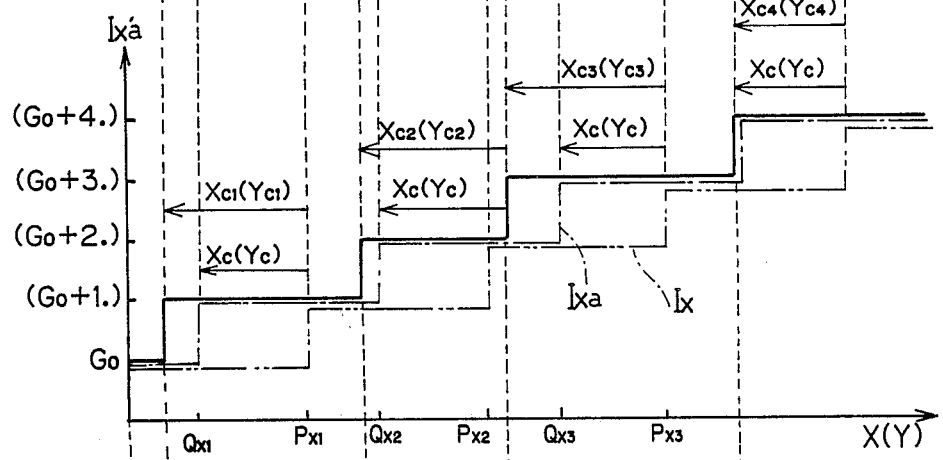
Figure 58D:
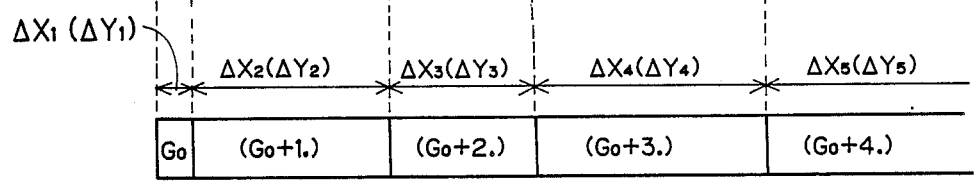

For example, the random number geneator 551(651) in FIG. 47A can be substituted with a circuit group shown in FIG. 57. In this case, random numbers $RD_X'$, ($RD_Y'$) are obtained by adding new random nubmers SRD outputted from a random number generator 751 to $RD_X$ ($RD_Y$) by an adder 753, and the random numbers $RD_X'$ ($RD_Y'$) are used as $RD_X$ and $RD_Y$ in FIG. 47A so that the shift amounts $X_C$ and $Y_C$ can be randomized for the respective gradation steps. The random numbers SRD are random numbers of K-bit width (e.g., bit width of N/2) obtained from the random number generator 715. FIGS. 58(a) to (d) show such a situation. The carry signals $CR_1$ ($CR_2$) are employed as clock signals for the random number generator 715. The random numbers SRD are changed every time the decimal part carry signal $CR_1$ ($CR_2$) is generated in the main scanning direction adder 110 (subscanning direction adder 210) in FIG. 58(b). Thus, the random numder $RD_X$ ($RD_Y$) and the random number SRD whose value is changed to $SRD_1$, $SRD_2$, $SRD_3$, . . . is added to the decimal parts $D_X$ ($D_Y$) in each gradation step, whereby shift amounts $XC_1$, $XC_2$, $XC_3$, . . . changed with gradation step are obtained. FIGS. 58(c) and 58(d) show such a situation. Although a method of adding the random numbers SRD has been herein described, $RD_X'$ ($RD_Y'$) can be obtained by subtracting or adding/subtracting the random numbers SRD from the random number $RD_X$.

The present invention is not restricted to the drum scanning type process scanner, but is also applicable to numerous types of image processing apparatus requiring a continuous image generating function in addition to a flat bed scanning type of process scanner.

According to the present invention as hereinabove described, the undesirable influence of tone jumps in continuous image recording is effectively prevented while effectuating the characteristics of the image to be recorded.

Further, the apparatus of the present invention performs only decimal processing, with no increase in the output image data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of generating image data for recording an image whose gradation levels are continuously changed along a designated direction by an array of pixels having discrete gradation levels on a prescribed recording plane, said method comprising the steps of:
   (a) designating a direction of spatial gradation change of an image to be recorded;
   (b) expressing gradation levels of each pixel of said image by first gradation data including integral parts having data lengths responsive to numbers of discrete gradation levels employed for said recording and decimal parts having arbitrary data lengths;

(c) composing random numbers with said decimal parts for each pixel along a prescribed rule depending on a relation between said direction of gradation change and a direction of said pixel array to obtain composite values for each pixel;

(d) finding pixels in which said composite values exceed a prescribed reference value;

(e) modifying values of said integral parts with respect to said pixels found in said step (d) by a unit amount to obtain second gradation data; and (f) generating image data for recording on the basis of said second gradation data.

2. A method in accordance with claim 1, wherein said recording of said image is to be achieved by recording/scanning with respect to a main scanning direction and a subscanning direction, and further wherein said decimal parts include:
first decimal parts whose values are changed along said subscanning direction; and
second decimal parts whose values are changed along said main scanning direction from initial values given by said first decimal parts, said random number include:
first random numbers whose values are randomly changed along said main scanning direction; and
second random numbers whose values are randomly changed only along said subscanning direction, said step (c) includes:
composing said first random numbers with said first decimal parts to obtain first composite values; and
composing said second random numbers with said second decimal parts to obtain second composite values, said step (d) includes:
comparing said first composite values with said reference value to find first pixels in which said first composite values are larger than said reference value; and comparing said second composite values with said reference value to find second pixels in which said second composite values are larger than said reference value, and said step (e) includes:
(e-1) modifying said integral parts with respect to said first pixels by said unit amount; and
(e-2) modifying said integral parts with respect to said second pixels by said unit amount, said second gradation data being obtained through steps (e-1) and (e-2).

3. A method in accordance with claim 2, wherein said step (f) further includes composing third random numbers having integral values with said second gradation data in each pixel to obtain third gradation data,
said image data for said recording being generated on the basis of said third gradation data.

4. A method in accordance with claim 3, wherein said image data for said recording are obtained by averaging said third gradation data in each spatial region formed by a prescribed number of pixels.

5. An apparatus for generation image data for recording an image whose gradation levels are continuously changed along a designated direction by an array of pixels having discrete gradation levels on a prescribed recording plane, said apparatus comprising:
first gradation data generating means for generating first gradation data for expressing gradation levels of each pixel of an image to be recorded, said first gradation including integral parts having data lengths responsive to the number of discrete gradation levels employed for said recording and decimal parts having arbitrary data lengths;

random number generating means for generating random numbers having data lengths responsive to said data lengths of said decimal parts;

composing means for composing said random number with said decimal parts for each pixel along a prescribed rule determined in response to a relation between a direction of spatial gradation change of said image and a direction of said pixel array to obtain composite values for each pixel;

pixel finding means for comparing said composite values with a prescribed reference value to find pixels in which said composite values exceed said prescribed reference value;

integral part modifying means for modifying values of said integral parts with respect to said pixels found by said pixel finding means to generate second gradation data; said recording image data generating means for generating image data for recording on the basis of said second gradation data.

6. An apparatus in accordance with claim 5, wherein
said recording of said image is to be achieved by recording/scanning with respect to a main scanning and a subscanning direction,
said decimal parts include:
first decimal parts whose values are changed along said subscanning direction; and second decimal parts whose values are changed along said main scanning direction from initial values given by said first decimal parts, said random number generating means includes:
first random number generating means for generating first random numbers whose values are randomly changed along said main scanning direction; and second random number generating means for generating a second random number whose values are randomly changed along said subscanning direction, said composing means includes:
a first composing circuit for composing said first random numbers with said first decimal parts to obtain first composite values; and a second composing circuit for composing said second random numbers with said second decimal parts to obtain second composite values, said pixel finding means includes:
a first pixel finding means for comparing first composite values with said reference value to find first pixels in which said first composite values exceed said reference value; and
a second pixel finding means for comparing said second composite values with said reference value to find second pixels in which said second composite values exceed said reference value, and said integral part modifying means includes:
a first modifying circuit for modifying said integral parts with respect to said first pixels by a unit amount; and
a second modifying circuit for modifying said integral parts with respect to said second pixels by said unit amount, said second gradation data being obtained through modifications of said integral parts by said first and second modifying circuits.

7. An apparatus in accordance with claim 6, wherein said recording image data generating means further includes means for composing a third random number having integral values with values of said second gradation data in each pixel to obtain third gradation data, said image data for said recording being generated on the basis of said third gradation data.

8. An apparatus in accordance with claim 7, wherein said recording image data generating means further includes averaging means for averaging said third gradation data in each spatial region formed by a prescribed number of pixels to obtain said image data for said recording.

9. A method of generating image data for recording an image whose gradation levels are continuously changed by an array of pixels having discrete gradation levels on a prescribed recording plane, said method comprising the steps of:

(a) expressing gradation levels of each pixel of said image by first gradation data including integral parts having data lengths responsive to the number of discrete gradation levels employed for said recording and decimal parts having arbitrary data lengths;

(b) sequentially accumulating values of said decimal parts along a direction pixel array to obtain accumulated values;

(c) specifying respective pixels in which said accumulated values reach values corresponding to multiples of a prescribed reference value as multiple reaching pixels;

(d) modifying said integral parts with respect to said multiple reaching pixels and/or pixels in the vicinity thereof by a prescribed integral amount to generate second gradation data; and (e) generating image data for recording said image on the basis of said second gradation data.

10. A method in accordance with claim 9, wherein said first gradation data are obtained by sequentially adding or subtracting a designated amount of gradation variation to or from a designated gradation level initial value.

11. A method in accordance with claim 9, wherein said first gradation data are obtained by reading the image of an original to express said image by digital signals having a signal of gradation levels larger than the number of discrete gradation levels employed for said recording, and said integral parts and said decimal parts are respectively provided by high order data and low order data of said digital signals, respectively.

12. A method in accordace with claim 9, wherein said image data are image data for scanning/recording, and a random number is provided as an initial value of accumulation for each scanning line in step (b).

13. An apparatus for generating image data for recording an image whose gradation levels are continuously changed by an array of pixels having discrete gradation levels on a prescribed recording plane, said apparatus comprising:

first gradation data generating means for generating first gradation data for expressing gradation levels of each pixel of an image to be recorded, said first gradation data including integral parts having data lengths responsive to the number of discrete gradation levels for said recording and decimal parts having arbitrary data lengths;

accumulation means for sequentially accumulating values of said decimal parts along a direction of said pixel array to generate pulses when said accumulated values reach values corresponding to multiples of a prescribed reference value;

composing means for composing said integral parts and said pulses in a time-series manner to generate second gradation data; and recording image data generating means for generating image data for recording said image on the basis of said gradation data.

14. An apparatus in accordance with claim 13, wherein said first gradation data generating means includes circuit means for sequentially adding or subtracting a designated amount of gradation variation to or from a designated gradation level initial value in each pixel to obtain said first gradation data.

15. An apparatus in accordance with claim 13, wherein said first gradation data generating include:

image reading means for optically reading the image of an original to supply analog original image data;

analog-to-digital converting means for performing analog-to-digital conversion of gradation levels of said analog original image data by a number of data levels larger than number of discrete gradation levels employed for said recording to supply digital original image data; and means for providing said integral parts and said decimal parts by high order data and low order data of said digital original image data, respectively.

16. An apparatus in accordance with claim 13, wherein said image data are image data for scanning/recording, said apparatus further comprises random number generating means for generating random numbers, and a random number generated by said random number generating means is supplied as an initial value of accumulation for each scanning line in accumulation of said decimal parts.

17. An apparatus for generating image data for recording an image whose gradation levels are continuously changed by an array of pixels having discrete gradation levels on a prescribed recording plane, said apparatus comprising:

first gradation data supplying means for sequentially supplying first gradation data for expressing gradation levels of each pixel of an image be recorded, said first gradation data including first integral parts having data lengths responsive to the number of discrete gradation levels employed for said recording and first decimal parts having arbitrary data lengths;

random number composing means for composing a random number with said first decimal parts for each pixel along a composition rule determined in response to relation between a direction of gradation change of said image and a direction of said pixel array to obtain composite values;

first modification requiring signal generating means for generating a first modification requiring signal when said composite values exceed a first reference value while generating second decimal parts according to remainders obtained by subtracting said first reference value from each of said composite values;

accumulation means for accumulating said second decimal parts along said direction of said pixel array to obtain accumulated values;

second modification requiring signal generating means for generating second modification requiring signals when said accumulated values reach multiples of a second reference value;

integral part modifying means for modifying values of said first integral parts with respect to pixels in which at least said first or second modification requiring signal is generated and/or pixels in the vicinity thereof by a prescribed amount to generate second integral parts; and recording image data generating means for generating image data for recording said image on the basis of a second gradation data for each pixel obtained from said second integral parts.

18. An apparatus in accordance with claim 17, wherein
said first and second reference values are unit integers, said random number composing means includes a first adder for adding said random numbers to said first decimal parts for each pixel, said first modification requiring signal generating means includes means for supplying first carry signals generated from said first adder as said first modification requiring signals when said composite values exceed said unit integer, said accumulation means includes a second adder for sequentially adding up said second decimal parts along said direction of said pixel array to obtain said accumulated values, and said second modification requiring signal generating means includes means for providing second carry signals generated from said adder as said second modification requiring signals said accumulated values exceed said unit integer.

19. An apparatus in accordance with claim 17, wherein
said accumulation means includes means for fetching random numbers as initial values of accumulation in accumulation of said second decimal parts along said direction of said pixel array.

* * * * *